United States Patent
Stine

(10) Patent No.: US 7,653,003 B2
(45) Date of Patent: *Jan. 26, 2010

(54) ACCESS PROTOCOL FOR WIRELESS AD HOC NETWORKS USING SYNCHRONOUS COLLISION RESOLUTION

(76) Inventor: John A. Stine, 9322 Eagle Ct., Manassas Park, VA (US) 20111-3048

( * ) Notice: Subject to any disclaimer, the term of this patent is extended or adjusted under 35 U.S.C. 154(b) by 941 days.

This patent is subject to a terminal disclaimer.

(21) Appl. No.: 11/108,457

(22) Filed: Apr. 18, 2005

(65) Prior Publication Data

US 2005/0190784 A1 Sep. 1, 2005

Related U.S. Application Data

(63) Continuation-in-part of application No. 10/104,336, filed on Mar. 21, 2002, now Pat. No. 7,266,085.

(51) Int. Cl.
*H04J 3/14* (2006.01)
*H04B 7/212* (2006.01)
*H04L 12/413* (2006.01)
*H04L 12/43* (2006.01)

(52) U.S. Cl. ............... 370/252; 370/447; 370/461; 370/462; 370/468; 370/348

(58) Field of Classification Search ............... 370/252, 370/254–255, 328–329, 345, 347, 348, 445, 370/447, 458, 461–462, 465, 468
See application file for complete search history.

(56) References Cited

U.S. PATENT DOCUMENTS

| | | | |
|---|---|---|---|
| 5,987,011 A | 11/1999 | Toh | |
| 5,987,024 A | 11/1999 | Duch et al. | |
| 6,028,857 A * | 2/2000 | Poor | ............... 370/351 |
| 6,249,515 B1 | 6/2001 | Kim et al. | |
| 6,377,640 B2 | 4/2002 | Trans | |
| 6,385,174 B1 | 5/2002 | Li et al. | |
| 6,628,633 B1 * | 9/2003 | Mochizuki | ............... 370/335 |
| 6,665,311 B2 * | 12/2003 | Kondylis et al. | ............... 370/462 |
| 6,788,702 B1 | 9/2004 | Garcia-Luna-Aceves et al. | |
| 6,904,275 B2 * | 6/2005 | Stanforth | ............... 455/343.1 |
| 6,973,039 B2 * | 12/2005 | Redi et al. | ............... 370/238 |
| 7,466,676 B2 * | 12/2008 | Gupta et al. | ............... 370/329 |
| 2002/0013856 A1 | 1/2002 | Garcia-Luna-Aceves et al. | |

(Continued)

OTHER PUBLICATIONS

D. Bertsekas and R. Gallagher, *Data Networks*, Prentice Hall, Inc., Upper Saddle River, NJ, 1992, pp. 271-353.

(Continued)

*Primary Examiner*—Nittaya Juntima
(74) *Attorney, Agent, or Firm*—The Marbury Law Group, PLLC

(57) ABSTRACT

An ad hoc network organizes itself to provide communications without need for an a priori designated central control mechanism or base stations. Such self-organization is challenging in a multihop ad hoc network having member nodes that are highly mobile and widely distributed. A Synchronous Collision Resolution (SCR) protocol is well suited to provide efficient medium access control is such networks. SCR is an access protocol that archives high capacity collision free access using a signaling approach that creates a random cellular-like network after each signaling period. In use, the present invention provides quality of service and supports energy conservation for the mobile nodes.

31 Claims, 34 Drawing Sheets

U.S. PATENT DOCUMENTS

2006/0114851 A1* 6/2006 Gupta et al. ............... 370/329

OTHER PUBLICATIONS

D. Bertsekas and R. Gallagher, *Data Networks*, Prentice Hall, Inc., Upper Saddle River, NJ, 1992, pp. 363-479.

P. Karn, "MACA—A New Channel Access Method for Packet Radio" ARRL/CRRL Amateur Radio 9th Computer Networking Conference, 1990, pp. 134-140.

V. Bharghavan, A. Demers, S. Shenker, and L. Zhang, "MACAW: A Media Access Protocol for Wireless LAN's," Proceedings of the Conference on Communications Architectures, Protocols, and Applications, 1994, pp. 212-225.

Etsi, EN300 652 V 1.2.1, Broadband Radio Access Networks (BRAN); High Performance Radio Local Area Network (HIPERLAN) Type 1; Functional Specification, Jul. 1998, pp. 1-105.

G. Lauer, "Packet-Radio Routing," Routing in Communications Networks, Ed. M. Steenstrup, Prentice-Hall, Inc, Englewood Cliffs, NJ, 1995, pp. 351-396.

E. Royer, and C-K. Toh, "A Review of Current Routing Protocols for Ad Hoc Mobile Wireless Networks," IEEE Personal Communications, Apr. 1999, pp. 46-55.

M. Gerla, G. Pei, X. Hong, and T-W. Chen, Fisheye State Routing Protocol (FSR) for Ad Hoc Networks (Work in progress), draft-ietf-manet-fsr-00.txt, Nov. 17, 2000.

S. Basagni, I. Chlamatac, and V. Syrotiuk, "A Distance Routing Effect Algorithm for Mobility (DREAM)," Proceedings of the 4th Annual IEEE/ACM Conference on Mobile Computing and Networking, 1998, pp. 76-84.

* cited by examiner

Nodes with packets to send

Nodes that survive signaling

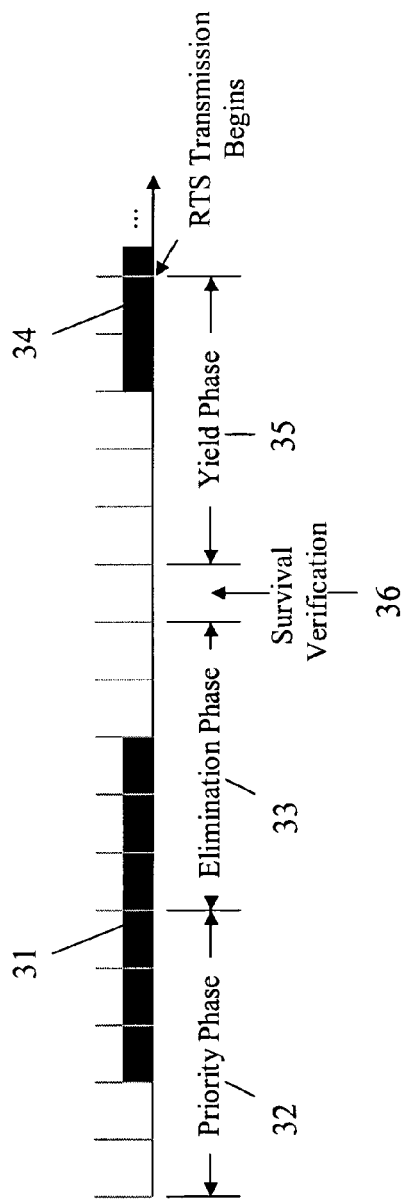
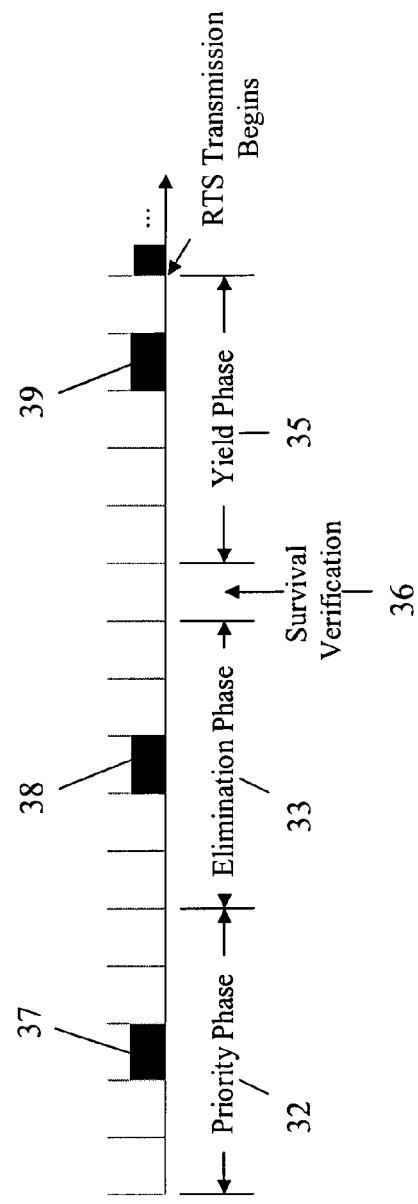
Continuous signaling
FIGURE 4A
Discrete signaling
FIGURE 4B

FIRST TO ASSERT SIGNALING PHASE

LAST TO ASSERT SIGNALING PHASE

First to Assert Phase with *4* Slots

First to Assert Phase with *0.98* Listen Probability

DEFAULT ENERGY CONSERVATION PROCESS

PERIODIC DOZING ENERGY CONSERVATION PROCESS

COORDINATED DOZING ENERGY CONSERVATION PROCESS

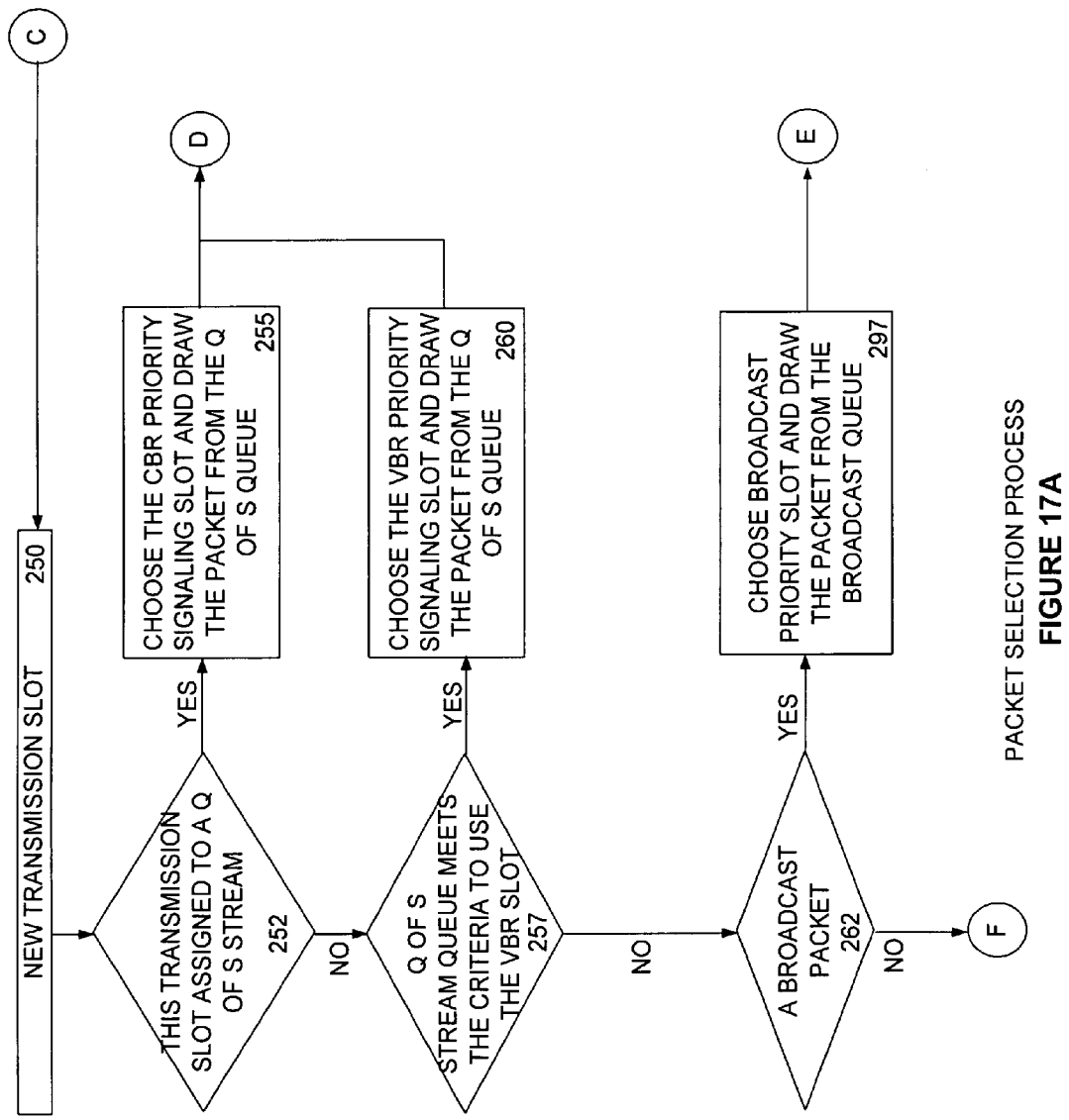

PACKET SELECTION PROCESS

PACKET SELECTION PROCESS

PACKET QUEUING PROCESS

PACKET QUEUING PROCESS

Effect of a delayed first to assert signal

Effect of an early first to assert signal

Effect of a delayed last to assert signal

Effect of an early last to assert signal

Effect of a delayed packet transmission

Toroidally wrapped simulation area

Spatial capacity with $PG = 1$

Spatial capacity with $PG = 100$

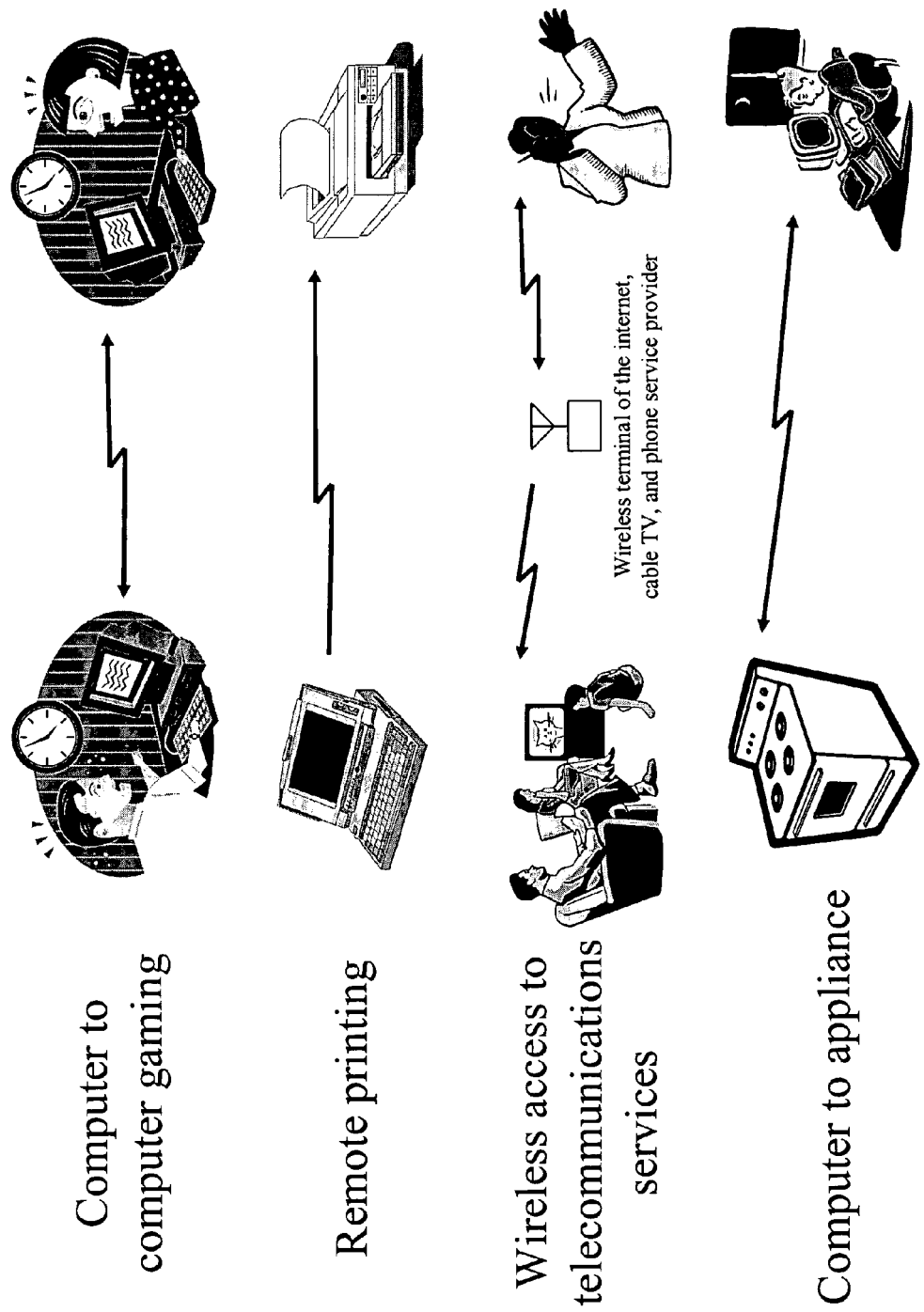

ACCESS PROTOCOL FOR WIRELESS AD HOC NETWORKS USING SYNCHRONOUS COLLISION RESOLUTION

CROSS REFERENCE TO RELATED APPLICATIONS

This application is a continuation in part of application Ser. No. 10/104,336 filed Mar. 21, 2002, now U.S. Pat. No. 7,266,085. The Ser. No. 10/104,336 application is incorporated herein by reference in its entirety for all purposes.

BACKGROUND

The invention relates generally to wireless communications. More particularly the present invention is a protocol for use with ad hoc mobile networks that distributively controls medium access thereby avoiding collisions of communications and providing quality of service in a synchronous communications system.

Ad hoc mobile networks have been proposed as a solution to wireless networking where nodes are mobile, the range of their mobility exceeds the transmission range of any single transceiver, and there is no existing network infrastructure such as that which exists in a more traditional fixed wireless network having transmission towers and base stations. Typical proposed applications for such ad hoc networks include military command and control, search and rescue, sensor, and disaster relief networks. However, ad hoc networking may find broader application as a networking approach in offices, across college campuses, in homes, and even possibly as the architecture of a future generation of mobile wireless data networks. Indeed, the increasing availability of high frequency transceivers (i.e. high bandwidth) will allow simultaneous support of multiple connections at different qualities of service (QoS). However, the increased attenuation associated with such high frequencies will make cellular architectures centered on nodes communicating directly with base stations impractical. The natural alternative is for nodes to communicate with their peers rather than with a base station and to cooperate to support connectivity as is envisaged by the ad hoc networking approach.

Ad hoc networks have no base stations and are quite volatile. The performance of these networks is contingent on the ability of access protocols to allocate bandwidth and the ability of routing protocols to determine and to maintain routes among the nodes. Extensive research has been directed toward this issue and numerous protocols have been proposed for medium access.

Three major challenges confront ad hoc access protocols: providing fair access onto a single channel to multiple contending nodes (i.e. all contending nodes have the same opportunity to gain access), achieving spatial reuse of the channel, and providing a mechanism that allows nodes to reserve bandwidth on the single access channel.

Fair access is typically achieved either by scheduling accesses or by introducing temporal randomness so that nodes may gain access at different times. Due to the distributed nature of ad hoc networks, temporally random access techniques improving on the principles underlying the Aloha and Carrier Sense Multiple Access (CSMA) protocols have dominated.

The IEEE 802.11 and the ETSI HIPERLAN MAC protocols exemplify the state of the art in standardized protocols. The 802.11 MAC is based on a distributed CSMA like protocol that seeks to avoid collisions when the channel is congested. Nodes schedule packet transmissions to start in randomly selected time slots within a contention window. Nodes transmit the packets after sensing the channel to be idle for that selected number of time slots. If the packet is not received successfully, a back off algorithm randomly schedules retransmission in a larger contention window. The contention window increases exponentially with each failure, thus reducing the probability that nodes, which collide, will subsequently collide. However, the protocol's performance still degrades with congestion.

The HIPERLAN protocol takes a different approach. Nodes first attempt to send packets as they arrive. If a packet arrives when the channel is busy, the node waits until the channel is free again and then contends immediately using the signaling protocol Elimination Yield Non-Preemptive Multiple Access (EYNPMA). When multiple nodes within range of each other contend simultaneously, this protocol is better than 96% effective at isolating a single winner. By contrast with 802.11, the performance of this access mechanism is robust. However, as the density of nodes increases, so does the susceptibility of the protocol to hidden node effects. This susceptibility occurs because the timing of EYNPMA is based on the release of the channel by a transmitter. Only nodes within range of this transmitter can achieve the appropriate synchronization.

RICH-DP offers a variation to slotted Aloha. All nodes follow a common frequency hopping sequence. Access attempts occur on these hops as in slotted aloha but they are receiver initiated. Nodes poll their peers in these hops to determine if their peer has a packet to send them. If so, the two nodes exchange data stalling at that hop frequency and thereby avoiding collisions with future polls and data exchanges, which will occur on other hop frequencies. The use of request-to-receive (RTR) messages sent by destinations results in collision avoidance as collisions occur at destinations. Unique to this approach is that not only do the access attempts occur at random times, they may occur when the sources have no data to send. Nevertheless on account of a dedicated collision free channel for the subsequent data exchange and the concurrent use of multiple channels in the same space it is a very competitive protocol. Its limitations are that it is sensitive to high node densities on account of the finite number of frequencies and (typical of the slotted aloha access mechanism) is subject to congestion collapse as collisions may still occur in the RTR polls.

The dispersion of nodes in networks offers the potential to spatially reuse the radio channel so that more than one pair of nodes can exchange data at a time but also results in the pesky hidden node phenomena where distant nodes transmitting simultaneously unbeknownst to each other interfere at one or both destinations. The challenge to access protocols is to resolve from a spatial distribution of transmitters a set that can use the channel simultaneously without interfering with each other.

The deleterious impact of the hidden node problem is a significant issue for CSMA protocols. In fact, when "wireless" CSMA was first presented, it was noted that CSMA's performance could degrade to that of Aloha. Subsequently, it was demonstrated that a two-way handshake prior to data transmission could suppress collisions. The principle is for the source to first transmit a short "request-to-send" (RTS) packet to the destination implicitly directing all nodes within range to back off while the data exchange takes place. Upon receiving the RTS, the destination replies with a "clear-to-send" (CTS) packet, which simultaneously directs its neighbors to back off while giving the source the go-ahead to transmit the data packet. Collisions may still occur during RTS-CTS exchanges but they only interfere with these short transmissions rather than the longer data transmissions. In fact, modeling of the present invention demonstrates that a successful RTS-CTS exchange is a sufficient condition to assure no collision in the subsequent data transmission.

The RTS-CTS exchanges are currently used by 802.11. By contrast, HIPERLAN takes a different approach in dealing with hidden nodes. A node assumes a collision has occurred when it fails to gain access but then does not detect a packet transmission. When this is the case the node identifies this as the "hidden elimination" condition and foregoes attempting to gain access for at least 500 ms. Unfortunately, various studies reveal HIPERLAN's performance degrades significantly with an increase of hidden nodes.

RICH-DP avoids the channel sharing challenge by segregating transmissions on different frequencies.

Access protocols must enable the reservation of resources if they are to achieve bandwidth or delay QoS constraints.

The 802.11 protocol supports two types of coordination functions built upon its distributed access mechanisms, a distributed coordination function (DCF) and a point coordination function (PCF). The DCF is the default. The PCF enables a central node, the point coordinator (PC), to schedule transmissions; however, the standard provides no guidance on how this should be done. The PCF can be used to support multimedia traffic in certain situations, but this assumes that all nodes are within range of the PC. In a widely distributed network, this approach would require multiple PCs working together to manage access. Currently no work attempting such a solution for an ad hoc network appears to exist. In fact, the DCF remains the predominant coordination function used in ad hoc networking. Attempts have been made to add signaling to the DCF so as to enable it to support constant bit rate services; however, this work again requires all nodes to be within range of each other. The 802.11 protocol does not simultaneously support resource reservation and spatial reuse.

HIPERLAN's method of supporting QoS is to give priority to packets based on their residual lifetime. The EYNPMA protocol has five levels of priority, all based on the residual lifetime of a packet. Unfortunately, experiments demonstrate that this priority scheme is not effective at supporting QoS since there are no mechanisms to distinguish between packets associated with real time services and old data packets. The problem is, of course, more pronounced in congested networks where more nodes would contend to transmit old, i.e. higher priority, data packets.

Spread spectrum (SS) technology has frequently been proposed as a method to multiplex signals within the same geographic region. Spread spectrum also offers other very attractive features such as resistance to detection, resistance to multipath induced fades, and resistance to jamming. Multiple transmissions can coexist in the same frequency band when using orthogonal spread spectrum codes. This is a key technology in cellular phone systems and is the basis of code division multiple access (CDMA).

Unfortunately, several complications are introduced by the distributed nature of ad hoc networks. First, the question arises, "which code to use and when to use it?" Synchronizing the codes transmitters use to those that receivers are using to receive is not trivial. Second, in a channel with only a finite number of codes available, the network needs to assign codes such that they are spatially distributed. In a dynamic network, keeping track of codes can be as complicated as keeping track of routes. Third, unlike CDMA cell phone systems, it is possible that a destination will be closer to an interfering transmitter than its source transmitter.

Even with a different spreading sequence the relative power of the interfering signals can raise the effective noise level of the channel such that the desired signal is lost. Finally, when codes are used, networks become packet sensing as opposed to carrier sensing. Receivers must synchronize with the transmitter from the beginning of the packet transmission or else the transmission appears as noise. To avoid interfering with an ongoing exchange at a destination a source must know that the destination is idle and is ready to receive its transmission. The only way to be certain that the destination is idle is to monitor the exchanges to and from the destination. This is difficult, since it may be impossible to monitor an incoming transmission to this destination on account of separation from the distant source. Not knowing who this source is also prevents knowing the code that would be used in the destination's acknowledgement. Not sensing a destination is busy is no guarantee that it is idle.

There are four approaches to selecting codes: transmitter-based, receiver-based, pair-wise oriented, and common code shifted in time. In transmitter-based schemes a unique code is assigned to each transmitter. The problem with this approach is determining which transmitter's code a potential receiver should use at a given time.

In receiver-based schemes a unique code is assigned to each receiver. In this approach, there is no confusion at either the receiver or the transmitter as to which code to use but there is the question as to when the transmitter should start transmitting. Transmitting to a destination that is already receiving a packet from another source can interfere with that reception.

With transmitter-based codes the problem associated with an adjacent node interfering with a destination's reception is not as severe since it is precluded from using the same code.

In pair-wise oriented schemes unique codes are assigned to pairs of nodes. Pair-wise coding presents the same challenge to destinations as transmitter-based codes. Each potential destination needs to determine which code it should use in receiving.

Common code systems rely on the offset of the phase of codes used in transmissions that occur concurrently. The offsets may either occur randomly or be deliberate. In the latter case, the selection of the offset is no different than the selection of the spread spectrum code in the first three approaches. Additionally, despite the presence of an offset when using common codes there is still an increased likelihood that signals may interfere with each other. However, using a common code has an advantage in that it is the only approach that can support broadcast transmissions.

Proposed solutions to the problem of selecting codes normally involve the use of hybrid protocols. In one hybrid, all nodes monitor and contend using a common code but after the addresses of the source and destination are transmitted the transmitter uses a transmitter-based code to send the data packet. The destination knows which code to use since it receives the source address before the transition to the use of the transmitter-based code. In a second protocol, every node is assigned two codes, one to receive on and one to transmit on. When a node is idle it listens using its receive code. A source will use the receive code of the destination of a packet to send the source and destination address portion of the packet but will again transition to the source's transmit code to send the data portion.

Both approaches attempt to limit the time that another node may interfere with the exchange. In the first, other nodes will only interfere during the initial transmission of the addresses and in the second the potential interference occurs during the same period but is further reduced on account that interfering nodes must be transmitting to the same destination. The disadvantage of the second protocol over the first is its inability to broadcast packets.

The assignment of codes is also a problem in spread spectrum ad hoc networks. Normally there are a finite number of codes that must be distributed to a larger number of nodes. Random selection of codes may not assure the required physical separation of nodes using the same codes. Various algorithms have been developed for the assignment of codes. Most methods of assigning and distributing codes are associated with the hierarchical organization of networks.

Code assignment does not eliminate the unwanted interference from transmitters in close proximity to the destination end of other exchanges. In other words, the interfering source is closer to a destination than its intended source. Ideally, an access protocol would deliberately select transmitting nodes that do not interfere at the destinations.

Although there has been much work on the use of spread spectrum in ad hoc networks there are no protocols that completely integrate within a medium access control protocol the assignment of codes, the scheduling of a spatially distributed set of transmissions, and a method used by nodes to select codes for transmission and reception. In turn there are no methods that support the use of CDMA technology to transmit different messages from one node to many.

Mobile nodes in ad hoc networks frequently rely on batteries for energy and therefore have a finite lifetime. Conserving energy is therefore important to extending the lifetime of both individual nodes and the network. This is especially difficult in ad hoc networks since energy conserving actions must be made in a distributed manner. In fact, the continuous participation of the mobile nodes to create a fabric of connectivity is critical to the overall performance of the network. Typically, this results in a choice of either operating at peak performance at the expense of a shortly lived network or choosing sub optimum performance for network longevity. Additionally, most energy conserving protocols focus on the implementation of a single energy conserving approach.

Protocols may use four sets of mechanisms to reduce energy consumption: 1) help nodes enter low energy states; 2) choose routes that consume the least energy; 3) selectively use nodes based on their energy status; 4) reduce overhead.

Access protocols reduce energy consumption by coordinating the use of low energy states. Using low energy states has great potential for conserving energy since these state use less than a tenth of the energy used by radios when receiving or transmitting. The default state of nodes is receiving since signal processing is required to detect and to synchronize to an incoming signal. Entering a low energy state requires the node to cease sensing the channel and to stop participating in the network's activities. The objective of type 1 energy conserving protocols is to assist nodes that are not participating in data exchanges to enter a low energy state without degrading overall performance of the network. Proposed methods for managing nodes entering the doze state may be one of two kinds. In the first, nodes doze and then wakeup on a periodic basis according to network wide parameters. The 802.11 standard provides this kind of mechanism. The second requires the node desiring to doze to specifically coordinate a dozing cycle with another supporting node that agrees to act as a surrogate destination for the dozing node's traffic while it is dozing. The ETSI HIPERLAN standard uses this approach.

In both the 802.11 and HIPERLAN protocols, the decision to doze is initiated by the individual nodes desiring to conserve energy. In the ad hoc version of an 802.11 network, the node that first forms the network decides whether it permits energy conservation by establishing an "ATIM Period." A node that desires to conserve energy may doze so long as it wakes each ATIM Period to listen for ad hoc traffic indication messages (ATIM). ATIMs are transmitted during a short window at the beginning of each ATIM period, called an ATIM Window. If the node wakes and hears an ATIM directed to itself, it acknowledges the ATIM and remains awake for the rest of the ATIM period prepared to receive traffic. If it receives no ATIM directed to itself, the node returns to the doze state at the conclusion of the ATIM window. Note that there is no method for a node's intent to doze to be disseminated. Other nodes assume this state after failing to transfer data through regular contention.

The energy conserving mechanism in HIPERLAN requires a node desiring to doze, a "p-saver," to coordinate with another to serve as its surrogate, a "p-supporter". As part of this coordination the two nodes agree to a period at which the p-saver will awaken to receive unicast messages and a period at which the p-supporter will transmit multicast messages. The p-supporter node collects transmissions intended for the p-saver and then attempts to forward them to the p-saver during the coordinated transmission periods.

The critical deficiency of both the 802.11 and HIPERLAN techniques is that they do not account for the repercussions of a single node's decision to enter the doze state. These repercussions are more congestion as nodes attempt to send traffic to nodes that are dozing and complications for other protocols higher in the stack such as routing. To minimize these adverse effects, access protocols must be able to make dozing more predictable.

In view of the above, what would be truly useful is an access protocol that can be used with wireless ad hoc networks. Such a protocol would arbitrate medium access such that it provides quality of service, manages the use of low energy states, coordinates the use of multiple channels, all while allowing maximum use of wireless channels minimizing collisions of concurrent communications.

SUMMARY

It is therefore an aspect of the present invention to allow spatial reuse of a wireless channel.

It is yet another aspect of the present invention to insure that there are no collisions with hidden nodes during transmission of data.

It is still another aspect of the present invention to minimize the effect of propagation delays and transceiver state transitions.

It is a further aspect of the present invention to prioritize the transmission of data for Quality of Service purposes.

It is yet another aspect of the present invention to conserve energy of transceivers in a mobile network.

It is still another aspect of the present invention to arrive at an architecture for future generations of mobile wireless networks.

It is a further aspect of the present invention to eliminate the need for architectures that rely upon nodes in communication with base stations.

It is yet another aspect of the present invention to arrive at an architecture wherein nodes communicate with their peers to cooperate and support connectivity.

It is still another aspect of the present invention to permit high capacity networks suitable for highly mobile and widely distributed multihop ad hoc networks It is a further aspect of the present invention to resolve a set of transmitters that can use a given channel simultaneously without interfering with each other.

It is yet another aspect of the present invention to establish a fully synchronous architecture of an ad hoc network where all nodes contend simultaneously and synchronously.

It is still another aspect of the present invention to resolve a set of dispersed nodes that can transmit simultaneously.

It is a further aspect of the present invention to insure all nodes have fair access to a single wireless channel.

It is yet another aspect of the present invention to coordinate the use of spread spectrum codes in ad hoc networks.

It is still another aspect of the present invention to coordinate the use of orthogonal channels in a common ad hoc network.

It is a further aspect of the present invention to enable multiple sources to each transmit multiple different packets to different destinations simultaneously.

It is yet another aspect of the present invention to provide a mechanism for nodes to reserve the periodic use of the wireless channel.

It is still another aspect of the present invention to coordinate the use of low energy transceiver states at wireless nodes.

These and other aspects of the present invention will be apparent from a review of the specification herein.

An embodiment of the present invention is a synchronous collision resolution (SCR) access protocol. The SCR protocol achieves high capacity collision free access using a signaling approach that creates a random cellular-like network after each signaling period. It is perfectly suited for highly mobile and widely distributed multihop ad hoc networks.

Additionally, the SCR access protocol manages the use of low energy states at the nodes with minimal impact on capacity and access performance.

SCR bases access on spatial randomness rather than temporal randomness. As a result, the access mechanism enables the immediate coordination amongst nodes in range of each other to grant access to the node with the highest priority traffic and enables pairs of nodes to cooperate in gaining access thus allowing the reservation of the link between them.

In another embodiment, the SCR access protocol enables contenders to signal the type of traffic, broadcast or point-to-point, such that there is no ambiguity at destinations of what type of traffic they may receive. This enables the use of multiple receiver directed channels in the network.

An embodiment of the present invention provides a method of medium access control among nodes in an ad hoc wireless network. The nodes are synchronized to a common time. Contention of nodes for access to a transmission channel is synchronously arbitrated during one or more signaling phases. The nodes that win an arbitration are authorized to use the transmission channel simultaneously. In an embodiment of the present invention, the one or more signaling phases comprise one or more signaling slots. The signaling slots may occupy of equal time units or variable time units.

In an embodiment of the present invention, synchronously arbitrating contention of nodes for access to a transmission channel during one or more signaling phases is accomplished by applying a preemption rule to a node contending for access to a transmission channel during one of the one or more signaling phases. A determination is made at the contending node whether the contending node survives the contention according to the preemption rule. In an exemplary embodiment, the preemption rule is selected from the group consisting of a first-to-assert rule and a last-to-assert rule.

In yet another embodiment of the present invention, synchronously arbitrating contention of nodes for access to a transmission channel during one or more signaling phases is accomplished by applying a first preemption rule to a node contending for access to a transmission channel during a first signaling phase. A determination is made at the contending node whether the contending node survives the contention according to the first preemption rule. If the contending node survives the contention according to the first preemption rule then a second preemption is applied to the contending node for access to a transmission channel during a second signaling phase. A determination is then made at the contending node whether the contending node survives the contention according to the second preemption rule.

According to another embodiment of the present invention, a node that wins an arbitration comprises a node that survives contention for access to a transmission channel during each of the one or more signaling phases.

In still another embodiment of the present invention, the transmission of data packets from nodes that survive arbitration to destination nodes during the transmission channel is synchronized. In yet another embodiment of the present invention, the transmission of acknowledgement packets from destination nodes that receive data packets is synchronized.

According to another embodiment of the present invention, a determination is made whether a data packet will be received without collision prior to sending the data packet. In an embodiment of the present invention, determining whether a data packet will be received without collision prior to sending the data packet is accomplished by synchronously sending request to send (RTS) messages from authorized nodes, synchronously sending clear to send (CTS) messages from destination nodes in receipt of an RTS message, and sending data packets from authorized nodes only in response to receipt of CTS messages.

In an embodiment of the present invention, one or more of nodes that do not survive contention for access to a transmission channel during a signaling phase are instructed to echo a contention signal received from a node that survives arbitration. In this embodiment of the present invention, synchronously arbitrating contention of nodes for access to a transmission channel during one or more signaling phases is accomplished by applying a preemption rule to a node contending for access to a transmission channel (the contending node) during one of the one or more signaling phases and determining at the contending node whether the contending node survives the contention according to the preemption rule. If the contending node survives contention according to the preemption rule, a determination is made whether the contending node receives an echoed contention signal. If the contending node does not receive an echoed contention signal, a determination is made that the contending node survives the signaling phase.

In an embodiment of the present invention, a determination is made whether a node is a participant in a packet exchange. If the node is not a participant, a wakeup interval for the non-participating node is scheduled and the node enters a dozing state. According to an embodiment of the present invention, a wakeup interval comprises a number of transmission slots.

According to another embodiment of the present invention, determining whether a node is a participant in a packet exchange is accomplished by listening for signaling from a contending node. In yet another embodiment of the present invention, entering a dozing state is accomplished by coordinating with a neighboring node for the receipt of packet data units directed to the node entering the dozing state. The non-participating node broadcasts a wakeup interval and the address of the neighboring node to receive packet data units for the non-participating node. While in the dozing state, the neighboring node receives the packet data units for the non-participating node. Upon leaving the dozing state, the packet data units received by the neighboring node are received by the non-participating node.

In still another embodiment of the present invention, the non-participating node listens for a priority signal. If no priority signal is heard, the non-participating node then broadcasts a wakeup interval and the address of the neighboring node to receive packet data units and reenters the dozing state.

An embodiment of the present invention provides a method of establishing priority of access among nodes in an ad hoc wireless network. The nodes are synchronized to a common time. A service priority is assigned to a priority signaling slot within a priority phase based on a packet differentiator. Contending nodes having packets to transmit comprising the packet differentiator are permitted to transmit a contention signal in the priority signaling slot based on the packet differentiator of a payload packet. A first-to-assert preemption rule is applied to the priority phase. A determination is made at the contending nodes whether the contending node survived the priority phase contention. In an embodiment of the present invention, the packet differentiator is selected from the group consisting of a time to live, a network application, a packet's purpose, a packet source, and a packet destination.

Another embodiment of the present invention provides a method of managing stream-based packets among nodes in an ad hoc wireless network. The nodes are synchronized to a common time. A service priority is assigned to a quality-of-service (QoS) signaling slot within a priority phase based on a packet differentiator. The contention of nodes within the QoS signaling slot for access to a transmission channel within a constant bit rate (CBR) frame is synchronously arbitrated during the priority signaling phase. A determination is made at the contending nodes whether the contending node survived the priority phase contention within the QoS signaling slot. If a contending node survived the priority phase contention, then the surviving contending node is authorized to transmit in the nth-slot in the CBR frame. In an embodiment of the present invention, the packet differentiator is selected from the group consisting of a time to live, a network application, a packet's purpose, a packet source, and a packet destination.

According to another embodiment of the present invention, the priority phase further comprises a CBR slot. The node with a first packet in a stream is allowed to signal using the QoS signaling slot. Surviving contending nodes that successfully exchange a packet in the CBR frame are allowed to signal in the CBR slot. The surviving contending nodes that transmit in the CBR frame are authorized to transmit in the nth-slot of the next CBR frame.

In still another embodiment of the present invention, a signaling phase is also used. A determination is made at a destination node that it is a recipient of a CBR transmission from a surviving node. An assertion signal is simultaneously sent from the surviving node and from the destination node during a cooperative signaling slot of the signaling phase. The surviving node and the destination node are authorized to use the signaling slot thereby assuring only the surviving node and destination node survive the signaling phase.

Another embodiment of the present invention provides a method of establishing receiver channels in an ad hoc wireless. At a home node, a channel selection of neighboring nodes within range of the home node's receiver is obtained. A peer-to-peer receiver channel is selected at the home node. A determination is made at the home node whether the peer-to-peer receiver channel selected by the first node is the peer-to-peer receiver channel selected by a neighboring node. If the peer-to-peer receiver channel selected by the home node is not the peer-to-peer receiver channel selected by a neighboring node, then the received channel selected by the home node is used. If the peer-to-peer receiver channel selected by the home node is the peer-to-peer receiver channel selected by a neighboring node, then an unused peer-to-peer receiver channel is used. If the peer-to-peer receiver channel selected by the home node is the peer-to-peer receiver channel selected by a neighboring node, and if there are no unused peer-to-peer receiver channels, then a channel selection rule is applied to select an in-use peer-to-peer receiver channel.

The peer-to-peer channel selected by the home node is broadcasting from the home node.

In another embodiment of the present invention, the home node comprises a broadcast receiver channel. The home node listens for contention signals from neighboring nodes. A determination is made whether the contention signals are indicative of a broadcast communication or a peer-to-peer communication. If the contention signals are indicative of a broadcast communication, then home node selects the broadcast receiver channel. If the contention signals are indicative of a peer-to-peer communication, then the home node selects the peer-to-peer receiver channel.

In still another embodiment of the present invention, a determination is made at a sending node as the peer-to-peer channel selected by the home node. A packet is transmitted from the sending node to the home node using the peer-to-peer channel selected by the home node.

DESCRIPTION OF THE DRAWINGS

FIGS. 4A and 4B illustrate the signaling process using both continuous and discrete signals according to an embodiment of the present invention.

FIGS. 17A-17C illustrate a flow chart of SCR's packet selection process that is executed with each transmission slot according to an embodiment of the present invention.

FIG. 30 illustrates some home applications of ad hoc networking according to an embodiment of the present invention.

DETAILED DESCRIPTION

Figure 1:
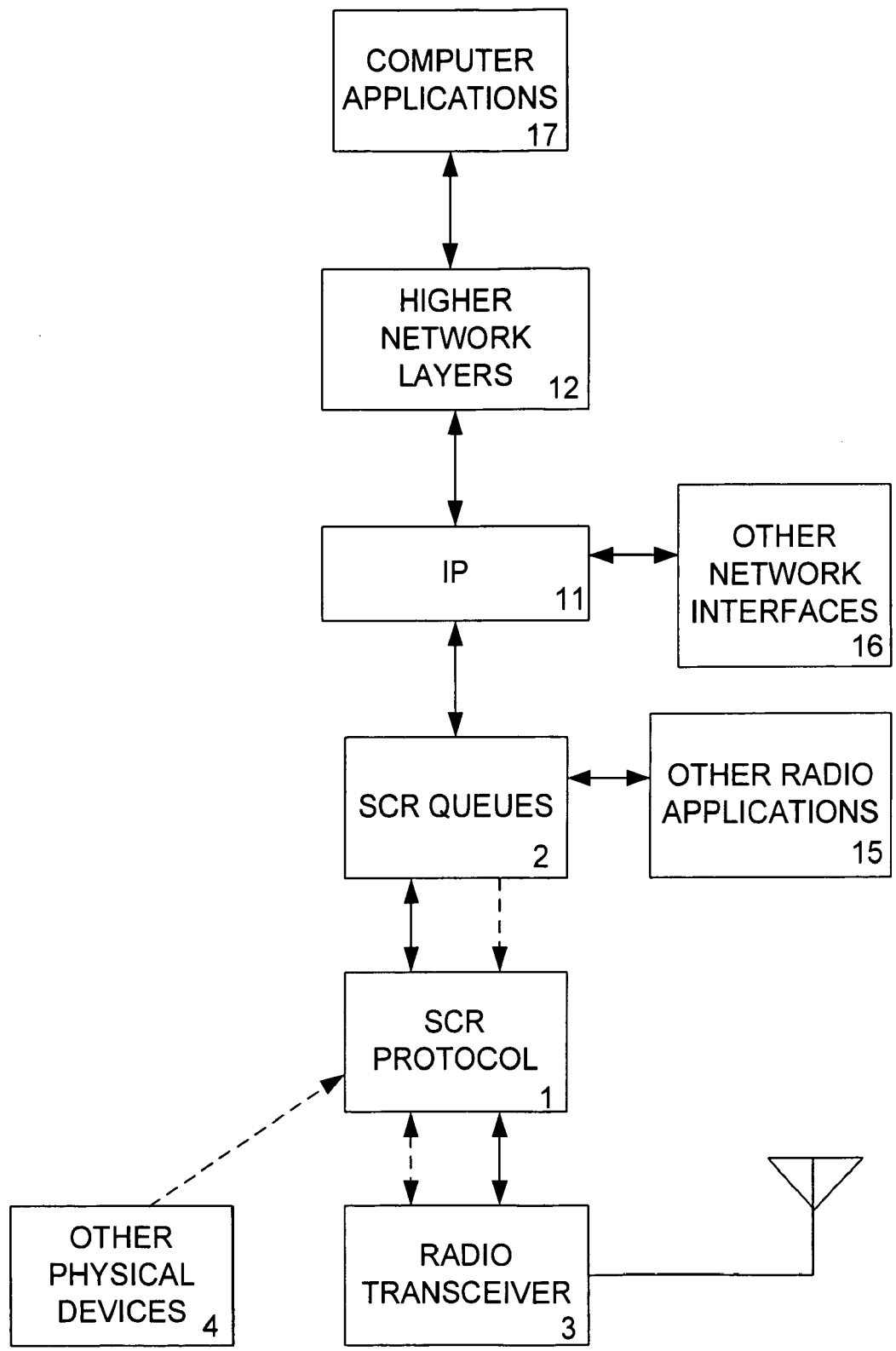
FIG. 1 illustrates the interconnectivity of the invention with other node devices and processes according to an embodiment of the present invention.

In an embodiment of the present invention, a Synchronous Collision Resolution (SCR) protocol operates with other protocols and devices that reside at individual nodes of a wireless communications network. FIG. 1 illustrates the interconnectivity of the invention and other node devices and processes. The SCR protocol 1 manages access to the radio channel through the radio transceiver 3. The SCR protocol 1 attempts to gain access whenever it has a packet in its queues 2 to forward. Signaling and payload packets that are forwarded to the radio transceiver 3 are then immediately transmitted. The SCR protocol 1 directs the transceiver settings, e.g. channel, spread spectrum code, etc. that the radio transceiver 3 uses through an information link (shown in broken line). In the reverse, the radio transceiver 3 receives packets on the wireless channel and forwards them to the SCR protocol 1. Measurements of the quality of the signal are provided by the radio transceiver 3 to the SCR protocol 1 through an information link (shown in broken line). It is important for the SCR protocol 1 to have precise timing so that it can function effectively. Timing information is provided by other physical devices 4, provided by the radio transceiver 3, or may be provided by other protocols operating amongst the nodes of the network.

FIG. 1 illustrates the logical placement of the SCR protocol 1 and its interconnection with possible protocols and devices that may exists at those nodes. The SCR protocol manages access to a single wireless access channel. It is an object of the SCR protocol to take full advantage of the physical characteristics of the radio channel and to control the transmission parameters of the radio transceiver 3 to enhance the effectiveness of the access mechanism.

Packets intended for other nodes that share the wireless channel arrive from higher protocol layers and are placed in the appropriate transmission queues 2 of established by the SCR protocol. When there is a packet in an SCR queue 2, the SCR protocol 1 then schedules the access attempt for the packet, either immediately, after some number of queued packets, or for some specific scheduled transmission time. At the appropriate time, the SCR protocol 1 then attempts to gain access to the wireless channel. When the SCR protocol 1 is successful at gaining access, the packet is forwarded to the radio transceiver 3 and transmitted. Packets arriving at the radio transceiver 3 from the wireless medium are forwarded to the SCR protocol 1, which immediately forwards the packet to the higher layer networking protocols. If the packet is intended for an application at the node it is forwarded up the protocol stack to that application. If it is intended for another node in the network, either it is placed in an SCR queue 2 or it is routed to the IP layer 11 for forwarding on another interface 16.

Figure 2A:
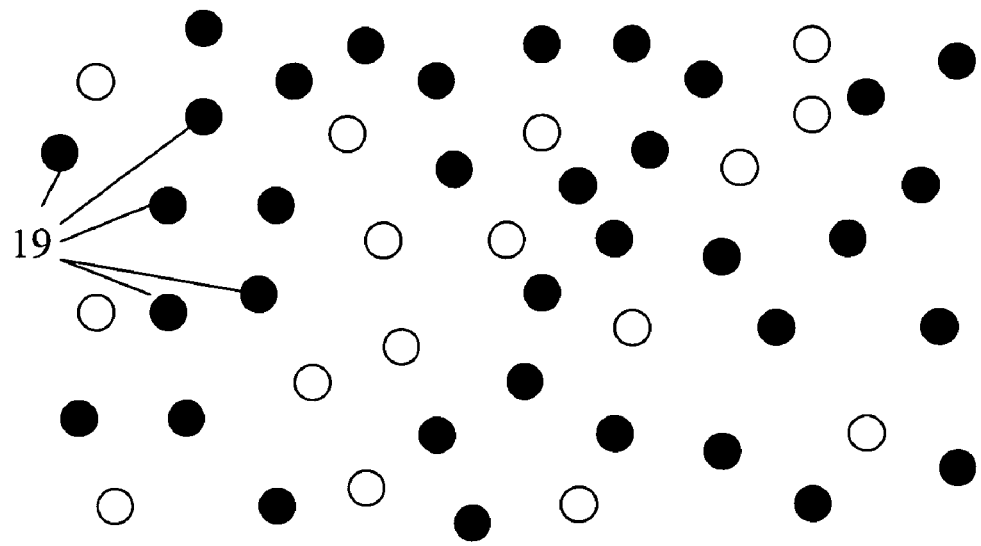
FIGS. 2A and 2B illustrate the effect of the signaling protocol according to an embodiment of the present invention.
Figure 2B:
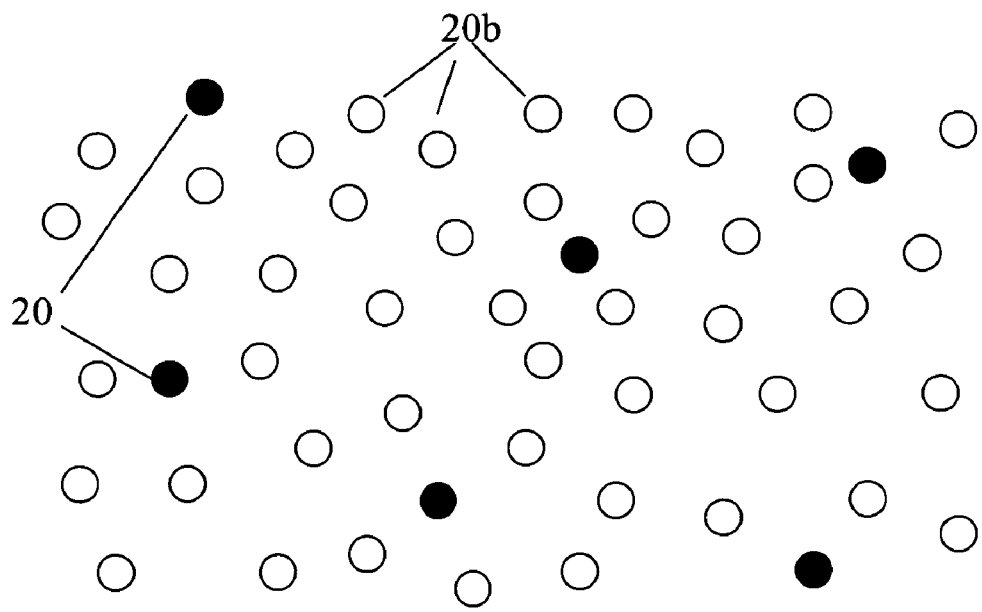

Access to the wireless medium is managed by the SCR protocol 1. All nodes that have traffic to send attempt to gain access at the same time. The SCR protocol 1 uses a signaling mechanism to resolve a subset of these nodes to actually send packets. FIGS. 2A and 2B illustrate the results. In FIG. 2A, a dense array of nodes with packets to send 19 is illustrated. The signaling portion of the SCR protocol thins this set of nodes to a subset of nodes 20 that are separated from each other, as illustrated in FIG. 2B. Many nodes 20B do not survive the signaling because they are determined to be insufficiently separated. The SCR protocol uses any of the controllable parameters of the physical layer to make the subsequent exchange of packets successful.

Synchronous Collision Resolution

Figure 3:
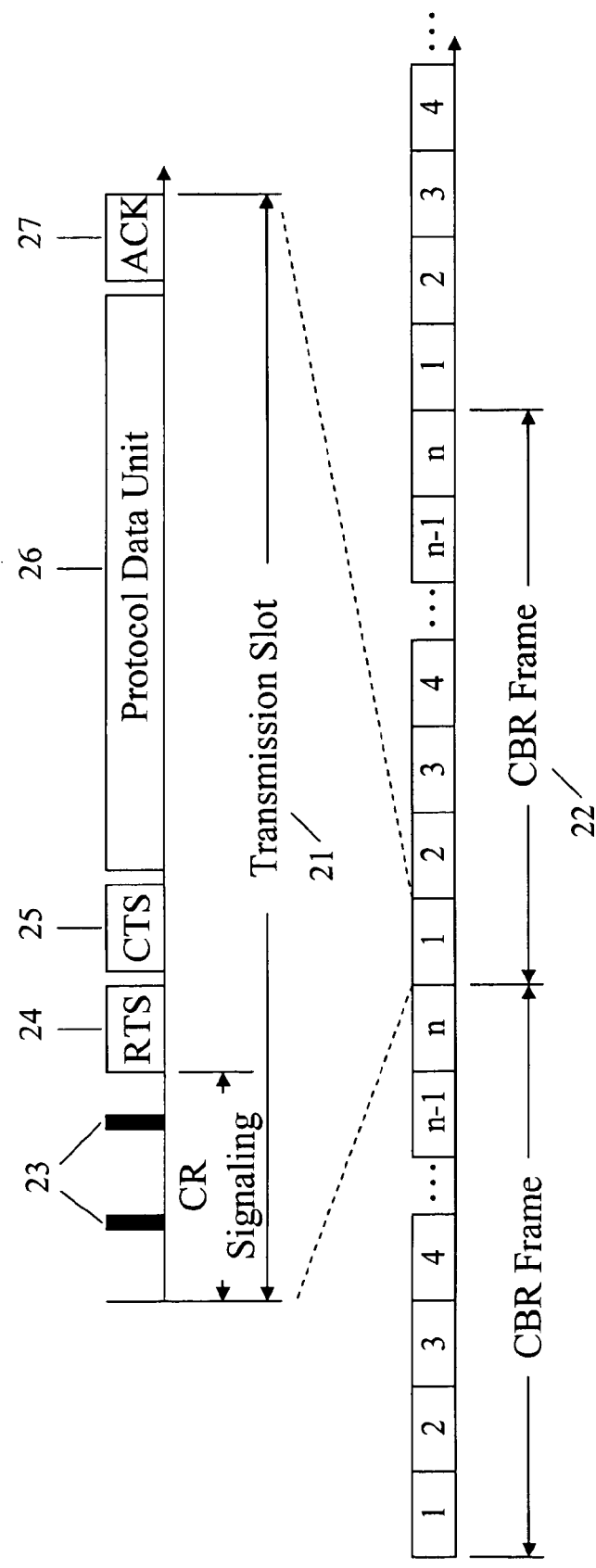
FIG. 3 illustrates the temporal organization of the wireless channel according to an embodiment of the present invention.

FIG. 3 illustrates the organization and operation of the SCR protocol according to an embodiment of the present invention. In this embodiment, the SCR protocol divides the access channel into a series of transmission slots 21 and further logically groups these slots into repeated frames that are called constant bit rate (CBR) frames 22. Rather than using a temporally random access mechanism, the SCR protocol requires all nodes to contend simultaneously and synchronously. The SCR protocol then uses a signaling protocol 23 similar to that used by HIPERLAN followed by a Request to Send (RTS) 24—Clear to Send (CTS) 25 handshake similar to that used in 802.11. Applying collision resolution signaling 23 in a synchronous manner provides several opportunities. The signaling itself allows the contending nodes to fairly resolve a set of dispersed nodes that can transmit simultaneously. The signaling provides a mechanism to resolve all potential sources to a smaller set that are spatially distributed to form a random cellular network as is illustrated in FIG. 2B. The RTS 24—CTS 25 handshake that follows insures that there are no hidden node collisions in the data transmission. A contending node that receives a valid CTS 25 response to its RTS 24 then transmits a protocol data unit (PDU) 26. A node that successfully receives the PDU 26 responds with an acknowledgment (ACK) 27. If the node sending the PDU 26 receives a valid ACK 27 then it considers the exchange successful, otherwise it reschedules the PDU for a subsequent transmission slot.

Two concepts that are important to distinguish in this description are that of the transmission slot 21 and the signaling slot. The transmission slots 21 occur at a regular interval and accommodate the transmission of a single packet. At the beginning of each transmission slot 21 is a signaling period 23 used to determine which nodes get access to the channel. This signaling period 23 is also slotted. These slots are referred to as signaling slots. FIG. 3 illustrates the relation of the signaling slots to the transmission slots 21. FIGS. 4A and 4B show the organization of the signaling slots into three different signaling phases 32, 33, 35.

Collision Resolution Signaling

Collision resolution signaling (CRS) uses signaling to select a single node to transmit data among multiple contenders when all nodes are within range of each other. In an embodiment of the present invention, multiple consecutive signaling phases and signals referred to herein as assertion signals are use. The signaling phases may have one or multiple signaling slots. In this embodiment, a receiver detects the presence of assertion signals, irrespective of the number of nodes that are simultaneously transmitting them. A node survives CRS by surviving all signaling phases. A node survives a signaling phase by not being preempted by another node's assertion signal according to the preemption rules of the signaling phase. Signaling phases may be one of two types, first-to-assert and last-to-assert. As the names imply, in first-to-assert phases the node that sends a signal first survives and in the last-to-assert phases the node that sends a signal last survives. A contending node that hears another node contend prior to itself in a first-to-assert phase will stop contending. A contending node that hears another node contend after it has already signaled in a last-to-assert phase will stop contending. Assertion signals may be one of two types, discrete or continuous. Discrete signals are sent within the space of a single signaling slot. Continuous signals may occur across several slots. In first-to-assert phases, an assertion signal begins at the selected slot to start signaling and continue until the end of the phase. In last-to-assert phases, the signal begins at the beginning of the phase and end at the selected slot. FIG. 4A illustrates a continuous signal and FIG. 4B illustrates the use of discrete signals. As illustrated, the first and third phases are first-to-assert and the second phase is last-to-assert.

The signals used for these signaling phases need only be detectable. It is possible to enhance the functionality of signaling by modulating information into the signaling. One modulation method is tone multiplexing. In tone multiplexing signals may be sent on different frequencies and nodes may alter their response based on the frequencies they sense. Embodiments of the present invention exploit this capability to enhance the capacity of the network.

Figure 5:
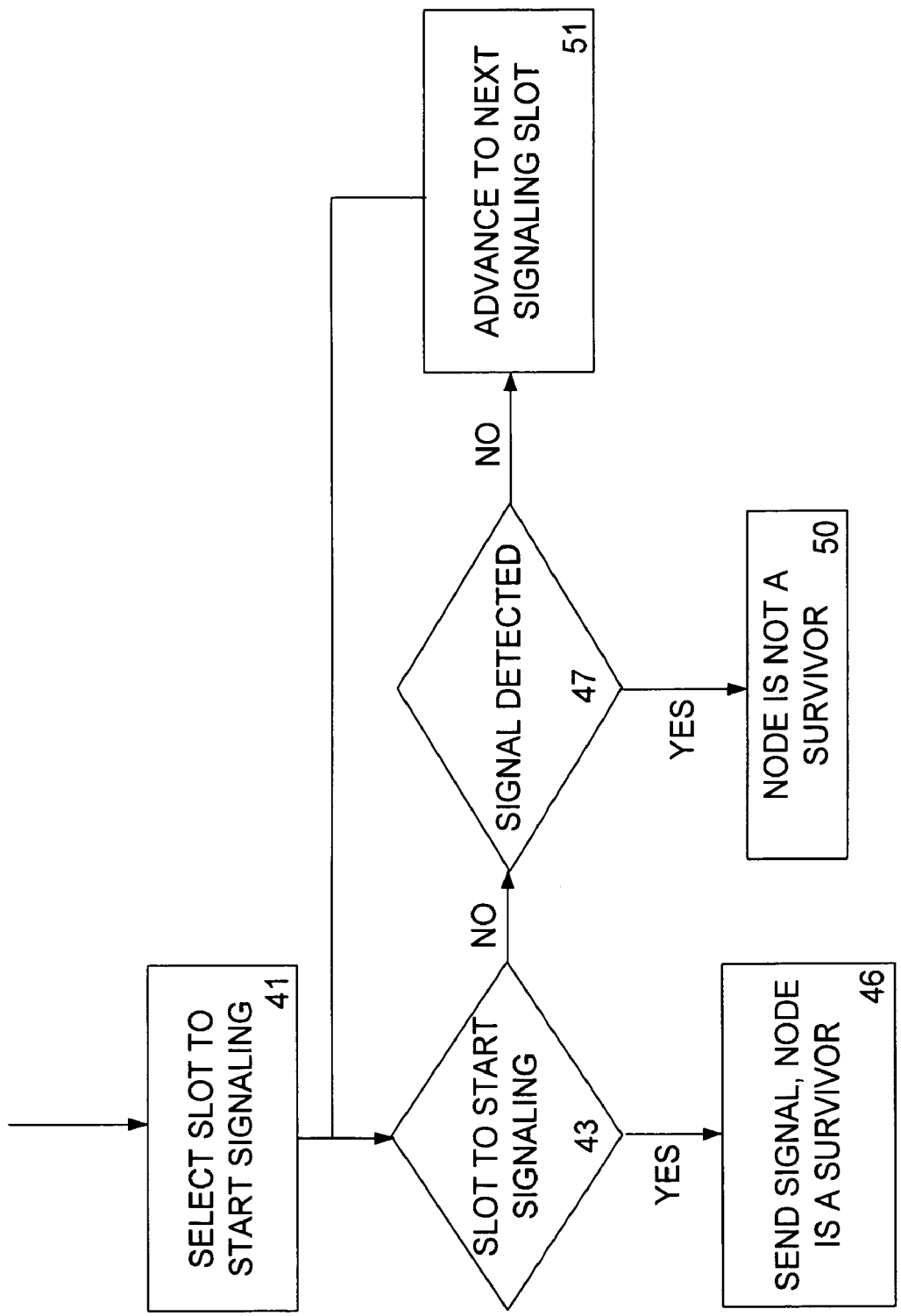
FIG. 5 is an illustrative flow chart of the first to assert signaling process according to an embodiment of the present invention.

FIG. 5 is an illustrative flow chart of the first to assert signaling process at a node. A node starts the process by selecting 41 a slot in the first to assert signaling phase to start signaling. Then at the beginning of the first slot the node inquires 43 if this is the slot that was selected to start signaling. If it is, the node starts signaling 46 and the node is considered a survivor of the phase. If it is not, the node listens 47 in the slot for another node's signal. If a signal is detected then the node stops contending 50 and considers itself to have lost the contention. If no signal is detected the node advances 51 to the next slot and repeats the slot checking process until it determines that it has arrived at the slot that was selected to start signaling. At this point, the node considers that it survived contention and begins signaling.

Figure 6:
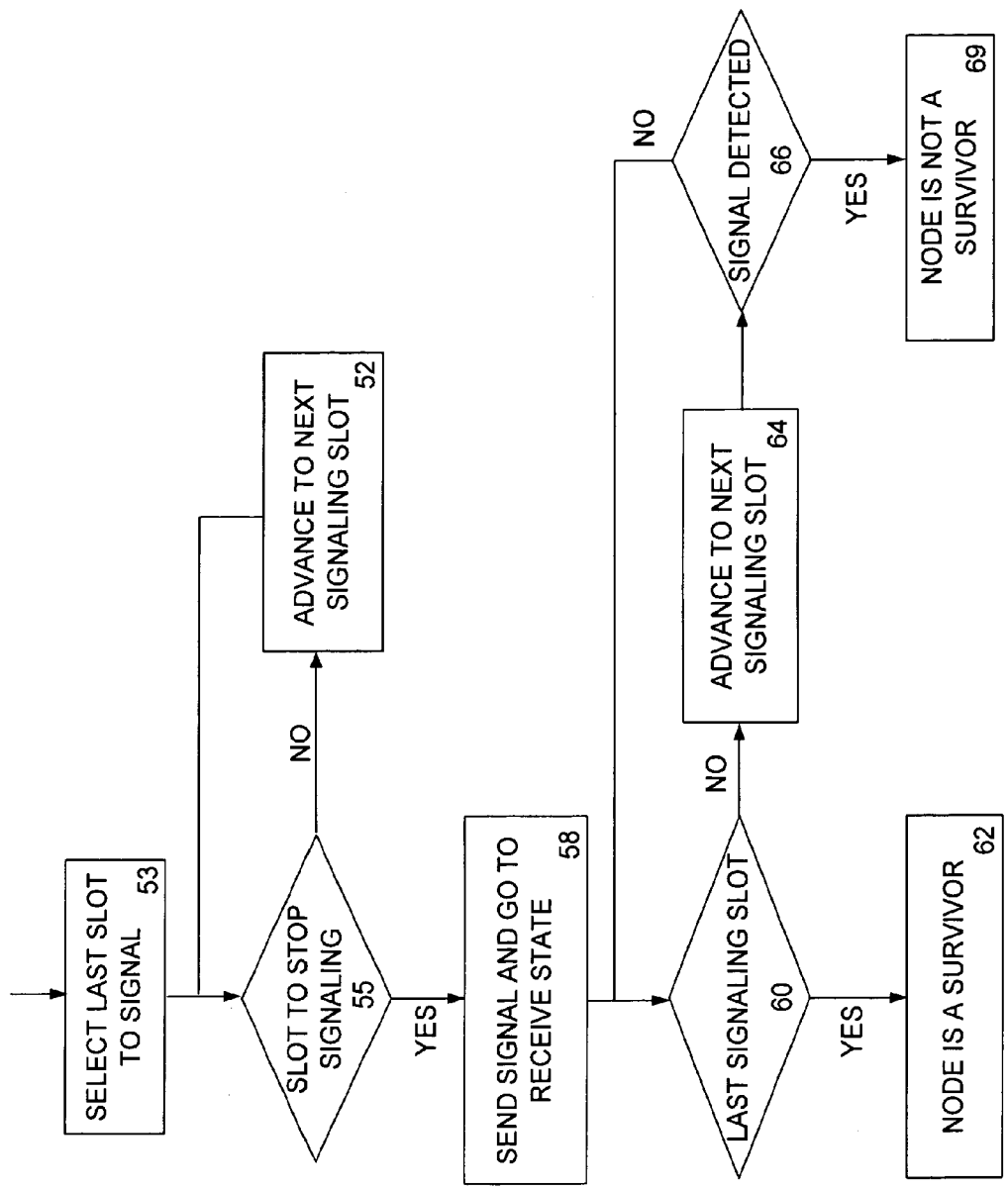
FIG. 6 is an illustrative flow chart of the last to assert signaling process according to an embodiment of the present invention.

FIG. 6 is an illustrative flow chart of the last to assert signaling process at a node. A node starts the process by selecting 53 a slot in the last to assert signaling phase to stop signaling. Then at the beginning of the first slot the node inquires 55 if this is the slot that was selected to stop signaling. If not, the node advances 52 to the next signaling slot and repeats the query. If it is the slot to stop signaling, the node sends 58 this last signal and stops signaling at the end of the signaling slot. The node then inquires 60 if this last slot was the last signaling slot of the last to assert signaling phase. If it was the last slot, then the protocol advances 62 and the node considers itself a survivor of the signaling phase. If not, the process advances 64 to the next signaling slot and listens for a signal. At the conclusion of the slot, the node inquires 66 if it detected a signal. If a signal is detected 69, it considers itself to have lost the contention. If a signal is not detected it returns 60 to the query that checks for the last signaling slot.

Figure 7:
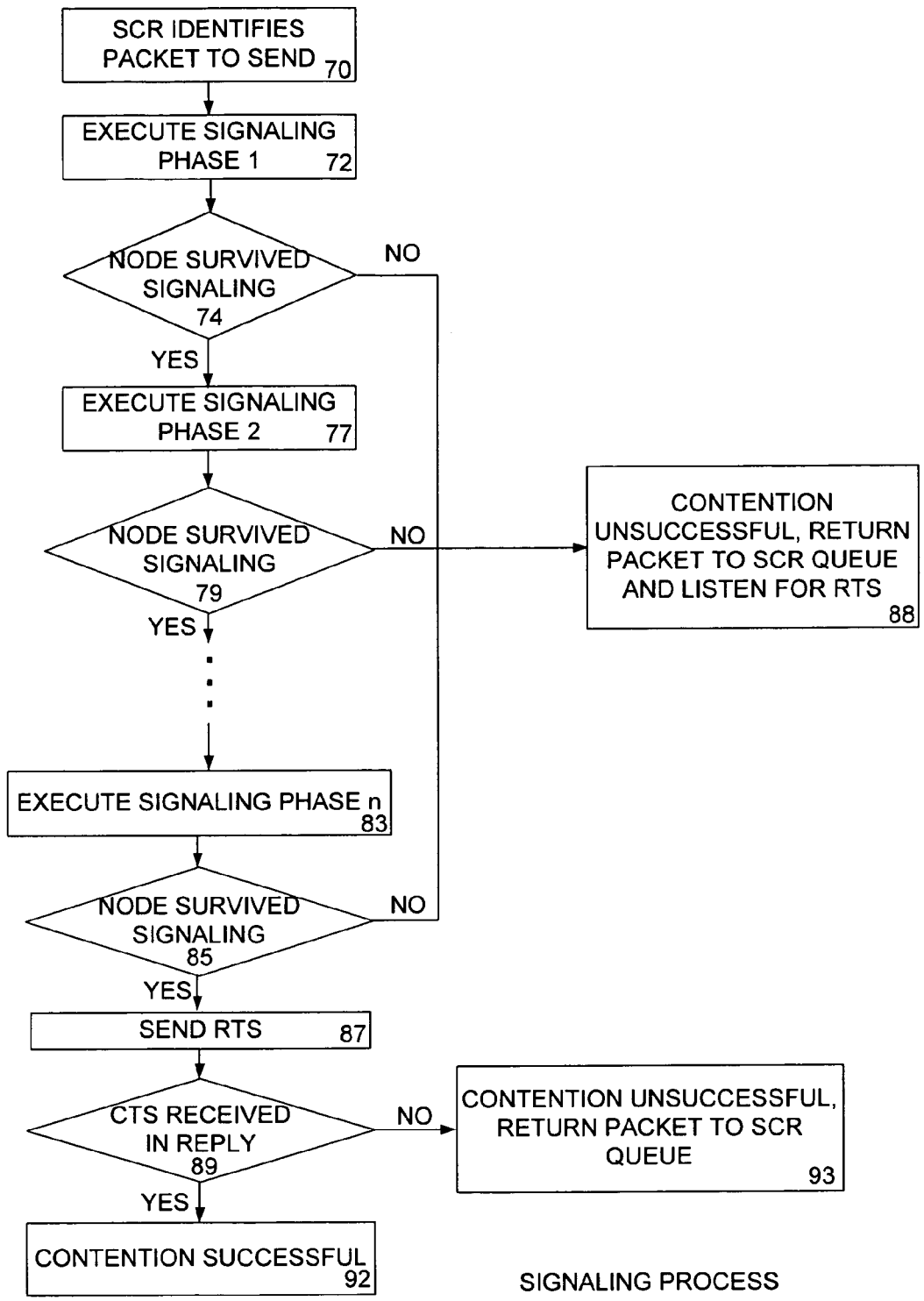
FIG. 7 is an illustrative flow chart of the generic signaling process according to an embodiment of the present invention.

FIG. 7 is an illustrative chart of the generic contention signaling process. The process starts 70 when a packet is forwarded to the SCR protocol, and with the node executing 72 the first signaling phase. This phase may be either a first to assert, FIG. 5, or last to assert, FIG. 6, signaling process. A check is made to determine if the node survived 74 the signaling phase. If the node did not survive the signaling phase, the contention is considered unsuccessful 88, the packet is returned to a queue, and the node listens for an RTS. If the node survives the signaling phase it advances 77 to the next signaling phase. This process repeats itself for each of the multiple cascaded signaling phases. The activities of second signaling phase execution 77 and $n^{th}$ signaling phase execution 83 are similar to those of first signaling phase execution 72. The activities of inquiring of node survival 79, 85 are similar to those of the inquiry of node survival 74 after execution of the first signaling phase, except the last inquiry of node survival 85 will advance (if the last signaling phase was survived) to sending 87 an RTS since the node has survived all the signaling phases. After sending 87 the RTS, the node listens 89 for a CTS and if a CTS is received in reply then the contention is considered successful 92. If a CTS is not received the contention is considered unsuccessful 93 and the packet is returned to a queue. In an alternate embodiment, an RTS-CTS handshake is not used. In this embodiment, the signaling contention is considered successful after the last signaling phase. In yet another embodiment, the exchange is considered successful only if an acknowledgement is received. An acknowledgment is exchange, for example, in cases where reliable packet exchange is necessary. In this embodiment, if an acknowledgement is not received the packet will be returned to the queue. After several failed exchange attempts for the same packet, that packet is destroyed by the SCR protocol.

Signaling may be designed in many ways by varying the number of phases, number of slots in phases, and the probability of signaling in each slot. The following is a generic discussion of how the performance of signaling at resolving contention may be determined.

A signaling phase comprises a number of signaling slots and the signal selection probabilities, i.e. the probability that a contender will assert himself in a given slot. A contending node chooses to transmit an assertion signal on a slot-by-slot basis during a phase. A contender will only send one assertion signal and may choose to send none, so for m slots there are m+1 possible signals. The probability that a node will select signal i is denoted by $p_i$. The last assertion signal of the series has probability 1. The option to not signal is equivalent to the last signal in a first-to-assert phase or the first signal in a last-to-assert phase. For a given phase design, the set of assertion signal probabilities is denoted by $p^x=(p_1^x, p_2^x, \ldots, p_{h-1}^x, 1)$, where h-1 is the number of slots in signaling phase x. Let $H^x$ be a random variable denoting the assertion signal which a typical contender asserts himself during signaling phase x, then for a vector of assertion probabilities $p^x$:

$$Pr(H^x = i) = p_i^x \cdot \prod_{j=1}^{i-1} (1 - p_j^x) \text{ for } i = 1, 2, \ldots h.$$

Suppose that $K^x$ nodes within range of each other are contending during signaling phase x, and let $S_f^x$ and $S_l^x$ be random variables denoting the number of survivors for this phase if it operates on the first-to-assert or last-to-assert principle. In this case the conditional probabilities of survivors is determined as follows $$Pr(S_f^x = s \mid K^x = k) = \binom{k}{s} \sum_{b=1}^{h} Pr(H^x = b)^s Pr(H^x > b)^{k-s} \; 0 < s \le k; \quad (1)$$

$$Pr(S_l^x = s \mid K^x = k) = \binom{k}{s} \sum_{b=1}^{h} Pr(H^x = b)^s Pr(H^x < b)^{k-s} \; 0 < s \le k. \quad (2)$$

Equation 1 should be interpreted as follows. In order to have s survivors out of k contenders in a first to assert phase s of them would have to signal concurrently on a given slot, say b, and the remaining k-s should choose to signal thereafter and thus be eliminated. Equation 2 expresses a similar concept when the phase operates under the last-to-assert principle. Thus, assuming a CRS design with n signaling phases and there are initially $K^1=k$ contenders, the probability that at the end there remains only 1 survivor is determined as follows:

$$Pr(S^n = 1 \mid K^1 = k^1) =$$
$$\sum_{s_1=1}^{k} \sum_{s_2=1}^{s_1} \cdots \sum_{s_{n-1}=1}^{s_{n-2}} Pr(S^n = 1 \mid K^{n-1} = s_{n-1}) \cdots Pr(S^2 = s_2 \mid K^2 = s_1)$$
$$Pr(S^1 = s_1 \mid K^1 = k^1).$$

An embodiment of the present invention comprises three signaling phases and two access signals as proposed in the HIPERLAN I standard and is illustrated in FIG. 4A. The first signal 31 starts at some point in the first (priority) phase 32 and ends in the second (elimination) phase 33. The second access signal 34 starts at some time within the third (yield) phase 35 and ends at the phase's end when a node starts to transmit a RTS. A node wins the contention by being among the first to start transmitting in the first phase, among the last to stop transmitting in the second phase and the first to start transmitting in the third phase. Nodes that recognize that they have lost the contention in any one of the phases will defer from attempting to gain access. An equivalent process can be implemented using discrete pulsed signals as illustrated in FIG. 4B. One pulse 37 corresponds to the start of the first signal 31 and another pulse 38 corresponds to the end of the first signal 31. A pulse 39 corresponds to the start of the second signal 34.

It is desirable to achieve a high probability of just one survivor after signaling using the fewest signaling slots possible. Following below is an analysis of the effect of varying the number of slots and the signaling probabilities on the survival probability. To simplify the analysis, only one signaling probability per phase is used.

The three phases in the exemplary embodiment are referred to as: priority, elimination, and yield phases. Each phase comprises an integer number of signaling slots that are denoted by h, l, and m respectively. A node with a packet to transmit will choose to start transmitting in one of the priority phase slots in the following manner. For each of the first h-1 slots, if a node has not sensed another node's access signal, it will chose to start its own transmission with probability 1-r. The quantity "r" is defined as the listening probability. If the node has not started to transmit prior to the $h^{th}$ slot and it has not sensed another node's access signal, it will start in the last slot with probability 1. Nodes that successfully start transmitting an access signal continue throughout the priority phase and into the elimination phase. The same technique is used for selecting a slot to end the access signal. A node stops transmitting in any of the first l-1 slots of the second phase with probability 1-q or stops on the $l^{th}$ slot with probability 1. The quantity "q" is defined to as the transmission probability. After the contending node stops transmitting, it listens to the channel and will defer its contention if it hears another node still transmitting an access signal. A slot 36 is reserved at the end of the elimination phase in which no signaling takes place. This slot allows nodes that transmit through the last elimination phase slot to verify their survival. It is called a survival verification slot. Finally, if a node is still contending, it will repeat the process used in the priority phase on the m slots of the yield phase but using a listening probability of p.

The slots in which a single independent node transmits in the priority phase, B, stops transmitting in the elimination phase, C, and starts in the yield phase, D, are random variables with truncated geometric distributions as follows:

$$Pr(B=b) = \begin{cases} (1-r)r^{b-1} & 1 \le b < h \\ r^{h-1} & b = h \end{cases} ; \quad (3)$$

$$Pr(C=c) = \begin{cases} (1-q)q^{c-1} & 1 \le c < l \\ q^{l-1} & b = l \end{cases} ; \quad (4)$$

$$Pr(D=d) = \begin{cases} (1-p)p^{b-1} & 1 \le d < m \\ p^{m-1} & b = m \end{cases} .$$

When k nodes contend for access they interact by listening to each other during each phase and the number of contenders decreases with each phase. The number of nodes surviving each of the three phases are denoted by V, W, and X, whose distributions are given by:

$$Pr(V=v \mid k) = \binom{k}{v} \sum_{b=1}^{h} Pr(B=b)^v Pr(B > b)^{k-v} \, 0 < v \le k; \quad (5)$$

$$Pr(W=w \mid V=v) = \binom{v}{w} \sum_{c=1}^{l} Pr(C=c)^w Pr(C < c)^{v-w} \, 0 < w \le v;$$

$$Pr(X=x \mid W=w) = \binom{w}{x} \sum_{d=1}^{m} Pr(D=d)^x Pr(D > d)^{w-x} \, 0 < x \le w.$$

The probability that only a single node survives when there are k contenders is given by $$Pr(X=1 \mid k) = \quad (6)$$

$$\sum_{v=1}^{k} \sum_{w=1}^{v} Pr(X=1 \mid W=w) \cdot Pr(W=w \mid V=v) \cdot Pr(V=v \mid k).$$

The priority and yield phases of this implementation are examples of first to assert phases. Nodes survive these signaling phases by being the first to signal. The elimination phase is a last to assert phase. Nodes survive this phase by being the last node to signal. This design is used in the following discussion on selecting the signaling parameters Selecting the Signaling Parameters In an embodiment of the present invention, six parameters define a collision resolution signaling design having the three phases of FIG. 4. These parameters comprise the number of slots in the priority, elimination, and yield phases (h, l, and m respectively) and the corresponding listening and transmitting probabilities (r, q, and p respectively). The tradeoff in the design is that more slots are more effective at insuring just a single node survives in a contention but results in more of the bandwidth of the channel being lost to overhead. The listening and transmitting probabilities are selected based on the number of slots used for the signaling.

Figure 8A:
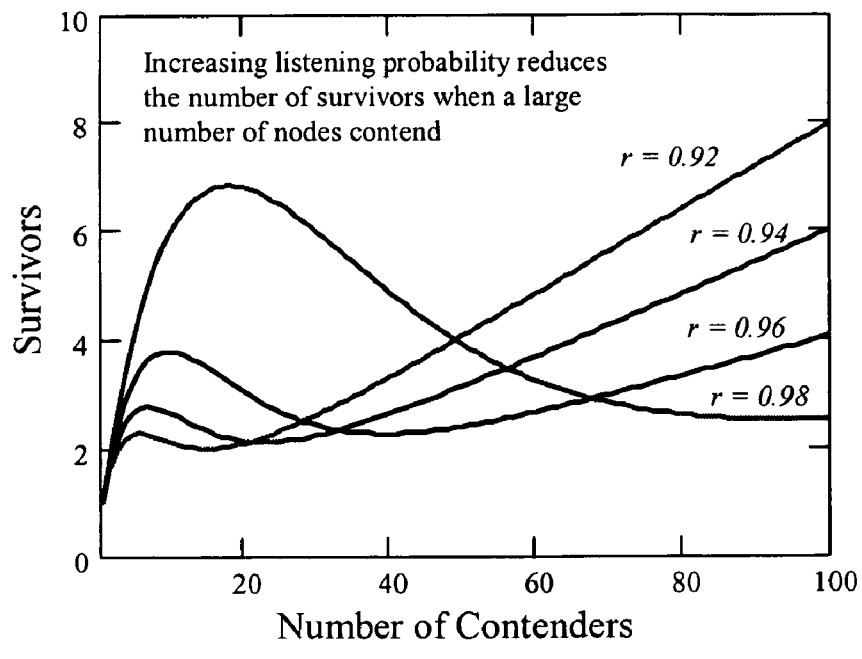
FIGS. 8A and 8B illustrate the effect of signaling parameters in first to assert signaling phases on the contending node survival rate according to an embodiment of the present invention.
Figure 8B:
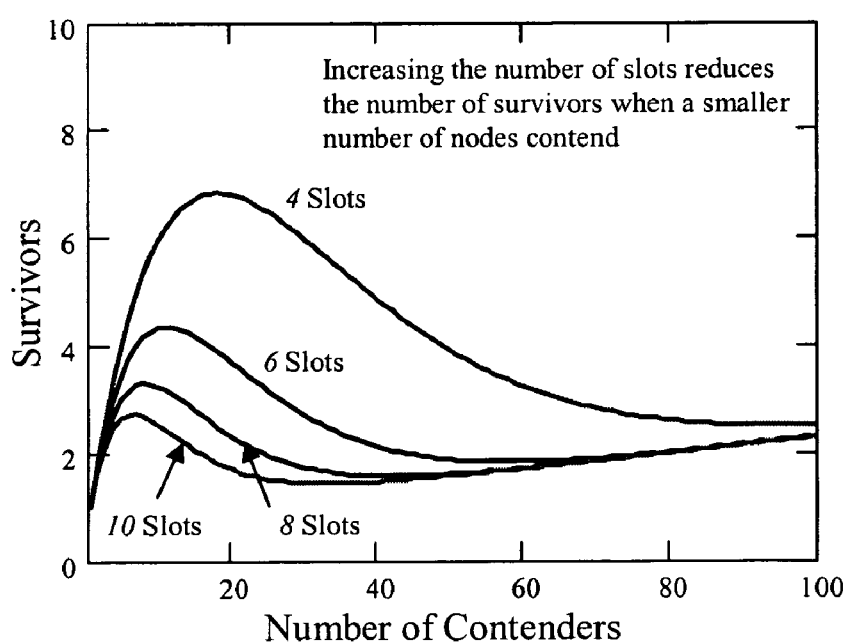
Figure 9:
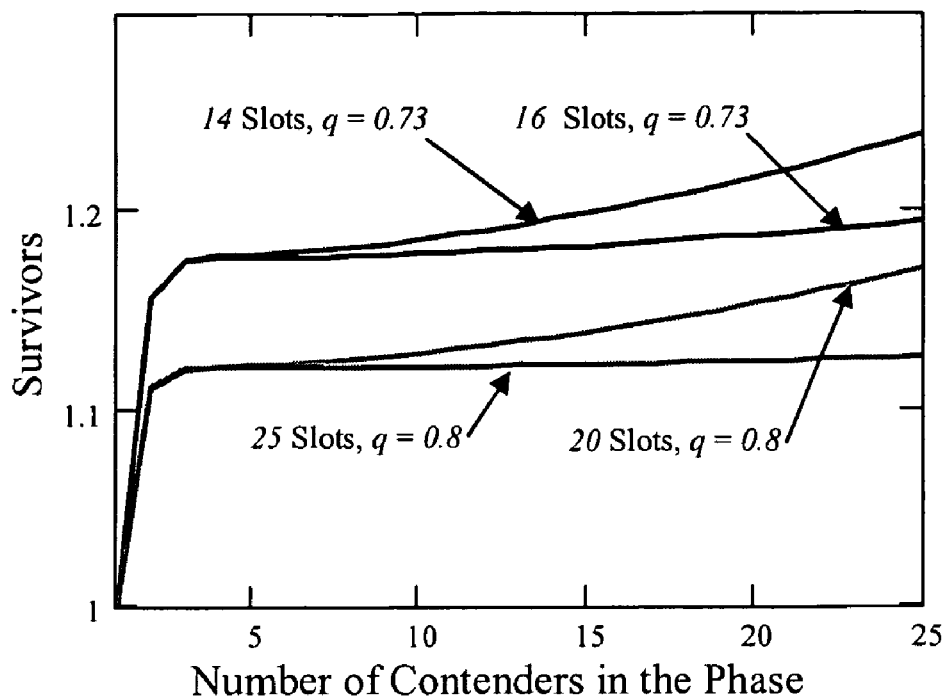
FIG. 9 illustrates the effect of signaling parameters in last to assert signaling phases on the contending node survival rate according to an embodiment of the present invention.

The signaling phases are classified in two types, "first to assert" or "last to assert." In first to assert phases the goal is for a small number of nodes to assert themselves first thus excluding the remaining nodes. In last to assert phases the goal is to gracefully allow nodes to stop transmitting such that there are a small number of survivors in the end. The characteristic performance of the two types of phases are illustrated in FIGS. 8A, 8B, and 9. The objective of this analysis is to determine how the number of contenders, the listening or transmission probability, and the number of slots affect the number of survivors of each phase. The first to assert and last to assert phases have different behavior. For a given set of parameters, i.e. number of slots and listening probability, first to assert phase survivor quantities have a relative maximum, followed by a relative minimum and then monotonically increase with the number of contenders. When the listening probability is increased (while keeping the number of slots constant), the relative minimum is reached at higher number of contending nodes. However, the relative maximum is also increased for a given listening probability. See FIG. 8A. For a given listening probability, increasing the number of slots reduces the relative maximum. See FIG. 8B.

In last to assert phases, the survivor quantity increases monotonically; however, it has a region where the performance is nearly flat. Increasing the transmission probability reduces the initial survivor quantity at the expense of reducing the range of the flat region. Increasing the number of slots extends the flat region. See FIG. 9.

The objective of using multiple signaling phases is to use the initial phases to thin out the contenders and then to use the final phase to isolate a single winner. In an embodiment of the present invention, thinning out is accomplished using just a few signaling slots in the first phase. Note that in FIG. 8A that four slots and a listening probability of 0.96 will result in an expected number of survivors that varies by just 2 for a range of 4 to 100 nodes contending. The intermediate phases then seek a low survivor quantity for the expected range of survivors from the priority phase. In the end, the final phase uses a large number of slots and a high listening probability to isolate just one node. The effectiveness of collision resolution signaling can always be improved by adding more phases and more slots to any of the phases. Also for any number of slots used, the transmission and listening probabilities can be chosen either for consistent success rates for a wide range of contending nodes or to aggressively seek higher success rates at the expense of less consistency. As will be apparent to those skilled in the art, the selection of any specific number of phases, slots per phase, or probabilities per slot does not create a new protocol that would depart from the scope of the present invention.

Figure 10:
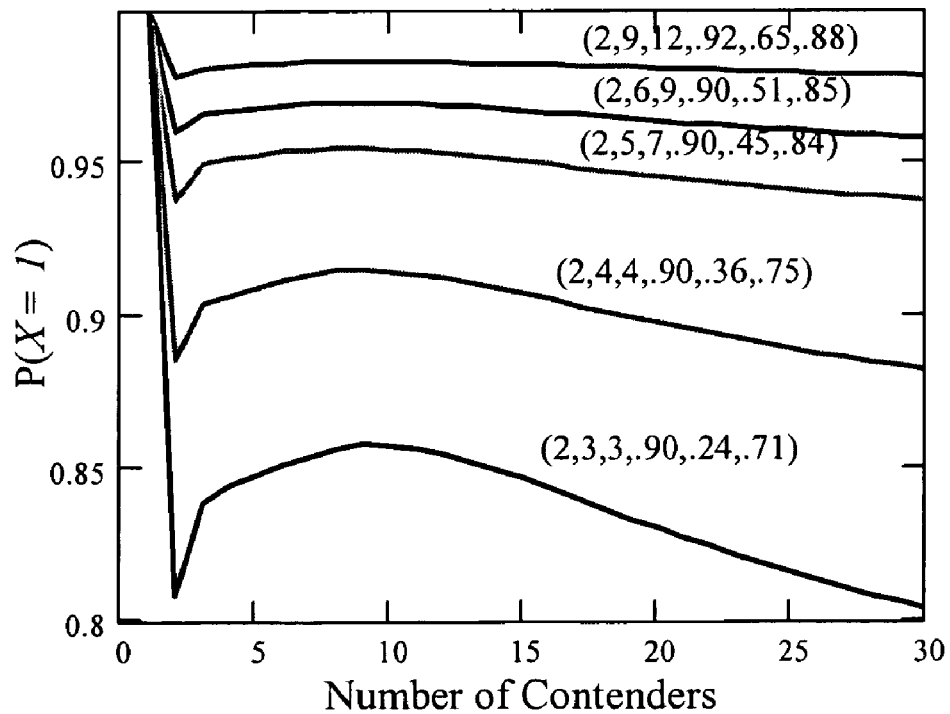
FIG. 10 illustrates the effect of different sets of signaling parameters and different numbers of contending nodes on the probability that just one node survives according to an embodiment of the present invention.

FIG. 10 plots the results of Equation 6 for several sets of signaling parameters. With as few as 8 signaling slots the signaling can result in a single contention winner more than 80% of the time. These results extend to the set of nodes that are not within range of each other and represent the probability that a surviving node is the sole survivor within its transmission range. Another result of the signaling protocol is the resolution of a subset of contending nodes that are separated from each other as illustrated in FIG. 2. These characteristics are illustrated below in the examples section of this Application.

RTS-CTS Exchanges

In an embodiment of the present invention, the SCR protocol addresses the hidden node problem by using an exchange of RTS 24 and CTS 25. However, rather than relying on the timing of RTS-CTS exchanges to suppress other contending nodes, the SCR protocol relies on collision resolution signaling to suppress other contenders. RTSs and then CTSs in the SCR protocol are transmitted simultaneously to test whether current capture conditions will support successful reception of subsequent packets in an environment with hidden nodes. To demonstrate that this approach prevents collisions while enabling efficient use of capture to promote spatial reuse, the following assumptions are made:

Assumption 1: RTS packets are transmitted simultaneously.

Assumption 2: CTS packets are transmitted simultaneously.

Assumption 3: The network uses fixed sized data packets and fixed sized intervals between RTS 24, CTS 25, data packet 26, and acknowledgement 27 transmissions, so packets 26 and acknowledgements 27 are transmitted simultaneously.

Assumption 4: A node will never transmit data using a higher power than it uses in transmitting the RTS 24 or the CTS 25.

Assumption 5: Channel characteristics remain constant throughout the transmission slot.

Source nodes transmit packets if there is a successful RTS-CTS handshake (See FIG. 3). Since RTS 24 and CTS 25 transmissions are sent simultaneously, so too are packets and acknowledgements. Collisions cannot occur between acknowledgements and data packets. A destination's successful reception of an RTS 24 transmission from a source indicates it will also successfully receive a data packet transmitted from that source. A source's successful reception of a CTS 25 from a destination indicates that it will also successfully receive an acknowledgement from that destination. Therefore, a successful RTS-CTS handshake indicates that the subsequent data packet 26 and acknowledgement 27 transmissions will not fail on account of collisions.

The RTS-CTS handshake, by option, may be revised for broadcasted packets. Broadcast packets are packets that are transmitted from one node to all destinations within its range. A node that is broadcasting a packet cannot distinguish multiple CTS packets 25 from these destinations so it cannot use the receipt of a CTS 25 to verify that any particular destination has received its RTS 24. Therefore, a node with a PDU 26 to broadcast will transmit it despite the results of the RTS-CTS handshake. Destination nodes that receive an RTS 24 for a broadcast packet may optionally respond with a CTS 25. This option is a network wide choice that will depend on other network options that are selected. The choice of this option is based on whether the suppression characteristics of the multiple CTSs being transmitted simultaneously are desirable.

Hidden Node Blocks

Figure 11:
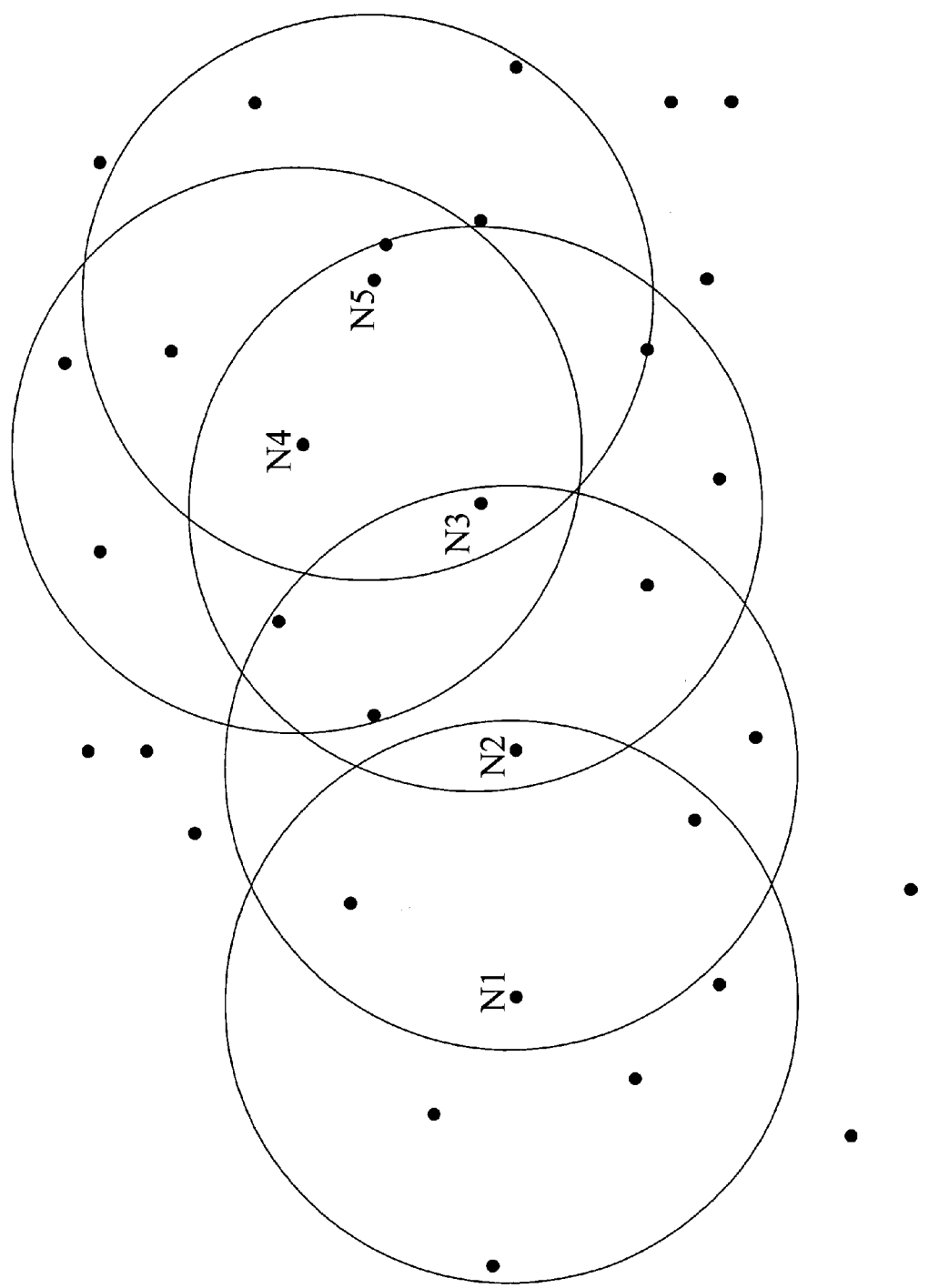
FIG. 11 illustrates an example scenario of contending nodes where blocking may occur according to an embodiment of the present invention.

Low node densities and low loads in networks using the SCR protocol can cause an adverse condition called hidden node blocking. This occurs when nodes out of range of each other attempt to gain access to the same destination and there are no other nodes within range of these that are also contending. As a result, the nodes survive signaling but block each other at the destination. As an example, refer to FIG. 11. Each dot represents a node and the circles are the transmission ranges of nodes N1 through N5. Consider what would happen if nodes N1 and N3 are the only nodes contending and their packets are both intended for N2. Their signaling would not interact with any other nodes and both would gain access but their transmissions would interfere with each other at N2 and block each other. This would continue slot after slot since there is no backoff mechanism. Now consider what would happen if N4 and N5 started to contend. Their signaling could suppress N3 thus allowing N1 to successfully exchange data with N2. N2 could then exchange its packet in a subsequent slot. The blocking problem is most prevalent in low density and low load networks.

An embodiment of the present invention addresses this problem by increasing the range of the signaling mechanism in anticipation that it will interact with the other nodes forming the block. A node that senses it is being blocked can simultaneously increase the transmission power it uses in signaling while decreasing the threshold level it uses to detect a signal. The success of this technique is dependent on whether signaling is bi-directional. If all nodes involved in the block implement this procedure then at some point they should have bi-directional interaction. The effectiveness of this method is limited by the transmission power, and whether interaction is limited by obstacles between the nodes blocking each other.

In another embodiment, the hidden node blocking is addressed by introducing a signal echoing procedure. Nodes that are not contending or have lost the contention, echo first to assert signals starting the first slot after they hear the signal themselves. The effectiveness of this procedure at breaking blocks is dependent on the number of slots and the listening probabilities used in the first to assert phases and is modeled by the equation $$Pr(X = 1 \mid W = w) = w \sum_{d=3}^{m} Pr(D = d) Pr(D > d + 1)^{w-1}.$$

Selecting Parameters to Break Hidden Node Blocks

Figure 12:
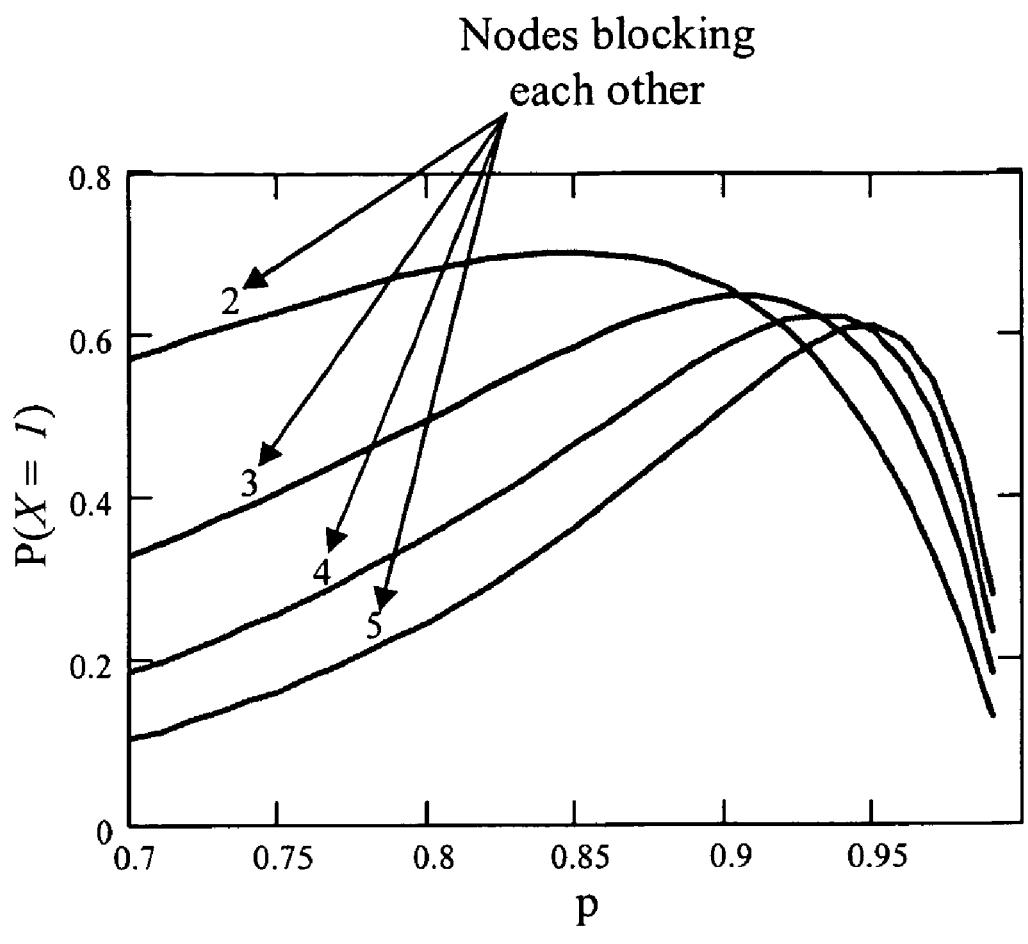
FIG. 12 illustrates the probability that signal echoing will break a block for different numbers of blocked nodes as a function of listening probability according to an embodiment of the present invention.

FIG. 12 illustrates the effect of different listening probabilities ($p_i$ the same for all slots of the phase) on the ability of signal echoing in a 9 slot yield phase to break a block for 2 to 5 nodes forming the block. As illustrated, there is an optimum listening probability for each quantity of nodes that form a block. The optimum occurs at a lower probability when there are fewer nodes blocking each other. The optimum for when two nodes block each other was the same or very close to the listening probability resolved to when choosing parameters for consistent access performance. Since the event of more than two nodes blocking each other will be rare, it is recommended to select the listening probability of the yield phase to optimize the effectiveness of signal echoing to resolve two nodes blocking each other. However, this is not meant as a limitation. Table 1 lists the results of selecting parameters for the yield phase by this recommendation and the corresponding block breaking probabilities.

TABLE 1

Echoing success probabilities at breaking hidden node blocks

| Yield Phase Signaling Parameters | | Block Breaking Probabilities Nodes Blocking Each Other | | | |
|---|---|---|---|---|---|
| M | p | 2 | 3 | 4 | 5 |
| 12 | .88 | .76 | .66 | .55 | .46 |
| 11 | .87 | .74 | .64 | .52 | .43 |
| 10 | .86 | .72 | .61 | .50 | .40 |
| 9 | .85 | .70 | .59 | .47 | .37 |
| 8 | .84 | .67 | .56 | .44 | .34 |
| 7 | .82 | .64 | .52 | .40 | .31 |
| 6 | .81 | .59 | .48 | .36 | .27 |
| 5 | .79 | .53 | .43 | .32 | .22 |
| 4 | .75 | .44 | .34 | .23 | .16 |
| 3 | .71 | .29 | .22 | .15 | .09 |

Implementing signal echoing all the time can adversely affect capacity, as it will suppress many that could be successful. For example, in FIG. 11, N2 could echo N1's signal, followed by N3 echoing N2's signal resulting in the suppression of both N4 and N5 from gaining access. If all nodes in range of N1 echoed N1's signal many more contentions may be suppressed. In an embodiment, the signally echo is triggered by the detection of a block. In this embodiment, detection that a block is occurring comprises detaching a strong but unintelligible signal. However, this is not meant as a limitation. As will be apparent to those skilled in the art, any other method to trigger the use of echoes may be used without departing from the scope of the invention. When a block is detected, echoing is initiated for some number of transmission slots that follow.

Additional Services

Figure 13:
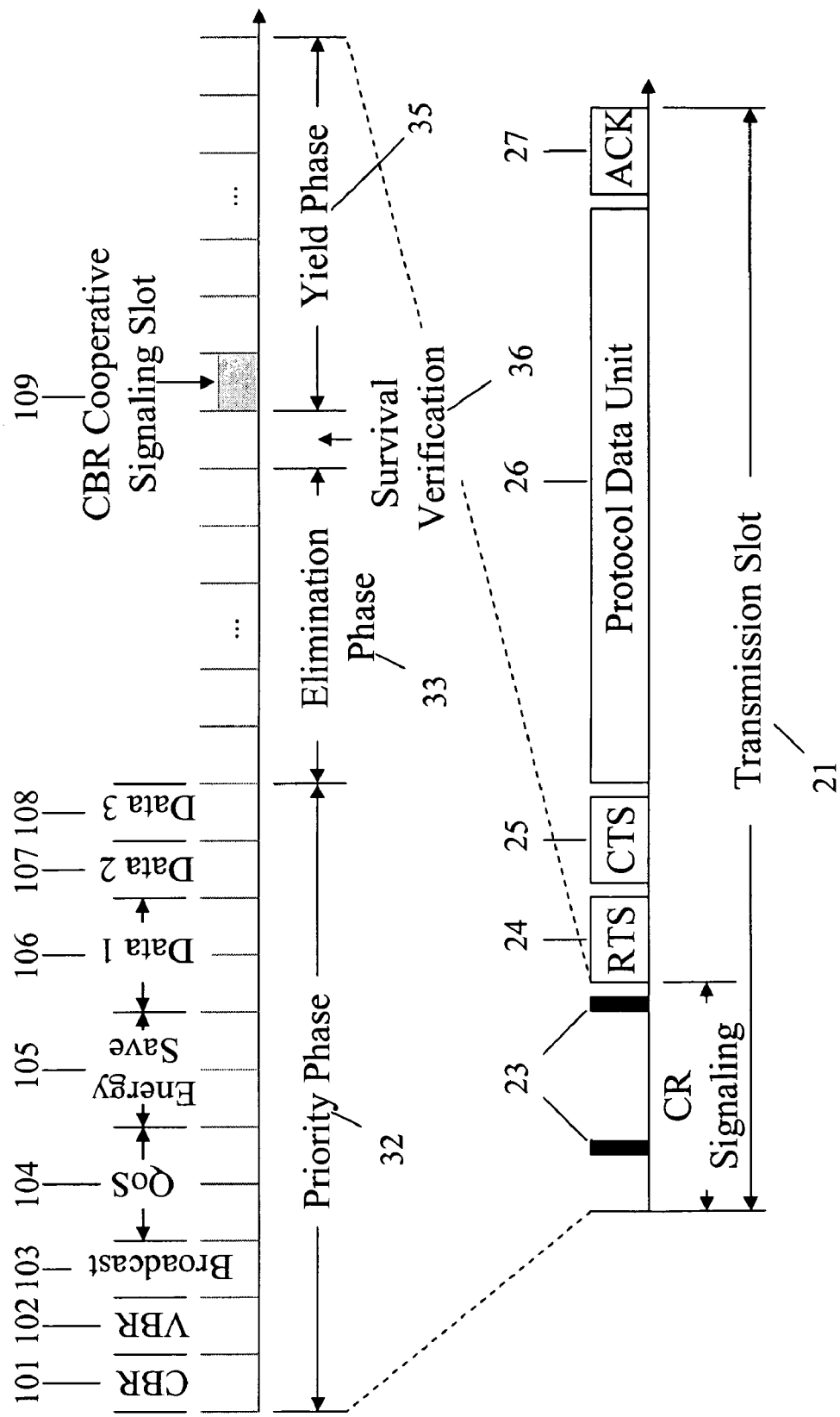
FIG. 13 illustrates an example signaling design to support SCR's special services according to an embodiment of the present invention.

The signaling mechanism can be modified to provide additional services. These modifications can be used electively depending on the application of the network and the capabilities of the physical layer. FIG. 13 illustrates an example of all the services integrated together.

Quality of Service (QoS)

In an embodiment of the present invention, the first to assert phases are used to distinguish QoS. Since signaling first in the priority phase gives precedence in gaining access, QoS is provided in this embodiment by managing which slots nodes can use in the priority phase. So to provide QoS the priority phase is divided into priority groupings 101, 102, 103, 104, 105, 106, 107, 108. A node that is contending to send traffic chooses the group that corresponds to the QoS required for the packet the node is trying to send. If its packet requires a higher QoS than any other packet at any other node within its range then it is assured of gaining access. If other nodes within range use a higher priority group for access then it will not gain access, and if other nodes use the same priority group then access will be determined by the rest of the signaling. In an embodiment, each priority group comprises a single slot. In an alternate embodiment, each priority group comprises a plurality of slots. In this embodiment, the contending nodes using that priority group will select the slot to start its signal using the probabilities assigned to those slots. Since the optimum listening and transmission probabilities are sensitive to the number of slots used in each phase, different probabilities may be associated with each priority group. The number of groups and selection of priority is application specific and can be based on a packet's time to live parameter or be based on the operational function of the packet.

By way of illustration, and referring to FIG. 13, the data priority groups, 106, 107, 108, are all for best effort peer-to-peer packets but distinguish priority based on time to live. Packets with shorter time to live get higher priority. Additionally, a packet that is broadcast to all neighbors has a higher priority group 103 than other best effort packets 105, 106, 107, 108. In yet another embodiment, the priority group is determined based on the network application. For example, in a military network, a warning message of an enemy aircraft attack may take precedence over a routine e-mail message.

As will be apparent to those skilled in the art, the use of priority groups can be leveraged to provide services in addition to QoS based on priority of access as described above. These include the ability to reserve resources, support real time traffic transmission, manage the use of orthogonal channels, and conserve energy.

Reserving Resources and Supporting Real Time Traffic

Another embodiment of the present invention is, the reliable transmission of stream-based traffic, both constant bit rate (CBR) and the more bursty variable bit rate (VBR) traffic using periodic frames, a priority access scheme, and a specialized signaling mechanism. FIGS. 1 and 13 illustrate their organization. The periodic frame is called a Constant Bit Rate (CBR) frame 22 since it is repeated at a rate that allows a single transmission slot in each frame to support the lowest desired CBR rate. In an alternate embodiment, a node achieves a higher CBR rate by using more than one transmission slot per CBR frame 22.

Three groups of signaling slots are associated with stream-based services. A node first contends for such services using the QoS priority group. If the node is successful it can then assert priority in gaining access to the same transmission slot in the next CBR frame using the CBR signaling slot 101. Since a node can only use a CBR signaling slot 101 if it had accessed the same transmission slot in the previous frame it is assured that it is the only node in its transmission area that can contend with this signaling slot. In this manner a source node effectively reserves a specific slot in each CBR frame 22. Depending on the bandwidth required, this source node repeats the process to reserve additional transmission slots in the CBR frame 22. As will be apparent to those skilled in the art, the cascading of multiple CBR and QoS reservation slots to support multiple priorities of CBR service and preemptive access may be implemented without departing from the present invention. Similary, using signaling without the reservation mechanism does not depart from the scope of the present invention.

In an embodiment of the present invention, a VBR stream is serviced using a combination of a CBR stream and a variable number of additional transmission slots that respond to the bursty nature of the stream. In this embodiment, nodes requiring VBR service first contend and reserve transmission slots 21 in the same manner as the CBR streams and then use the VBR signaling slot 102 to access transmission slots to send the bursty overflow. The right to use the VBR signaling slot 102 is reserved to those nodes that already have CBR access within the frame.

A source node can only reserve a transmission slot in its transmission range, thus there is a risk that a contender outside a source's transmission range but within that of the destination may interfere. To assure both source and destination priority in CBR contentions, an embodiment of the present invention comprises a mechanism that allows the destination node to clear contenders from the area within its range. A destination node determines that it is the recipient of CBR traffic, i.e. the destination node determines that the CBR signaling slot was used to gain access and that the destination node was the destination of the traffic sent in the same transmission slot 21 of the previous CBR frame 22. Under these conditions the destination node also participates in the signaling protocol. In an embodiment of the present invention, the highest priority signaling slot of the last phase is reserved for cooperative signaling (i.e. the first slot of a first to assert phase or the last slot of a last to assert phase). Both the source and the destination send an assertion signal in this phase using this slot. Referring to FIG. 13, both the source and destination start their assertion signaling in the yield phase with the CBR cooperative signaling slot 109. Since only CBR traffic can use this signaling slot 109, the CBR traffic receives priority over all other contentions. The rest of the exchanges in the transmission slot 21 are the same. As will be apparent to those skilled in the art, the assigning of the cooperative signaling slot to any other signaling phase that gives the desired effect of insuring sources and destinations of CBR traffic are the sole survivors of the contention phase does not depart from the scope of this invention.

The mechanism for reserving resources described above will result in fewer exchanges per area than the standard access method. However, the predictability of source-destination association offers the opportunity to pull this traffic entirely off the base channel. In another embodiment of the present invention, nodes that have established a CBR association use different tones in signaling and different channels in packet exchanges. As a result, neither their signaling nor their packet exchanges affect their neighbors. When the unique tones are no longer used in signaling, the nodes immediately participate in the normal signaling process. This technique of pulling CBR traffic to a different channel allow the CBR reservation mechanism to be used as a method to enhance capacity. Additionally, depending on the orthogonality of CBR channel, the source-destination pair can exchange data without using the RTS/CTS handshake thus allowing a higher effective data rate for the data exchange.

In still another embodiment of the present invention, the channels that are available for CBR exchanges are associated with particular tones. Since every node can detect the use of the tones, the node that establishes the CBR connection can identify the channels that are in use in the first transmission slot that it gains access. The tones in use are monitored in the CBR signaling slot that precedes the QoS signaling priority group that is used to gain this first access. As part of this first packet exchange, the source node specifies the channel that is to be used for the CBR connection.

Coordinating the Use of Different Channels

A transmission to a destination is successful if it is captured by that destination. The ability to capture a signal is dependent on the ratio of the signal strength to the background noise level and to the interference from other transmitters. In an embodiment of the present invention, the deleterious effect of interference is reduced by using different channels for each source destination pair to exchange RTS packets 24, CTS packets 25, PDU packets 26, and ACK packets 27. By way of illustration, a channel in this sense comprises a different frequency, a different pseudo noise spreading sequence for a direct sequence spread spectrum (DSSS) system, or a different hopping sequence for a frequency hopped system. As will be apparent to those skilled in the art, any other method to separate channels may be used without departing from the scope of the present invention. In this embodiment, the signaling 23 is performed on a common channel such that all nodes form a single network. Placing nodes on different channels permanently would partition the network. As noted above, in this exemplary embodiment, different tones, can be distinguished on the common channel. To assure that at the conclusion of signaling a node selects the correct channel, receiver directed channels are used for point-to-point communications and a common code is used for all broadcasted packets. Each node selects its own receiver channel and disseminates that selection to all other nodes in the network. At the conclusion of signaling, surviving nodes 20 (refer to FIG. 2B) will use either the broadcast channel for a broadcasted packet or the receiver directed channel of the node to which it is trying to transfer a point-to-point packet. Non-survivors 20b (refer to FIG. 2B), are potential destinations and listen either on the broadcast channel or their own channel. In this embodiment, non-survivors distinguish which channel to use by identifying which priority signaling group is used to gain access. To distinguish between point-to-point and broadcast packets a separate priority group is added for broadcasted packets 103. A node desiring to broadcast a packet must use the broadcast priority group 103 to gain access. A non-surviving node will listen for packets after signaling using the channel that corresponds to the highest priority group that the non-surviving node sensed being used in signaling. If the broadcast priority group 103 is used then the non-surviving node uses the broadcast channel, otherwise, it uses its own receiver directed channel. In an alternate embodiment, a broadcast channel is used for constant bit rate (CBR) transmissions. A-node desiring to broadcast CBR traffic will first use the broadcast priority group 103 to gain access and as described above will then use the CBR priority group 101 in the same transmission slot 21 of subsequent CBR frames 22. In all of these transmissions, this node will use the broadcast channel to transmit the packets. Non-surviving nodes must also listen on the broadcast channel if they sense the CBR priority group being used in a transmission slot 21 of a CBR frame 22 when it had received a broadcasted packet in the same slot of the immediately preceding frame.

In another embodiment of the present invention, a network does not have enough channels for every node to have its own unique channel. Some nodes may have to share a channel. This embodiment, channel selection proceeds as follows. Each node must disseminate the channel it has selected as well as the channels of all of its immediate neighbors to nodes it can hear. From these packets each node can identify all the channels being used by nodes up to two hops away. With this list of channels, a node may take several actions. If the channel this node has selected is not being used by any of its neighbors then it does nothing. If a neighbor is also using the channel, then the node attempts to select a channel that is not being used. It randomly selects a channel from the set of channels that are not being used, broadcasts this channel to its neighbors and then begins using it. If there are no channels that are not being used then the node randomly selects a channel from the entire list of channels, broadcasts this channel to its neighbors and then begins using it. Since this latter mechanism can cause a node to flood the channel with these types of broadcasted channel selection packets (the new channel is guaranteed to interfere with another node's selection), a throttling mechanism is utilized to limit the rate at which a node can change its receiver directed channel by establishing some minimum interval between updates. Until a node broadcasts a channel change it will continue to use its previous channel selection.

Coordinating the Use of Multiple Transmitters

The effect of signaling is to physically separate sources so that no signaling survivors are potential destinations. It is possible that multiple packets will exist at a signaling survivor for each of several nodes in this region of no sources. In an embodiment of the present invention, a signaling survivor transmits separate packets to several of these nodes using separate transmitters. The CR signaling is performed using just one transmitter, and the transmission of each packet is executed using separate transmitters each of which uses a separate receiver directed channel. The signaling transmitter acts as the master and the remaining transmitters as slaves. Once the signaling transmitter has identified that it has survived signaling, it directs the remaining transmitters to continue in the remaining activities of the transmission slot.

Coordinating the Use of Directional Antennas

The use of directional antennas reduces the geographic footprint of electromagnetic radiation. Since the success of the 4-way handshake, RTS-CTS-PDU-ACK, is dependent on the interference conditions, directional antennas can improve capacity because they reduce the geographic area over which a transmission interferes. Directional antennas can be employed in all transmissions but generally they are not used in CR signaling.

The challenge in using directional antennas in ad hoc networks is determining the direction in which to point them. If a source has identified where its destinations are, the source can then use this information to point its antenna. Destinations can point their antennas based on the identity of their sources and knowledge of the directions to the sources or they can point their antenna based on direction of arrival calculations of received signals. The method used to determine direction of arrival depends on the type of directional antenna. Directional antennas may be sectorized antennas, each associated with a separate transceiver or be formed using multielement arrays. In an embodiment of the present invention, a destination determines the direction of arrival by measuring which transceiver receives the strongest signal. In an alternate embodiment, the transceiver determines the direction of arrival using a signal processing algorithm such as the Multiple Signal Classification (MUSIC) algorithm.

According to an embodiment of the present invention, once a node has survived signaling it transmits the RTS using its best estimate of the direction to the destination. The destination receives this signal, makes an estimate of the direction of arrival and then transmits its CTS to the source pointing its antenna toward the source. From this point forward, both source and destination may point their antennas toward each other. The use of directional antennas is not dependent on all nodes having directional antennas. Any use of directional antennas will enhance the performance of the protocol.

Energy Conservation

Additional embodiments of the present invention comprise methods to assist transceivers to use low energy states: default dozing, periodic dozing, and coordinated dozing. Each method is designed such that a node waking from the dozing state can quickly determine if it may return to the dozing state.

In an embodiment, default dozing is executed every transmission slot 21. At the conclusion of the RTS-CTS exchange, every node in the network has determined whether it will participate in a packet exchange. If a node is not participating in a packet exchange, it enters a low energy state up until the beginning of the next transmission slot. This default method of dozing has no effect on any other performance aspect of the protocol. A flow chart of the default dozing process is depicted in FIG. 14.

Figure 14:
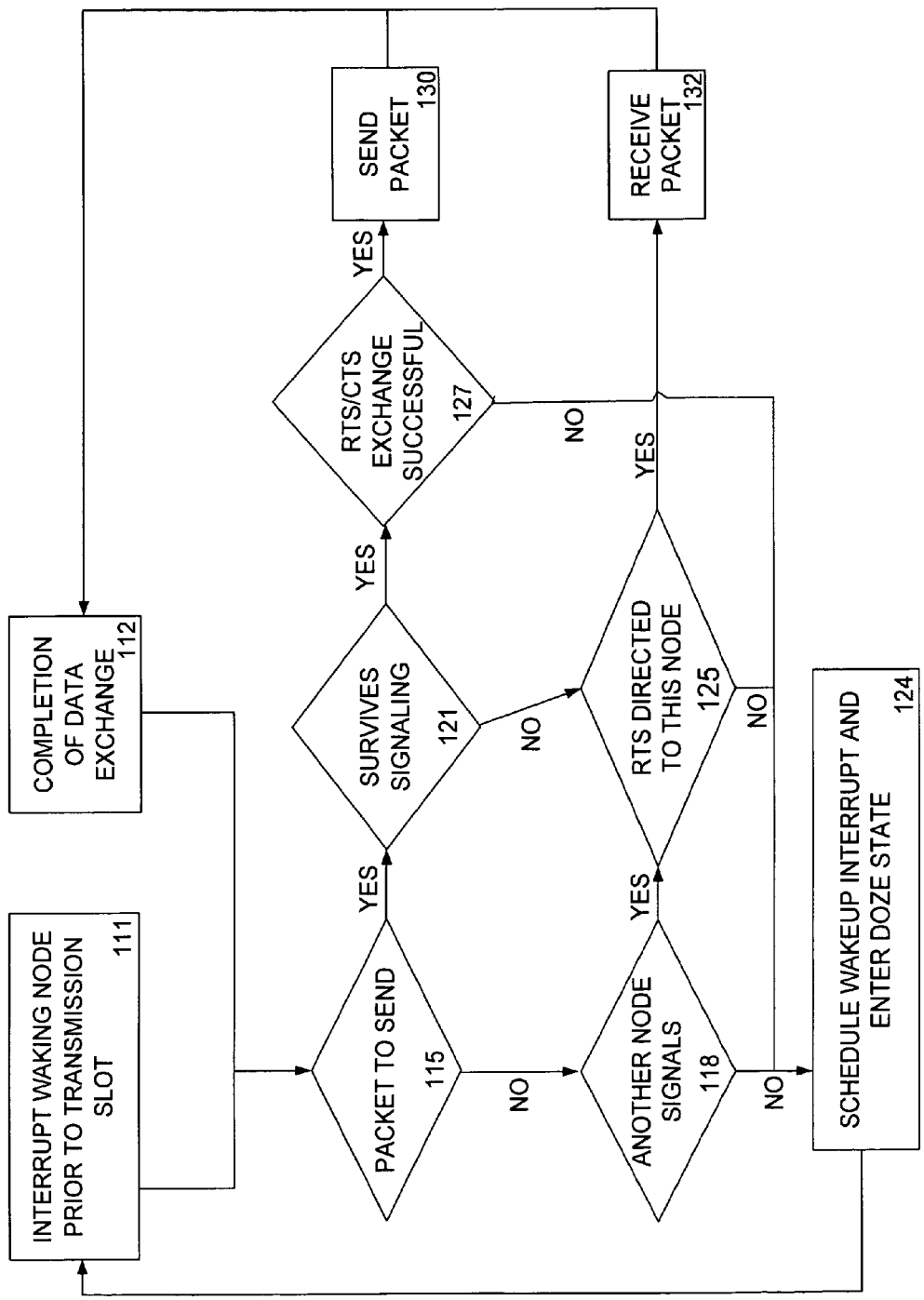
FIG. 14 is an illustrative flow chart of the default energy conservation process according to an embodiment of the present invention.

FIG. 14 is an illustrative flow chart of the default energy conservation process. The process begins just prior to a transmission slot when a node may have awakened 111 from a doze state or may have just completed 112 a data exchange. It enters the transmission slot querying if it should contend 115 to send a packet. If there is a packet to send then the node executes the contention resolution signaling portion of the contention process (refer to FIG. 7) and inquires 121 if the node survived the signaling. If it does not have a packet to send it then monitors 118 the channel to determine if another node signals. If this node does not survive signaling or if it has no packet and hears another node signaling it then listen and inquires 125 if an RTS is received. If the node is a contender and survives signaling 121, it attempts to execute 127 the RTS/CTS handshake. If the handshake is successful then the node sends 130 a packet and repeats the process the next slot. If the node receives an RTS directed to itself 125 it responds with a CTS and receives 132 the subsequent packet, repeating this process after receiving this packet. If the node does not successfully execute an RTS/CTS handshake 127, fails to hear another node signaling 118, or did not receive an RTS directed to itself 125, it then schedules a wakeup interrupt and enters the doze state 124. The process repeats itself after the node wakes up 111 or after it participates in a data exchange 112.

In periodic dozing, nodes may enter a low energy state for a specified number of slots and then wake-up. It is intended for use in lightly loaded networks. A lightly loaded condition is easily detected by the absence of signaling in transmission slots. In an embodiment of the present invention, a node sensing low transmission rate enters a low energy state. When the node wakes-up from dozing, it remains awake so long as it senses signaling occurring in transmission slots. After it first senses a slot without signaling, an indication there is no traffic pending transmission in its vicinity, it returns to the doze state. In this emodiment, a network specific dozing period is used. In an alternate embodiment, a node selected dozing period is used. In this alternate embodiment, the node disseminates its dozing period. A flow chart of the periodic dozing process is depicted in FIG. 15.

Figure 15:
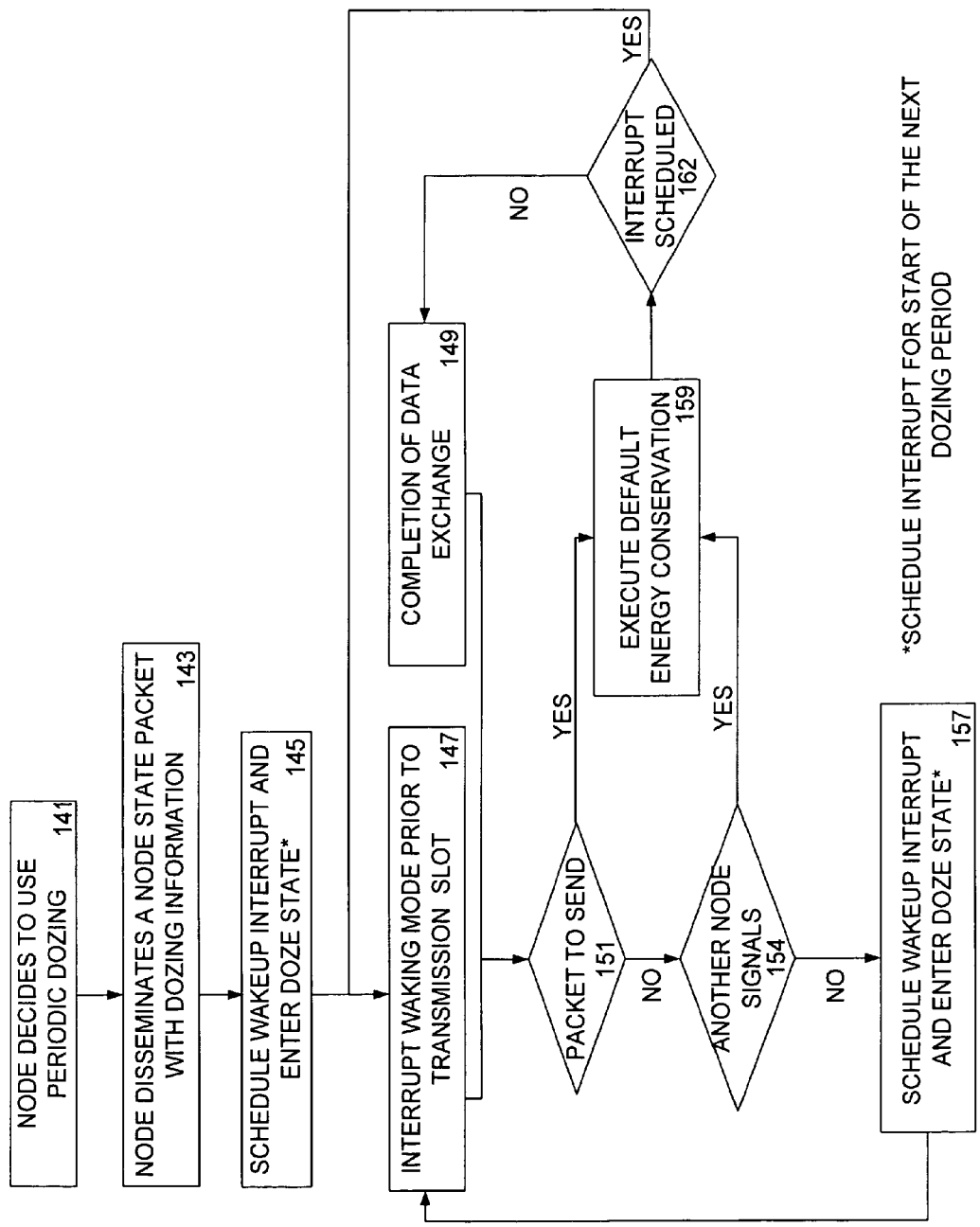
FIG. 15 is an illustrative flow chart of the periodic dozing energy conservation process according to an embodiment of the present invention.

FIG. 15 is an illustrative flow chart of the periodic dozing energy conservation process. The process begins when a node decides 141 to use periodic dozing. Before entering the doze state, the node sends 143 a node state packet that includes its dozing information. It then schedules a wakeup interrupt for the end of its dozing period and enters 145 the doze state. When the interrupt is executed, the node wakes up 147. The node then checks 151 to determine if it has a packet to send. If it does not, the node listens 154 to determine if another node is contending. If the node has a packet to send or if the node hears another node signaling, it executes 159 the default energy conservation mechanism (refer to FIG. 14). The process inquires 162 whether the node scheduled a wakeup interrupt through the default energy conservation mechanism and if it did, it returns to a state of awaiting the interrupt wakeup. If it did not, it participates in a data exchange 149. If the node neither attempts to send a packet nor monitor's another node signaling then it schedules the periodic dozing interrupt for the beginning of the next period and enters 157 the doze state. Upon waking from this state, the node repeats the process of interrupting 147 the waking mode. In an alternate embodiment, the criteria for entering the dozing state comprises reception of some number of consecutive slots with no contentions. This type of criteria prevents the false detection of low traffic loads that may occur when a node's neighbors lose the contention before they themselves can signal.

Coordinated dozing is a long term dozing period that may be executed in moderately loaded networks. A node will use this method if it senses that it is being used infrequently. A dozing node coordinates with a neighbor that agrees to collect its packets while the dozing node is dozing. In an embodiment of the present invention, a dozing node broadcasts its dozing period and the address of the supporting node that has agreed to collect packets on the dozing node's behalf. The dozing node then enters the dozing state. Nodes in the network have the choice to route packets to the supporting node or to a node in the vicinity of the dozing node. When the dozing node wakes up, it remains awake so long as a priority group as high as the energy save priority group 105 is used to gain access to the channel (refer to FIG. 13). Nodes that have collected traffic for this node use the energy save priority group 105 to forward best effort packets to the previously dozing node. The previously dozing node returns to the dozing state as soon as it senses a priority group of lower priority, 106, 107, 108, than the energy save priority group 105 being used to gain access. A flow chart of the coordinated dozing process is depicted in FIG. 16.

The periodic and coordinated dozing processes are very similar. A comparison of the processes illustrated in FIGS. 15 and 16 reveals two distinctions. In coordinated dozing, the dozing node must first establish a dozing schedule 171 by either coordinating a schedule with a p-supporter or by selecting a schedule by some other criteria. It must announce this schedule 173 before dozing. Second, the two processes use different criteria to determine whether to remain awake. Periodic dozing uses the presence of any signaling as the indication 154 that a node must remain awake. Coordinated dozing uses the priority of the signaling used in gaining access as the indication 184 of whether a node should remain awake. The most significant of these two differences is the requirement to coordinate the dozing process. Since dozing schedules must be disseminated before using either of these two dozing methods 143, 173, this requirement may be relaxed since all neighbors will have an explicit understanding of when the dozing node will next awake. The use of a p-supporter is an option that is included in an implementation of this invention if it will benefit the operation of the network.

Figure 16:
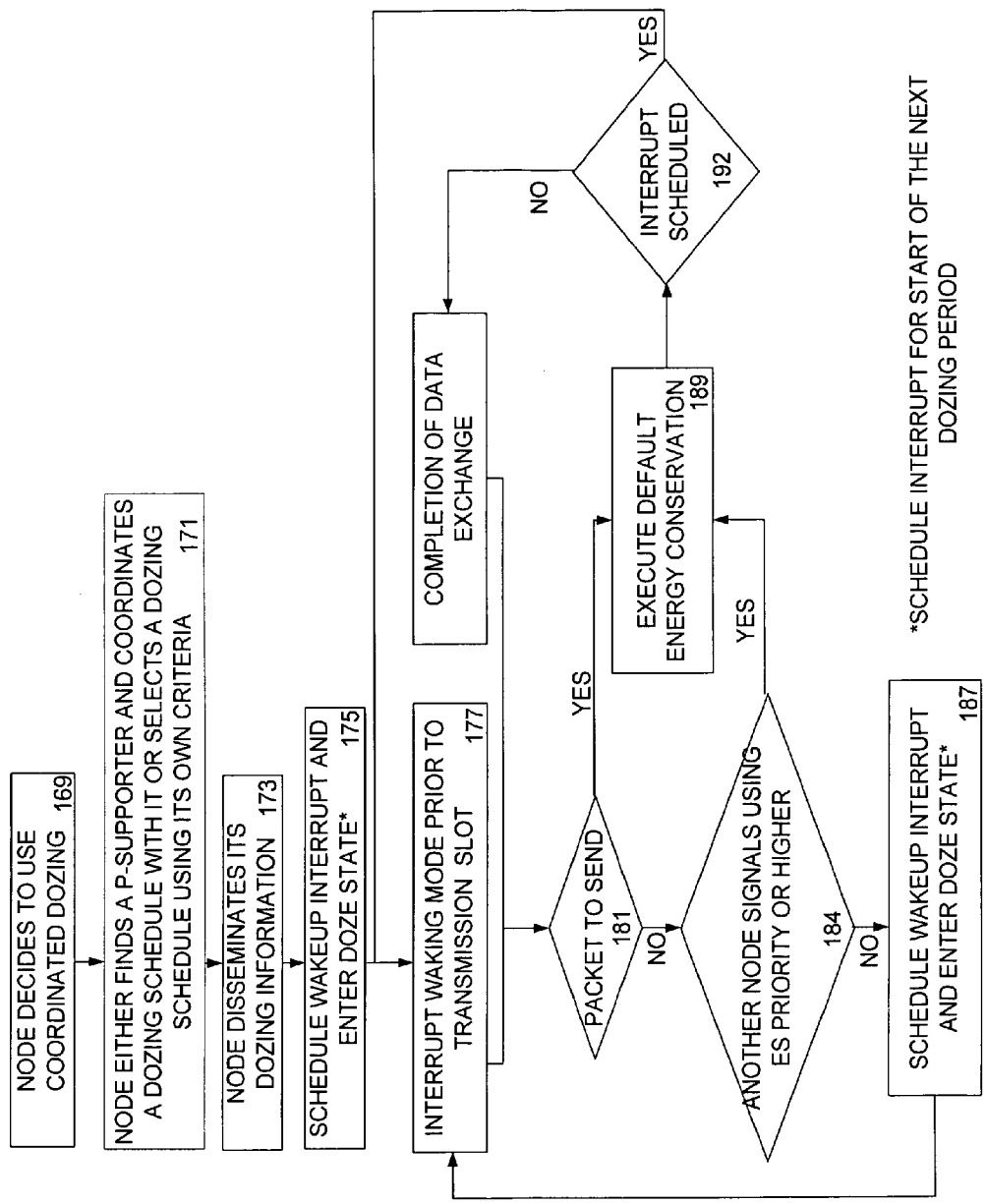
FIG. 16 is an illustrative flow chart of the coordinated dozing energy conservation process according to an embodiment of the present invention.

FIG. 16 is an illustrative flow chart of the coordinated dozing energy conservation process. The process begins when a node decides 169 to use coordinated dozing. Before entering the doze state, the node first identifies 171 a node that will serve as its p-supporter and then sends 173 a node state packet that includes its dozing information. In an alternate embodiment, the dozing node does not identify a p-supporter. It then schedules a wakeup interrupt for the end of its dozing period and enters 175 the doze state. When the interrupt is executed, the node wakes up 177. The node then checks to determine 181 if it has a packet to send. If it does not, the node listens to determine 184 if another node is contending with an ES priority or greater priority signaling slot. If the node has a packet to send or if the node hears another node signaling using a high enough priority, it executes 189 the default energy conservation mechanism (refer to FIG. 14). The process inquires 192 whether the node scheduled a wakeup interrupt through the default energy conservation mechanism and if it did, it returns to the interrupt wakeup 177. If it did not, it participates in a data exchange 179. If the node neither attempts to send a packet nor monitor's another node signaling, it schedules 187 the periodic dozing interrupt for the beginning of the next period and enters the doze state. Upon waking form this state, the node repeats the process starting at interruption 177 of the doze mode.

The Packet and Signaling Priority Selection Process

Figure 17B:
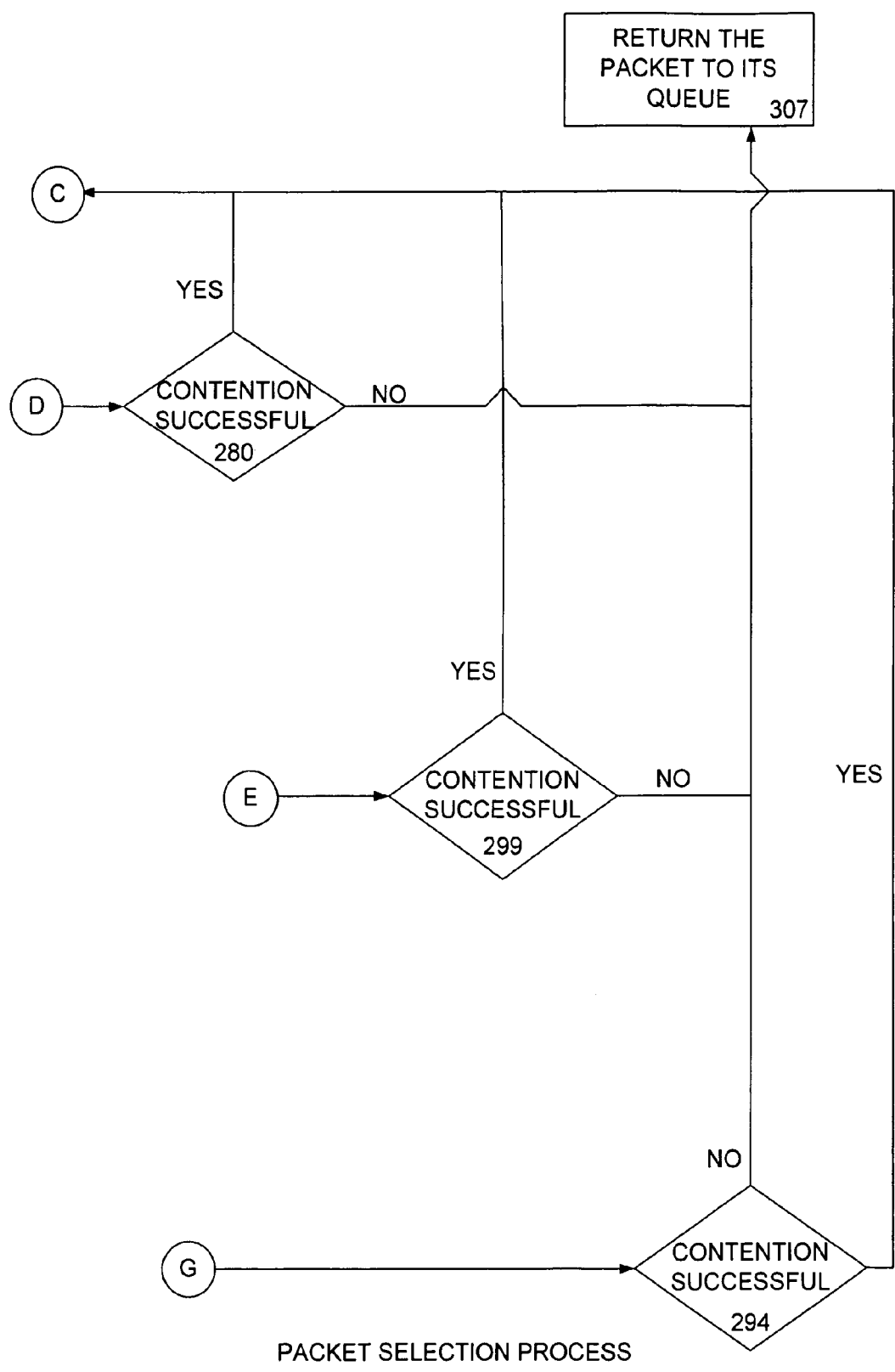
Figure 17C:
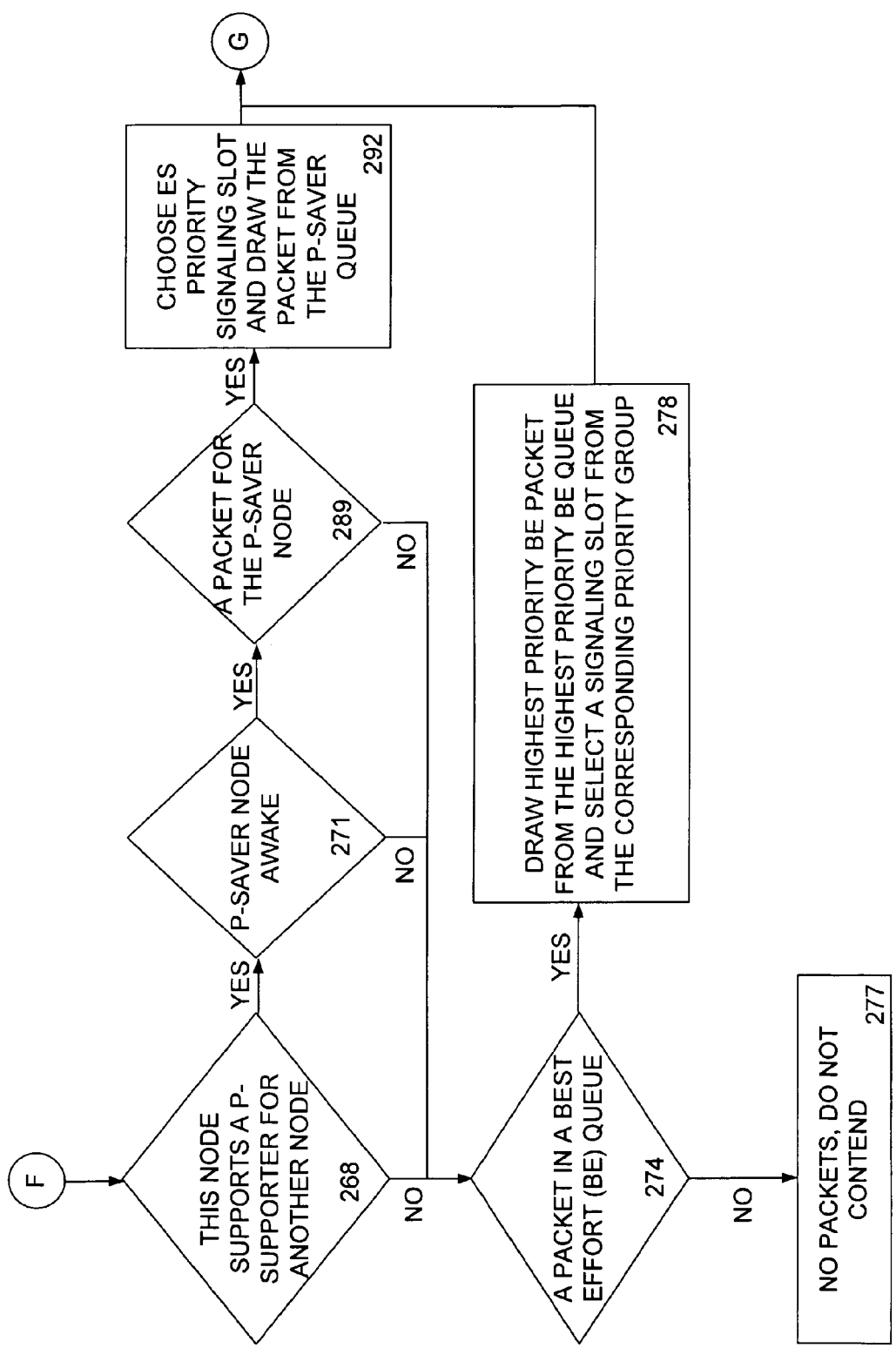

FIGS. 17A-17C illustrate a flow chart of the SCR protocol packet selection process according to an embodiment of the present invention that is executed with each transmission slot. In this exemplary embodiment of the present invention, the process begins just prior to the next transmission slot 250. The node first checks 252 if there is a stream that is using this particular slot in the frame. If the answer is yes the node chooses to contend 255 using the CBR priority signaling slot. If the answer is no, the node inquires 257 if there is a QoS stream queue that meets the criteria to use a VBR signaling slot in the current transmission slot. If there is a queue needing to use a VBR slot, then the node chooses 260 the VBR signaling slot to start its contention and draws the packet from the appropriate QoS queue. If there are no QoS queues requiring VBR service then the node inquires 262 if there are any packets in the broadcast queue. If there are any packets in the broadcast queue, then the node chooses the broadcast priority signaling slot 297 for contending in the upcoming transmission slot and draws a packet from the broadcast queue. If there is no broadcast packet then the node inquires 268 if it is the p-supporter of another node. If the node is the p-supporter of another node, the node inquires 271 if this p-saver node will be awake in the upcoming transmission cycle. If the p-saver node will be awake in the upcoming transmission cycle, then the node determines 289 if there are any packets queued for this node. Finally, if there are packets queued for this node, then the node chooses 292 an ES priority signaling slot and draws a packet from the p-saver queue. If the answer to any of the inquiries is "no", that is the node is not a p-supporter (268), the p-saver is not awake (271), or there is no packet for the p-saver node (289), then the node checks to determine if there is a best effort packet to transmit. The node then draws 278 the highest priority best effort packet from the highest priority best effort queue and selects a signaling slot from the corresponding priority group. If there are no best effort packets in a queue 277 then the node has no packets to transmit and does not contend. At this point the node is either contending for access or not contending for access. As will be apparent to those skilled in the art, this embodiment is exemplary and the use of a different order and quantity of priority groups and thus the sequence of checks to determine which priority group to use does not depart from the scope of this invention Nodes then contend for access 280, 294, 299. If the node contends and the contention is successful in that a packet is successfully exchanged, then the process advances to the beginning 250 and repeats itself. If these types of contention are unsuccessful then the node returns 307 the packet to the SCR packet queues and the process advances to the next transmission slot 250.

Figure 18A:
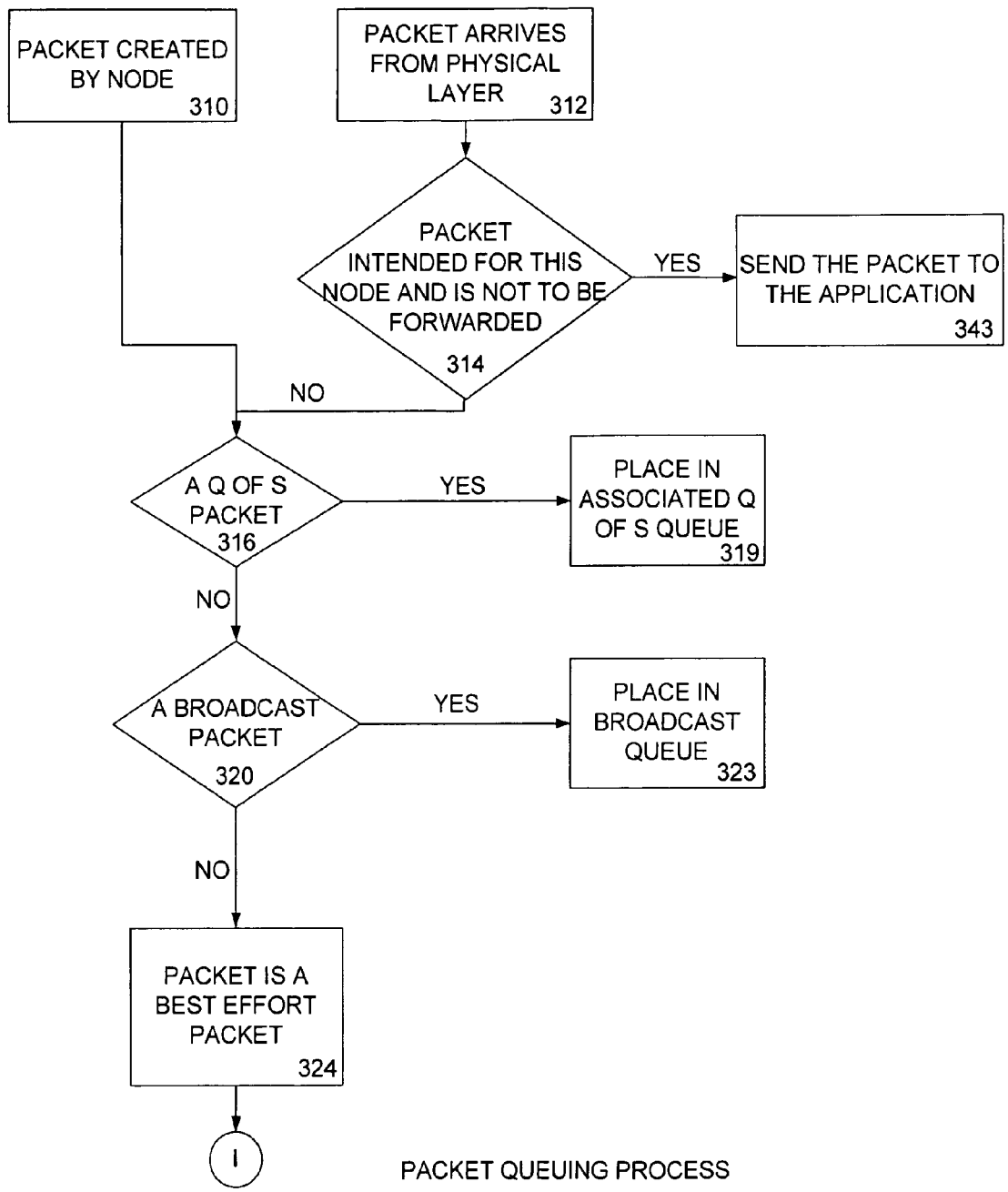
FIGS. 18A and 18B illustrate a flow chart of SCR's packet queuing process according to an embodiment of the present invention.
Figure 18B:
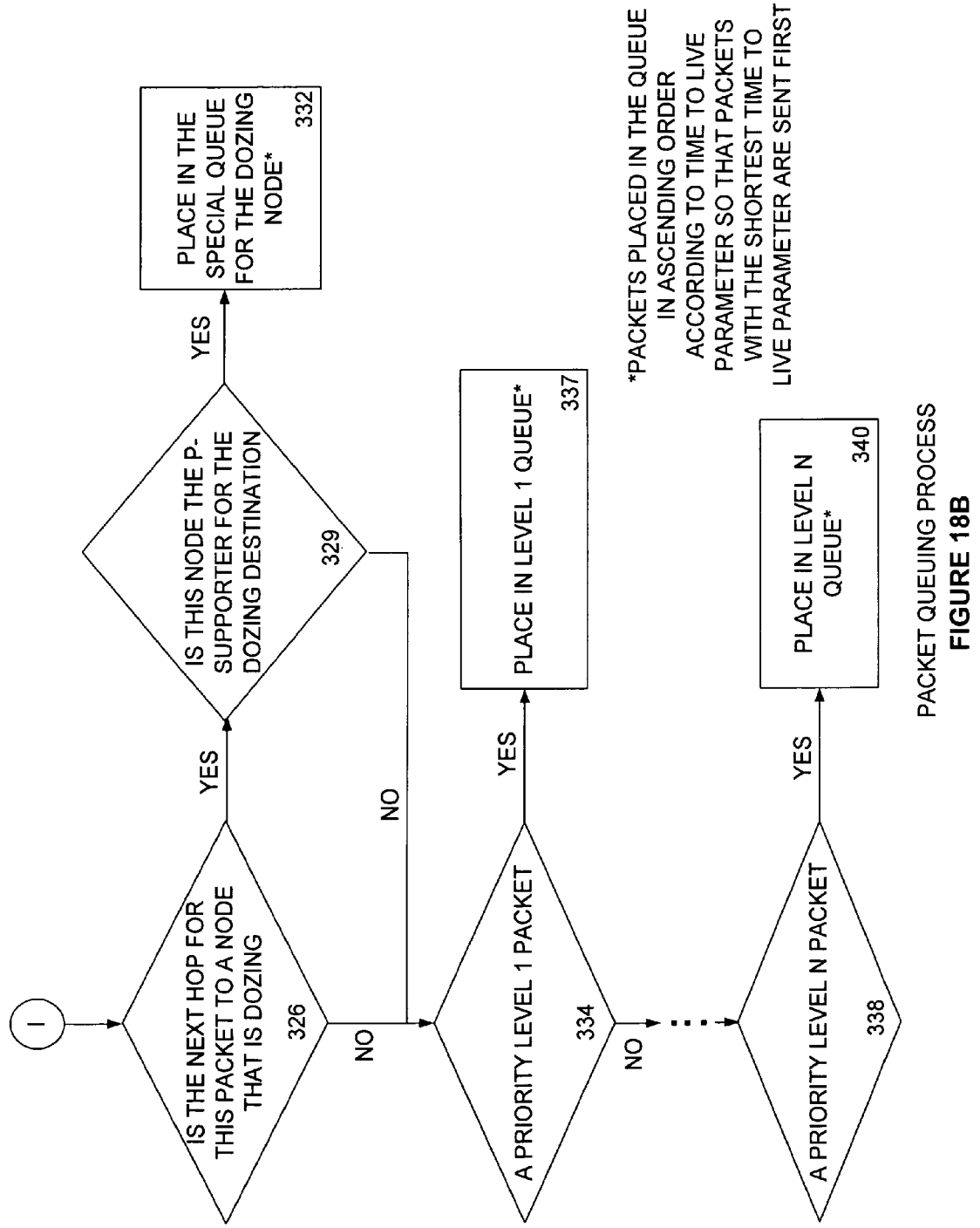

FIGS. 18A and 18B illustrate a flow chart of an SCR protocol packet queuing process according to an embodiment of the present invention. The process begins with a packet arriving at one of the SCR queues 2 (see FIG. 1) from the physical layer 312 or from this node 310. If the packet is received from the physical layer the node inquires 314 if the packet was intended for itself. If the answer is no or if the packet is from this node, the node inquires 316 if the packet is a QoS packet. In this embodiment, the queuing process determines the next hop for the packet without forwarding the packet up the protocol stack. If the packet is a QoS packet it is placed 319 in the associated QoS queue. If the packet is not a QoS packet then the node inquires if it is a broadcast 320 packet. If it is a broadcast packet then it is placed 323 in the broadcast queue. If the packet is not a broadcast packet, then the node tags 324 the packet as a best effort packet. The node then inquires 326 if the packet has a next hop route to a node that is dozing. If the packet has a next hop route to a node that is dozing, the node inquires 329 if this node is the p-supporter for the dozing destination. If the node is the next hop destination's p-supporter then the packet 332 is placed in the special queue for the dozing node. If the packet is not for a dozing node then the process goes through a series of inquiries 334, 338 to determine whether the packet has a priority that matches that of the inquiry. If the packet has a priority that matches that of the inquiry, the node is placed in the queue with that same priority 337, 340. If the packet does not have a priority that matches that of the inquiry, then the inquiry for the next lowest priority is executed until the lowest priority when the packet is guaranteed to be placed in its queue. When packets are placed in a queue, 319, 323, 332, 337, 340, the queues are sorted in ascending order according to the time to live parameter of the packet. As will be apparent to those skilled in the art, applying a different queuing discipline, e.g. first in first out, does not depart from the scope of the present-ing invention.

Figure 19A:
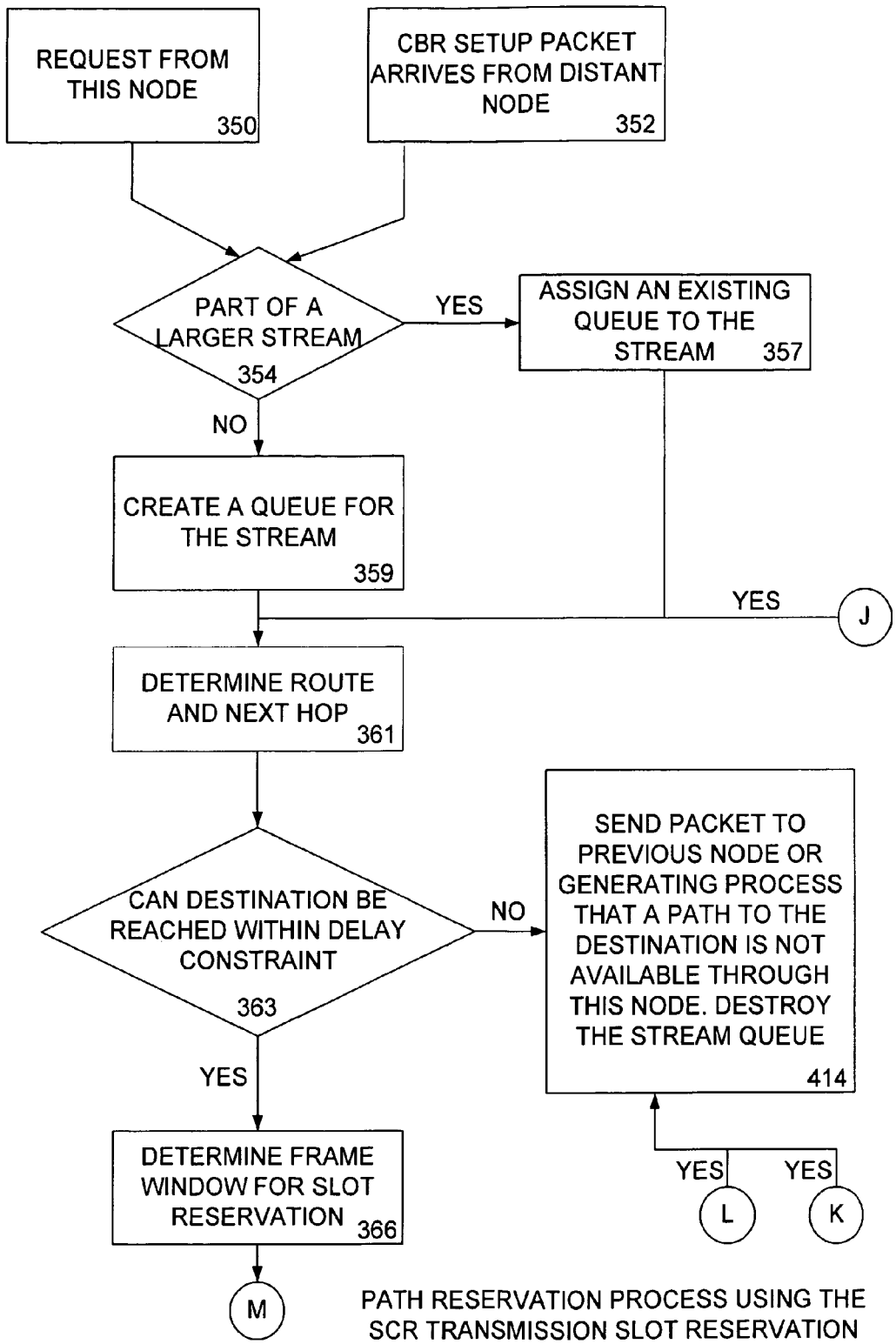
FIGS. 19A-19C illustrate a flow chart of the use of SCR's transmission slot reservation capability in a path reservation process according to an embodiment of the present invention.
Figure 19B:
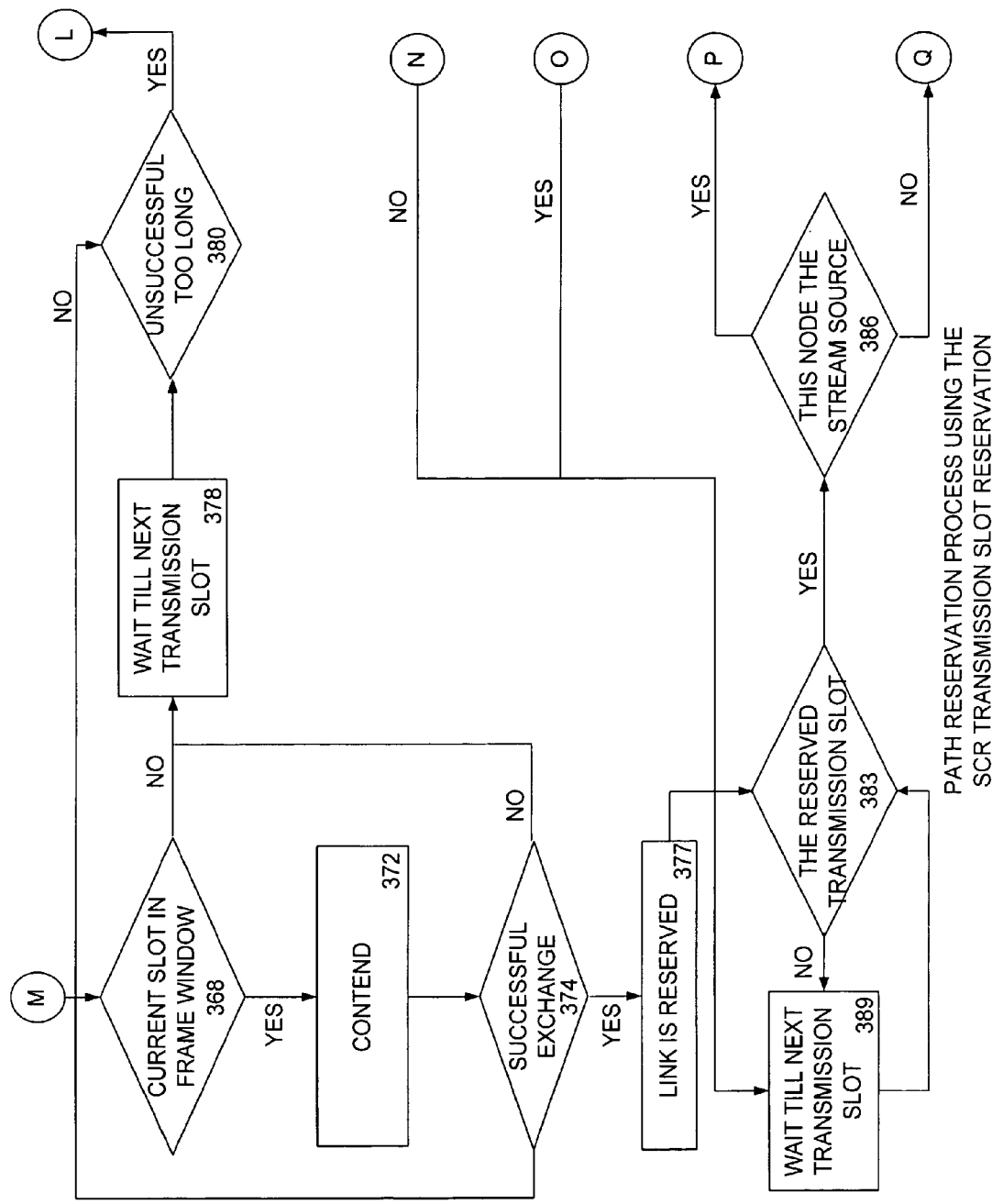
Figure 19C:
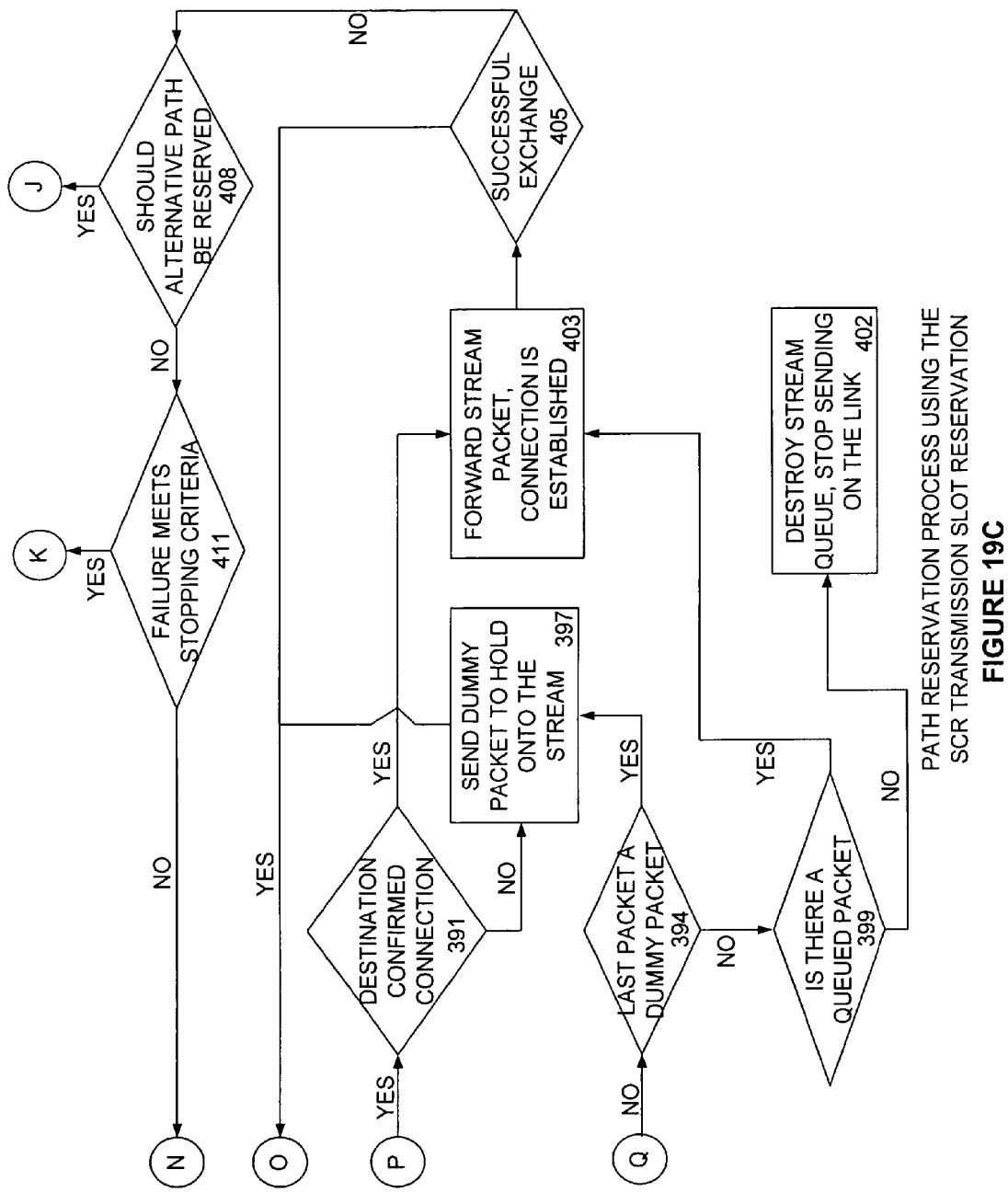

FIGS. 19A-19C illustrate a flow chart of a transmission slot reservation process according to an embodiment of the present invention implemented together with a routing protocol to reserve a path for a stream. A node starts its participation in the path reservation process when an application at "this" node requests 350 the service or when the node first receives 352 a CBR setup packet from a distant node. The node then inquires 354 if this reservation is part of a larger stream, i.e. a stream requiring more than one transmission slot per frame, with a queue already assigned to another slot. If this reservation is part of a larger stream then this stream's queue is also used 357 for this slots packets. Otherwise the node creates 359 a new queue for this stream. The node then determines 361 the full route to the destination and its next hop from the routing protocol implemented at the node. (This assumes the routing protocol can estimate the number of hops to the destination.) The node then inquires 363 if the destination can be reached within the delay constraint specified for the stream. If the destination can be reached, the node determines 366 the window of slots within a frame that it can use for the stream and then proceeds to try to reserve one of these slots. As the next transmission slot starts the node asks 368 if the current slot is within the window. If the current slot is within the window the node contends 372 using the QoS priority slot. The node then inquires 374 if the contention was successful. If the contention was successful, then the node advances considering the link successfully reserved 377. If the slot was not in the frame window or if the contention was unsuccessful the node waits 378 until the next slot. Before proceeding the node inquires 380 if it has taken too long to reserve the slot. If the node has not taken too long to reserve the slot, the process returns to the point where it inquires if the transmission slot can be used for the stream.

Once a link is reserved, the node cycles through the transmission slots and inquires 383 at each slot if it is the reserved transmission slot. If the slot is not the reserved transmission slot the node waits 389 until the next transmission slot and asks again. If the slot is the reserved transmission slot the node tries to determine what type of a packet to send. It first asks if this node 386 is the stream source. If the node is the stream source the node inquires 391 if the connection is still being constructed or if it has received confirmation that there is a connection. If the node is not the stream source it inquires 394 if the last packet it received from the first node upstream was a dummy or payload packet. If the node is the source and a connection has not been established or if the last packet received from the node upstream was a dummy packet then this node too will send 397 a dummy packet in this reserved slot. After sending the dummy packet the node returns to the inquiring 383 if each slot is part of the reservation. If the node last received a payload packet from the upstream node then the node inquires 399 if there is queued packet available for transmission. If there is queued packet available for transmission, then the stream is considered to be dead and the node destroys 402 the queue associated with the stream. If there is a queued packet or if the node is the stream source and a connection has been established then the node forwards 403 the packet to the next node. The node then inquires if the exchange was successful and likely to remain successful for future slots 405. If the exchange was successful, the node returns to the block that inquires 383 whether each slot is a reserved slot for the frame. If each slot is a reserved slot for the frame, the node inquires 408 if it should begin finding an alternative path to the destination. If an alternative path should be sought, the node returns to the block that determines 361 a route to the destination. If the node determines that it should not begin finding an alternative path to the destination, the node inquires 411 if the current link condition warrants breaking the connection. If the current link condition does not warrant breaking the connection, the node returns to the block that inquires 383 whether each slot is a reserved slot for the frame.

If a route cannot be found to the destination, if it takes too long to reserve a link, or if the connection fails and this meets the stopping criteria then the node will consider there to be no path to the destination. The node sends a packet to the previous node or the generating process that a path is not available through this node and it also destroys the stream's queue 414.

The basic unit of a QoS connection is a transmission slot reserved for a hop each CBR frame. Reserving multiples of these transmission slots reserves bandwidth. In an embodiment of the present invention, a node creates a multihop connection by reserving a transmission slot on the first hop of the route. If the node is successful in its contention then it sends a packet describing the connection required that includes the delay constraint and the destination ID. The source node continues to send 397 this packet in the same slot of each subsequent frame until a connection is established or it receives feedback that a connection cannot be made 414. In turn, the first hop destination attempts to reserve a transmission slot along the next hop of the path in the same manner and then sends the same setup packet. This continues until a connection is established to the final destination. If the connection requires a bidirectional link the process repeats itself in the reverse direction. Nodes send their payload once they receive confirmation that the connected path has been established. The connection is maintained so long as it is used.

Delay constraints are met in the manner the slots are reserved on each hop. Each node on a route is selective as to which transmission slots it attempts to reserve within a CBR frame 363-382. Each node first estimates 361 how many hops there are to the final destination. A node uses this estimate and the path delay constraint to identify 366 a suitable range of transmission slots within which to reserve a transmission slot. For example and not as a limitation, if there are 3 hops to the final destination and the connection will allow 15 slots of delay, the first node will attempt to reserve one of the first 5 slots that follow the slot on which a packet arrives. If the node is unsuccessful at reserving one of these five slots in the first frame it waits until the subsequent frame and attempts again. If, for example, the node is successful at reserving the third slot following the arrival, then the next node would have a window of 6 slots, half of the 12 remaining, from which to reserve the next hop link. Variants of this connection protocol can be created to account for congestion and other factors so that nodes upstream are allowed a larger window of slots to choose from.

Sizing of Signaling Slots and Interframe Spaces

Signaling slots and interframe spaces must be sized to account for variations in clock synchronization, propagation delays, transition times between receiving and transmitting and vice versa, and sensing time required to sense a signal is present. Table 2 below provides the design constraints and Table 3 provides design parameters for the selection of these slot sizes and interframe spaces for an embodiment of the present invention.

TABLE 2

Timing constraints and results that affect signal slot size

| | |
|---|---|
| $\tau_p$ | Propagation delay between nodes displaced the maximum receiving distance from each other |
| $\tau_{rt}$ | Minimum time required by a transceiver to transition from the transmit to the receive state or vice versa |
| $\tau_{prt}$ | Minimum time to process a signal and then to transition from the receive to the transmit state |
| $\tau_{sy}$ | Maximum difference in the synchronization of two nodes |
| $\tau_{sm}$ | Minimum time to sense a signal in order to detect its presence |
| $\tau_{sn}$ | Time a node senses a signal in a particular slot as a result of constraints and chosen slot size |

TABLE 3

Design parameters

| | |
|---|---|
| $t_s$ | Duration of a slot |
| $t_{sf}$ | Selected minimum time to sense a signal in a first to assert slot to detect it. |
| $t_{sl}$ | Selected minimum time to sense a signal in a last to assert slot to detect it. |

Figure 20A:
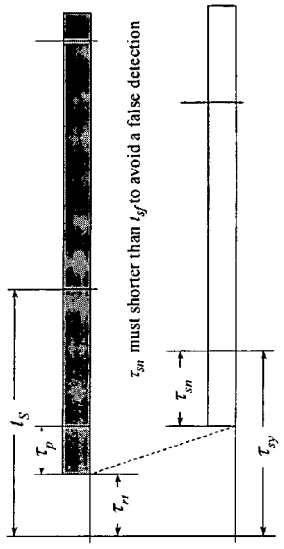
FIGS. 20A-20E illustrate the effects of synchronization discrepancies, propagation delays, and transceiver state transition times on the sizing of signaling and interframe slots according to an embodiment of the present invention.
Figure 20B:
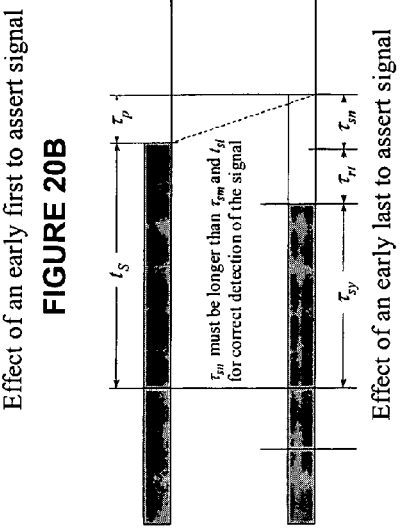

FIGS. 20A-20E illustrate the relationship of these parameters. The choice of $t_S$ is constrained by the minimum time required to sense a signal to detect whether a signal is present, $t_{sf}$. In FIG. 20A, where the first to assert signal is sent late, $t_{sn}$ is longer than $\tau_{sf}$ in order for the signal to be correctly sensed. However, as illustrated in FIG. 20B, where the first to assert signal is sent early, allowing $\tau_{sn}$ to be longer than $t_{sf}$ would create the potential for a false detection of the signal. From these two illustrations the following equations are derived for selecting the size of a first to assert signaling slot.

$$t_{sf} > \max(\tau_{sy} - (\tau_{rt} + \tau_p), \tau_{sm})$$

$$t_S > \tau_{sy} + \tau_{rt} + \tau_p + t_{sf}$$

Figure 20C:
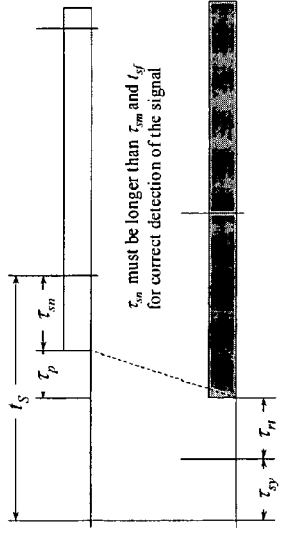
Figure 20D:
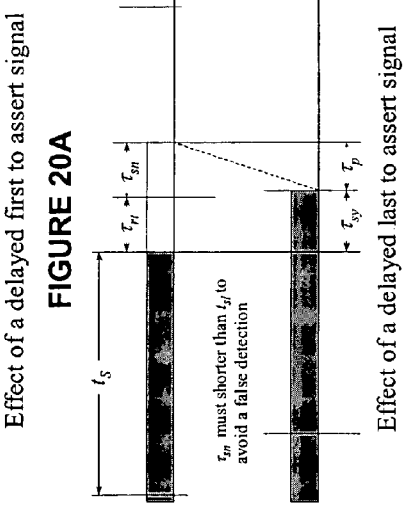

By selecting a large $t_{sf}$ and $t_S$, differences in the synchronization of nodes can be accounted for. There is a similar result for the selection of the slot size of the last to assert phases. In FIG. 20C, where the a last to assert signal finishes late, $\tau_{sl}$ is longer than $t_{sn}$ in order to avoid a false detection. In FIG. 20D, where the last to assert signal finishes early, $\tau_{sl}$ is shorter than $t_{sn}$ in order to avoid a false detection. The following equations may be used to size the last to assert slots.

$$t_{sl} > \max(\tau_{sy} + \tau_p - \tau_{rt}, \tau_{sm})$$

$$t_S > \tau_{sy} + \tau_{rt} + t_{sl} - \tau_p$$

Again, by selecting a large $t_{Sl}$ and $t_S$ the differences in the synchronization of nodes are accounted for. The result is that the last to assert slots can be shorter then the first to assert slots.

Figure 20E:
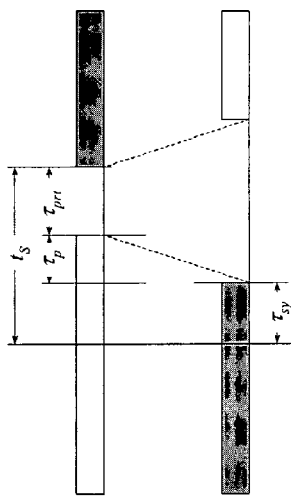

Finally, FIG. 20E may be used to size the interframe space between two packet transmissions. The next equation follows from the illustration.

$$t_S > \tau_{sy} + \tau_p + \tau_{prt}$$

From these results it is clear that the better the synchronization in the network the more efficient the protocol will be but that the failure to achieve perfect synchronization can be compensated for by allowing for larger slot times and detection periods.

Physical Layer Integration

The SCR protocol exploits certain physical layer capabilities if they are available. Embodiments of the present invention utilize these physical layer capabilities to enhance the performance of of the SCR protocol.

Synchronizing and Locating Nodes

Synchronizing and locating nodes may be services that are provided by external physical devices 4, from the physical layer itself 3, run on top of the SCR protocol, or through a combination of these factors. When the service is externally provided, the SCR protocol synchronizes its clock to that of the external device. In an embodiment of the present invention, these services run on top of the SCR protocol. In this embodiment, two or more nodes are surveyed into position and one node designated to serve as the clock reference. Location and time synchronizing is achieved using multi-lateration algorithms. Multi-lateration algorithms use the time of arrival of signals and reported locations of sources. Separation distances amongst nodes can be calculated using the propagation delay amongst multiple signals. The signals that the SCR protocol provides for these measurements are the RTS 24, CTS 25, PDU 26 and the ACK 27 packet transmissions. Location information would be included within these packets. These packet transmissions are used since they occur at fixed times. Integrated use of the physical devices and services on top of this invention eliminates the requirement to survey nodes into positions and for any node to serve as a reference clock. Rather the physical devices provide these functions. Both methods would be applied when some network nodes do not have the physical device or when the reliability of the physical device may be deficient on account of the environment. Nodes with reliable information from the physical devices would be references and all other nodes would synchronize and locate themselves using the services of the protocol built on top of this invention. States may be added to the node state packets to support these methods.

Power Control

In embodiments of the present invention, the SCR protocol exploits the power control capabilities of transceivers. In one embodiment, the power level used in signaling is adjusted to control the separation distance amongst signaling survivors. Second, power is used to control the average degree of the network. (Degree of a network is the average number of neighboring nodes that nodes can communicate directly without routing through intermediate nodes.) A method is used to determine the range of a transmission that is necessary to achieve the appropriate degree. The maximum transmission power level is then selected to achieve this range. Another use of power control is to conserve energy and to improve network performance. After receiving the RTS from a source, the destination provides feedback to the source if it can reduce its transmission power level for the subsequent packet transmission. Since nodes may only reduce their transmission power between the RTS and the PDU, interference from distant nodes can only decrease for the PDU packet exchange.

Code Division Multiple Access (CDMA)

An embodiment of the present invention exploits transceivers having CDMA capabilities. As described above, SCR protocol signaling separates nodes and through the channel selection previously described can select their own receiver directed spread spectrum codes and disseminate them. After winning a contention, survivors can code-multiplex different packets for different destinations since each packet can be spread with a unique code. As described earlier, survivors learn the codes of their neighbors through their neighbor's dissemination of their channel selections. The RTS packets to these destinations can specify which codes the destinations should use in transmitting their CTS packets.

Directional Antennas and Space Division Multiple Access (SDMA)

If a node can steer a beam, then it can be used to improve capacity. Beam steering can improve the success of packet exchanges by reducing the interference experienced by other nodes that are exchanging data.

Embodiments of the present invention also exploit the use of smart antennas. A smart antenna system combines multiple antenna elements with a signal-processing capability to optimize its radiation and/or reception pattern automatically, such as acting either omnidirectional or directional, in response to the signal environment. Smart antennas enable a single node to steer multiple beams to different destinations and thus multiplex the transmission and reception of packets. Smart antennas can be used together with any deliberate attempt to transmit to or receive from multiple neighbors. Smart antennas can be used together with the CDMA to better isolate the transmitted and received multiplexed signals.

According to one embodiment, each node has plural transceivers on the wireless channel, each of the transceivers having its own antenna. One of the plural transceivers serves as the master transceiver for the ad hoc network and the remaining transceivers serve as slave transceivers. Preferably, the master transceiver has an omnidirectional antenna and a directional transmission antenna; the slave transceivers each have a directional transmission and directional reception antenna.

Network Optimization Techniques

The present invention provides a network optimization mechanism that can be used to actively manage networks during their use to improve their performance. The power level used in signaling and for transmissions can be controlled to select the average separation distance of signaling survivors and to select the network's degree of connectivity. Higher degrees of connectivity suffer fewer network partitions.

EXEMPLARY EMBODIMENTS

SCR Performance in Flat Networks with Uniformly Distributed Nodes

Figure 21:
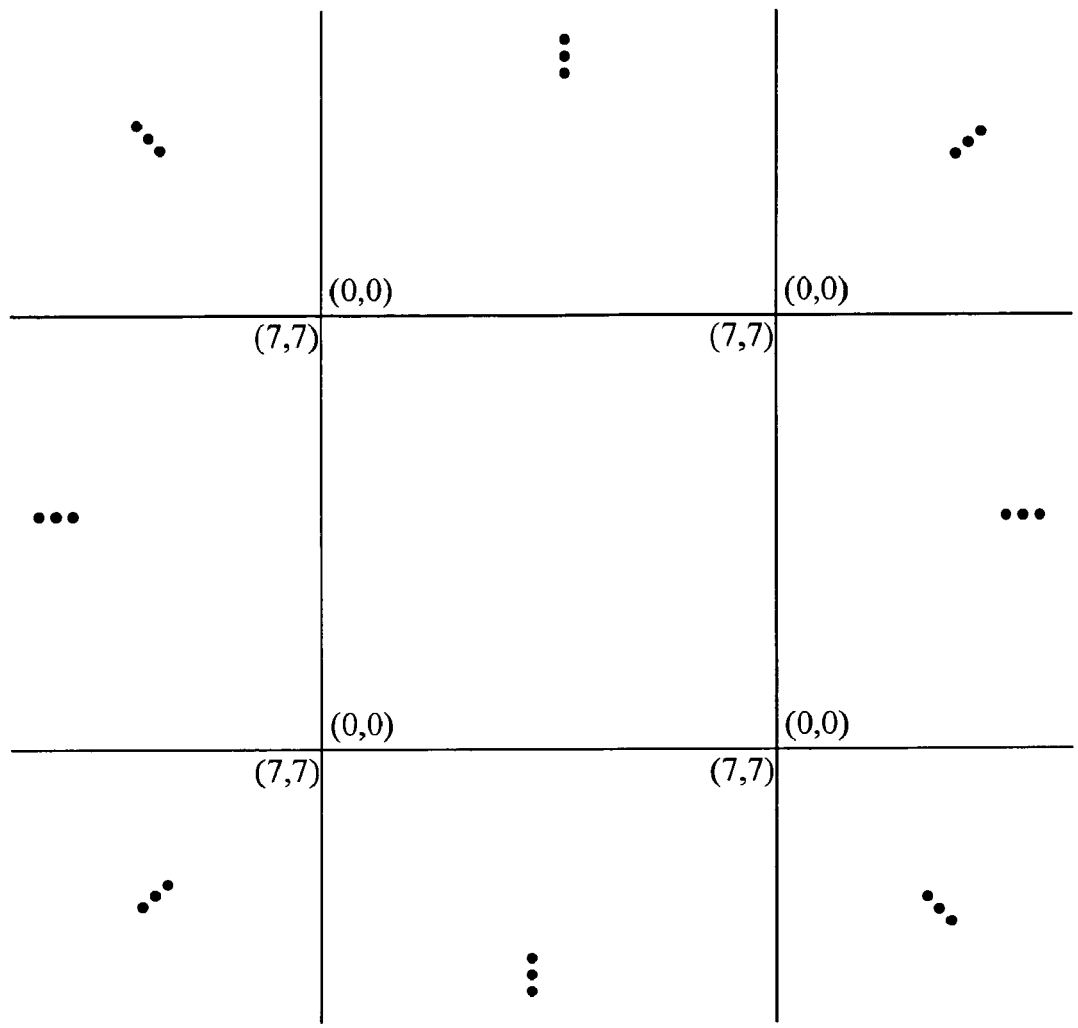
FIG. 21 illustrates the spherical wrapping of a network area that is used in simulation to obtain data without the influence of edge effects according to an embodiment of the present invention.

The performance of different signaling parameters was tested in a simulation environment. The simulation randomly placed nodes on a 7×7 unit square grid at the density specified for the simulation run using a uniform distribution. The length of a unit corresponds to the range of a radio. This simulation model considers the grid to be wrapped "spherically" so there are no boundaries. (A square grid is spherically wrapped around by considering all corners and opposite edges to be neighbors as illustrated in FIG. 21.) In this description $\sigma_A$ denotes the density of nodes in a network and is defined as the average number of neighboring nodes that are within range of each node in the network.

Figure 22A:
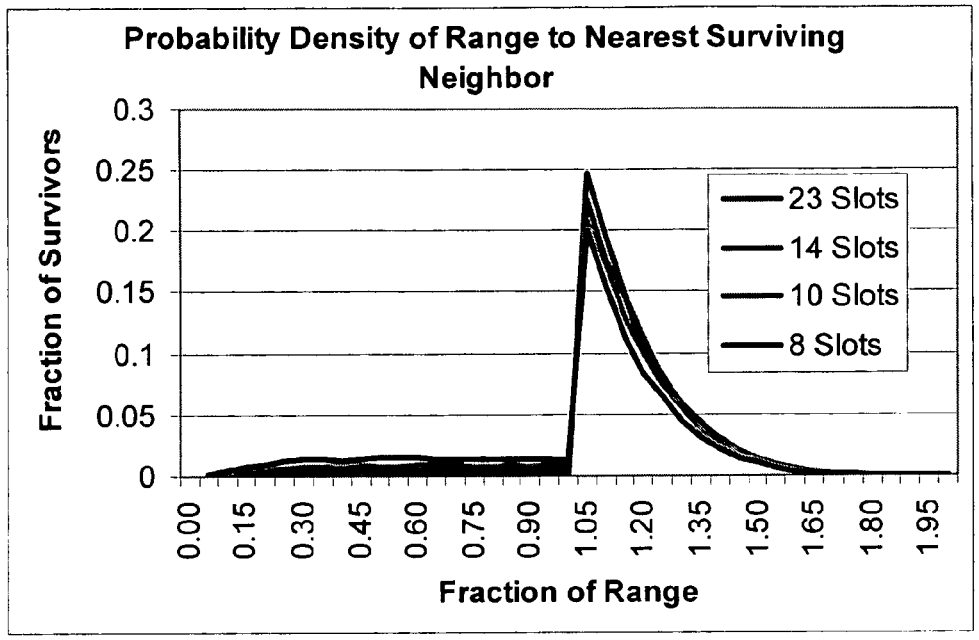
FIGS. 22A and 22B illustrate probability and cumulative distributions of separation distances between signaling survivors and their nearest surviving neighbors comparing the performance of different sets of signaling parameters according to an embodiment of the present invention.
Figure 22B:
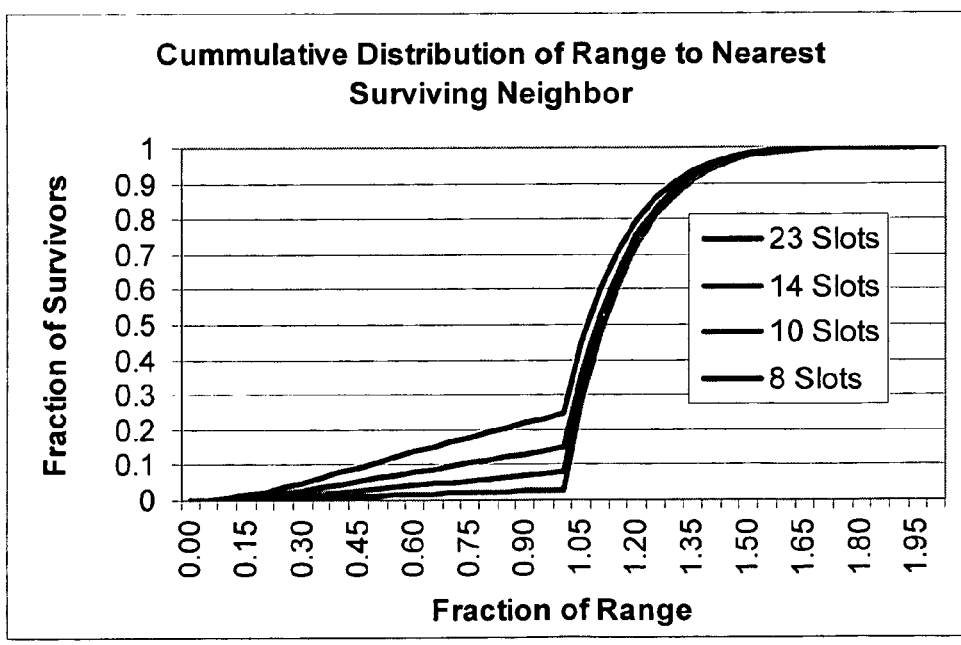

The first simulations demonstrate the effectiveness of different signaling parameters in the three phase signaling approach illustrated in FIG. 4. Each set of signaling parameters were tested in a series of 30 placements and then 500 contentions at each placement. All nodes contended each time. FIGS. 22A and 22B illustrate the probability distribution and the cumulative distribution of the separation distance between a survivor and it's nearest surviving neighbor after signaling. The density of nodes in this example is $\sigma_A$=10. Several sets of signaling parameters were tested. Each curve is labeled by the total number of signaling slots that were used in the collision resolution signaling. The exact parameters for the signaling are listed in Table 4 below.

TABLE 4

Signaling parameters used in simulations

| SLOTS | h | l | m | R | Q | p |
|---|---|---|---|---|---|---|
| 23 | 2 | 9 | 12 | .92 | .65 | .88 |
| 14 | 2 | 5 | 7 | .90 | .45 | .84 |
| 10 | 2 | 4 | 4 | .90 | .36 | .75 |
| 8 | 2 | 3 | 3 | .90 | .24 | .71 |

Figure 23A:
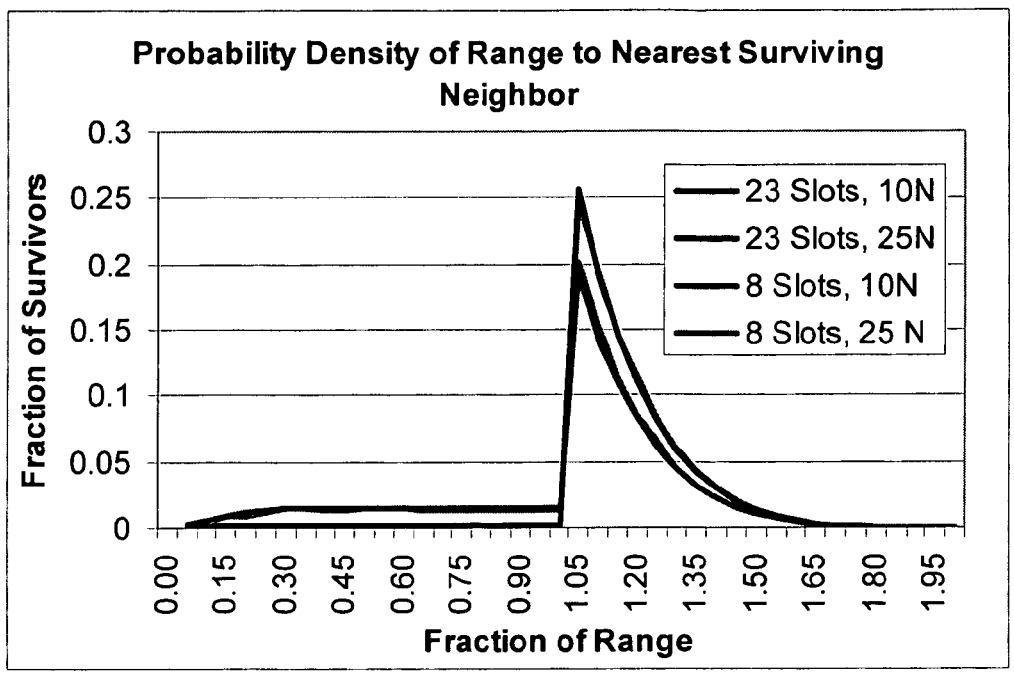
FIGS. 23A and 23B illustrate probability and cumulative distributions of separation distances between signaling survivors and their nearest surviving neighbors comparing the performance of different sets of signaling parameters at different contending node densities according to an embodiment of the present invention.
Figure 23B:
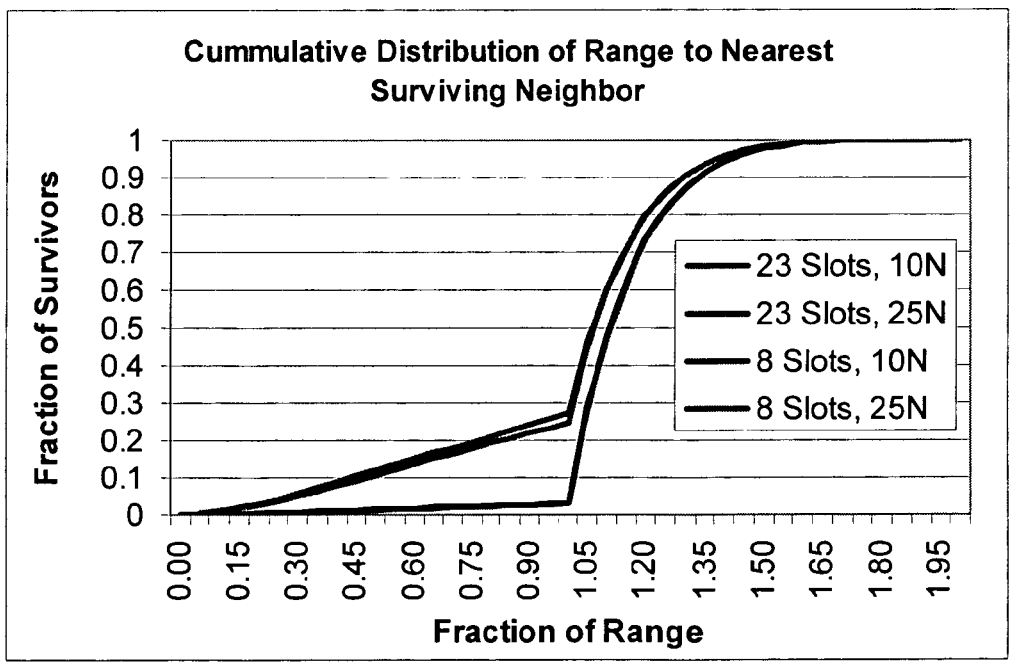

The results demonstrate that the signaling is effective at separating survivors. The probability that a second survivor is within range of a survivor's transmission is consistent with that predicted by equation 6 and illustrated in FIG. 10. Also, the bulk of the survivors are within a range of 1 and 1.5 times the range of the radios. FIGS. 23A and 23B are more graphs of the simulations of the 23 and 8 slot cases but compares the results between when $\sigma_A$=10 and $\sigma_A$=25. These figures illustrate that the results are a function of the signaling parameters not the density of the contending nodes.

Figure 24A:
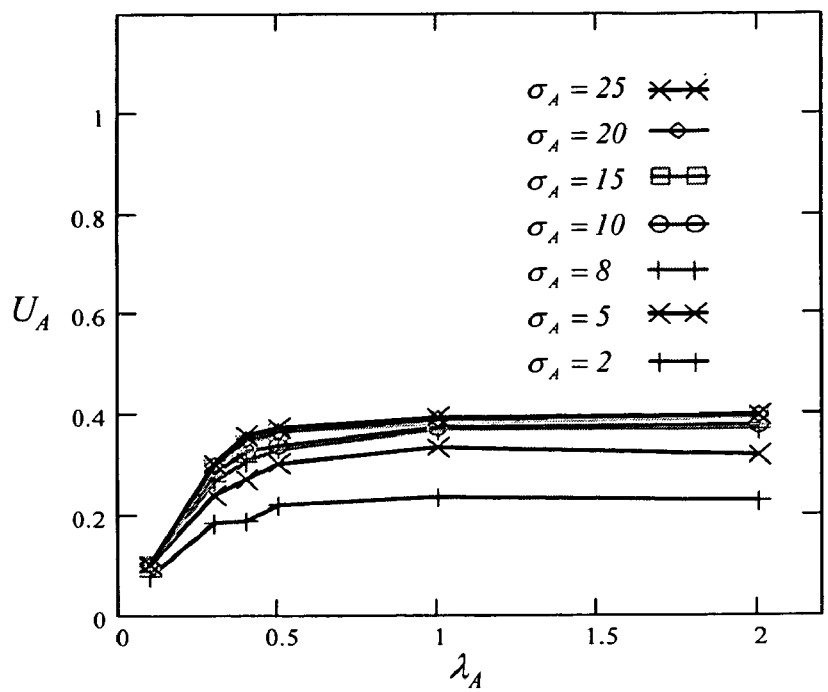
FIGS. 24A and 24B illustrate the spatial throughput and spatial capacity of SCR for different network densities, loads, and processing gains according to an embodiment of the present invention.
Figure 24B:
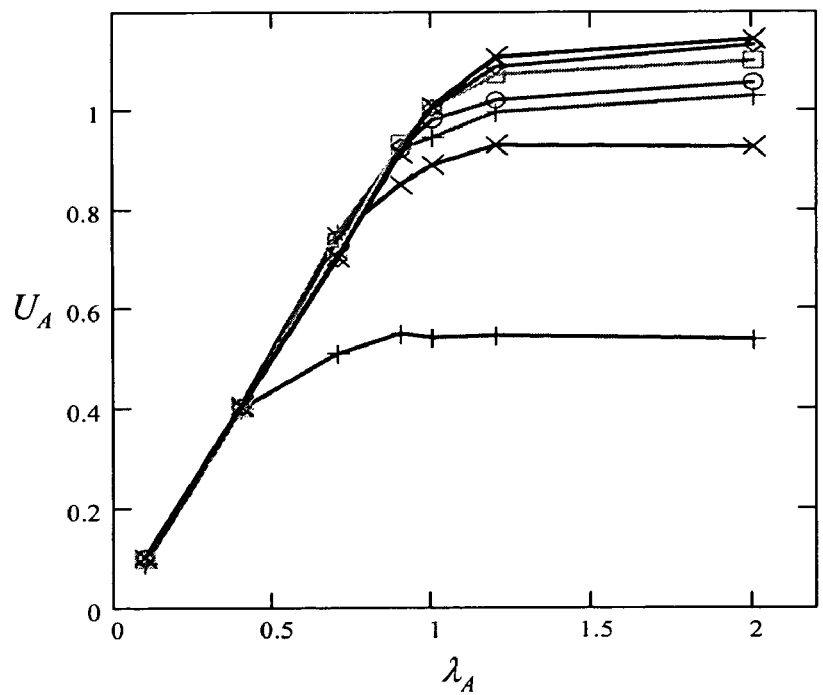

A second set of simulations use the same simulation scenario but tests the effect of load on the capacity of the protocol. The measure of capacity used is spatial capacity, $U_A$, with units of throughput per unit area, packets/sec/area. All measurements are normalized to the range of a transmitter so the unit of area is the area subsumed by a transmission, π square units. The load is also measured as a function of area. $\lambda_A$ denotes the spatial arrival rate of packets. It is defined as the arrival rate of packets to all the nodes in a transmission area. Thus, the packet arrival rate per node within a transmission area is $\lambda = \lambda_A/\sigma_A$. Each simulation run included 10 node placements with 1000 transmission slots each. Contentions were driven by a Poisson arrival process with parameter $\lambda_A$. Packets that arrived at nodes were queued until they were successfully transmitted. The destination for each packet was randomly selected from those nodes within range of the source. Contentions were considered successful when the signal to interference ratio (SIR) between the source and destination and vice versa were both greater than 10 dB. The SIR was determined using the equation $$SIR_j = \frac{P_t/d_j^n}{N/K + \frac{1}{PG}\sum_{i \neq j} P_t/d_i^n}. \quad (8)$$

where K is a constant, $P_t$ is the effective radiated power from a transmitter, N is the background noise power, $d_j$ is the distance that separates the source from the destination, $d_i$ is the distance that separates the interfering source i from the destination, n is the path loss exponent (n=4 in all the simulations), and PG is the processing gain. Nodes signaled for access using the signaling parameters in row 1 of Table 4. FIGS. 24A and 24B illustrate the performance of the protocol when there is no processing gain and when the processing gain is 100. The results presented in FIGS. 24A and 24B demonstrate several significant traits of the SCR. First, that it does not suffer congestion collapse. Despite the increased load, the capacity of the access mechanism does not decrease. Second, it demonstrates that the density of contending nodes does not decrease the capacity. In fact, it increases the capacity. Third, it demonstrates that there is a diminishing return in capacity improvements as the density increases. A density of 10 nodes appears to offer the best performance. Finally, the performance of the SCR protocol can be improved by improving the capture conditions. The use of spread spectrum with a processing gain of 100 nearly tripled the capacity of the protocol.

Figure 25:
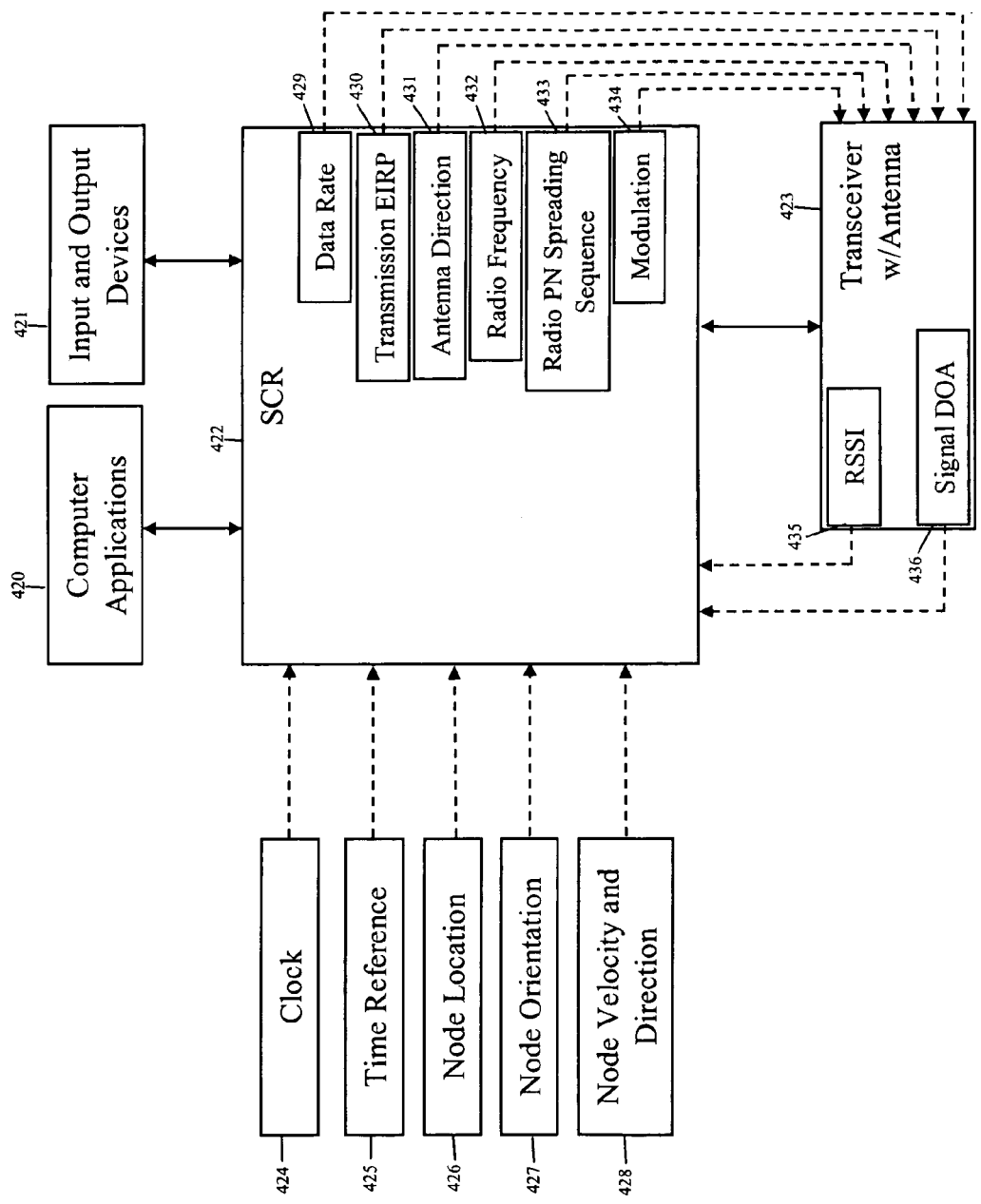
FIG. 25 illustrates the inputs and outputs of the invention with devices and software according to an embodiment of the present invention.

FIG. 1 illustrates the interfaces between the SCR protocol and between these protocols and other physical devices, computer applications, and networking protocols. By way of illustration and not as a limitation, the SCR protocol may be embodied in software, firmware, volatile memory, non-volatile memory or a combination of these means. However embodied, the SCR protocol comprises interfaces for physical inputs and outputs and the movement of packets to and from applications and the physical devices that the SCR protocol controls. FIG. 25 illustrates possible inputs to the protocol from devices, possible outputs from the protocol to control radio components, and packet interfaces to and from radios and other software components and hardware devices. The SCR protocol 422 receives a clock signal 424, a time reference 425 for that clock that is used to synchronize nodes, the node's location 426, the node's orientation 427, and the node's velocity and direction 428. This information may come from one of several physical devices or may be algorithmically resolved by other protocols that operate on top of the SCR protocol. The SCR protocol 422 receives the receive signal strength indication (RSSI) 435 and possibly the direction of arrival (DOA) of a signal 436 from the transceiver 423. In turn, the SCR protocol 422 may set several of the transceiver's 423 transmission properties, for example, data rate 429, transmission effective isotropic radiation power (EIRP) 430, antenna direction 431, radio frequency 432, the pseudonoise (PN) spreading sequence 433, and the modulation method 434, e.g. binary phase shift keying, quadrature phase shift keying, etc. The SCR protocol 422 may exchange packets with a number of devices and applications. It may exchange packets with a local computer application 420, with attached input and output devices 421, e.g. cameras, microphones, sensors, video screens, speakers, actuators, appliances, etc., and with the transceiver 423.

Figure 26:
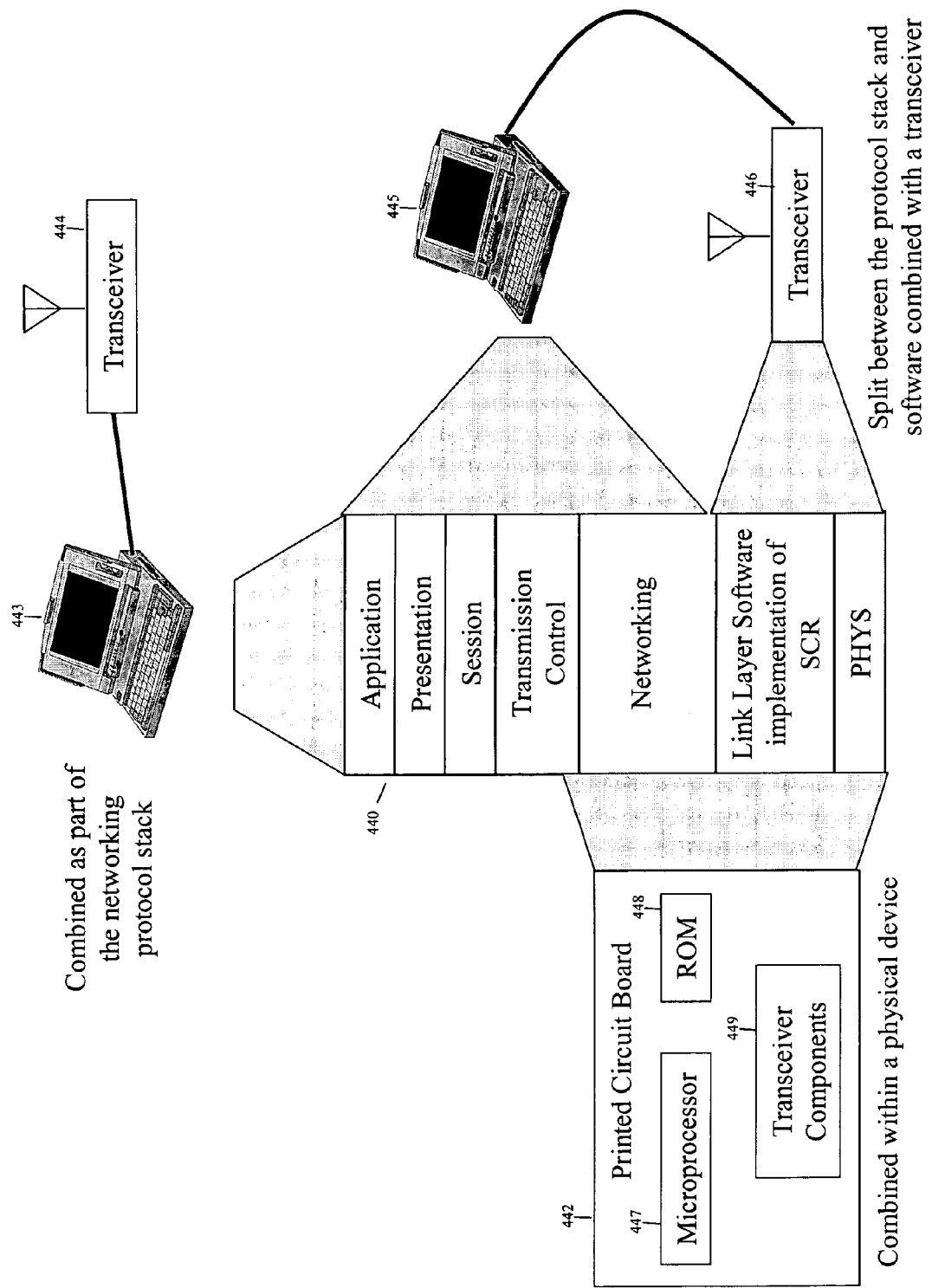
FIG. 26 illustrates the placement of this invention within the Open Systems Interconnection (OSI) protocol stack according to an embodiment of the present invention.

FIG. 26 illustrates the placement of this invention within the Open Systems Interconnection (OSI) protocol stack 440 according to an embodiment of the present invention. In this embodiment, the SCR protocol is tightly coupled with the physical layer. As such, the physical embodiment of this invention may take one of three general forms: first, as software in read only memory (ROM) 448 that is combined with a microprocessor 447 and transceiver 448 on a printed circuit board (PCB) 442; or, second, as software totally integrated with other networking software on a computer 443 that is then connected to a transceiver 444. Finally, the requirement to tightly control the timing of events may require practical embodiments to split the functionality of the invention between the ROM in a transceiver 446 and the networking software on a computer 445. The embodiment used would depend on the application. An application that supports input and output from sensors, actuators, appliances, and video and audio devices would most likely implement the invention on a PCB 442. An application for networking of personal computers (PC) may provide a transceiver card with a combination of the transceiver hardware and software 446 and then the bulk of the networking software would be loaded on the PC 445. A military application, where the radios are already well defined, may require the software to be loaded entirely within a computer 443 that attaches to and controls the transceiver 444.

Figure 27:
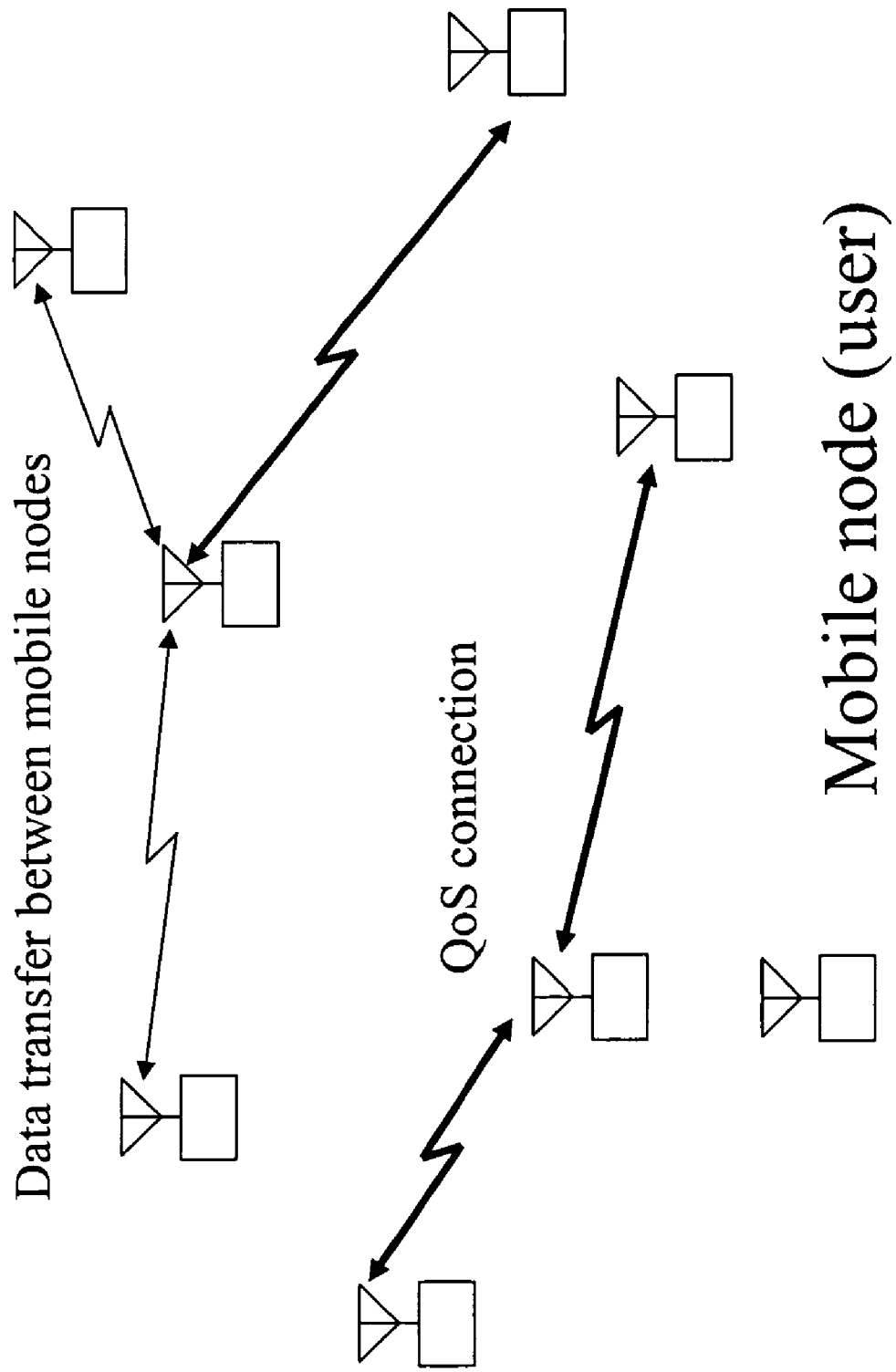
FIG. 27 illustrates an example ad hoc network made of mobile nodes according to an embodiment of the present invention.
Figure 28:
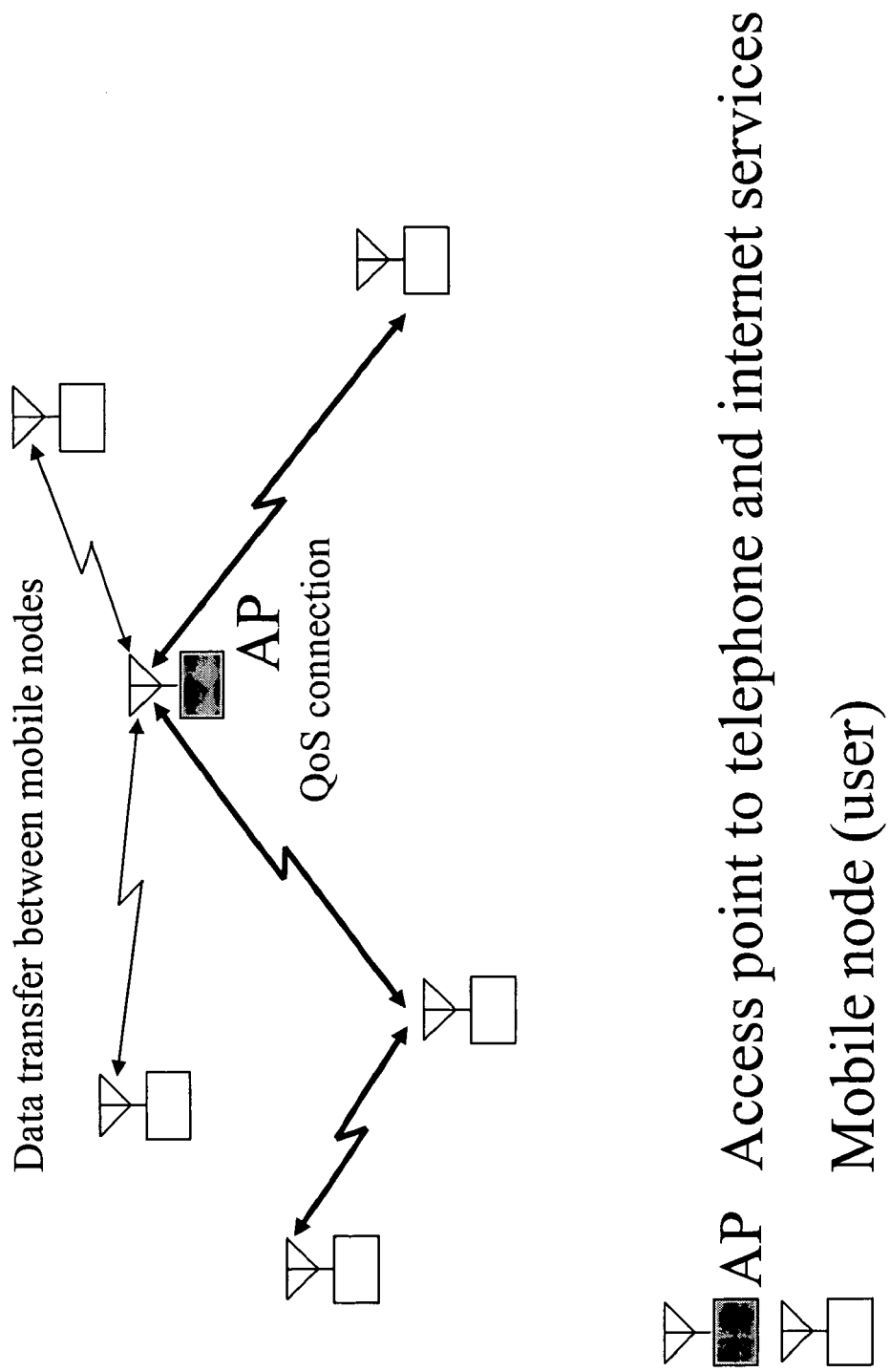
FIG. 28 illustrates an example ad hoc network made of mobile nodes communicating to a service access point according to an embodiment of the present invention.
Figure 29:
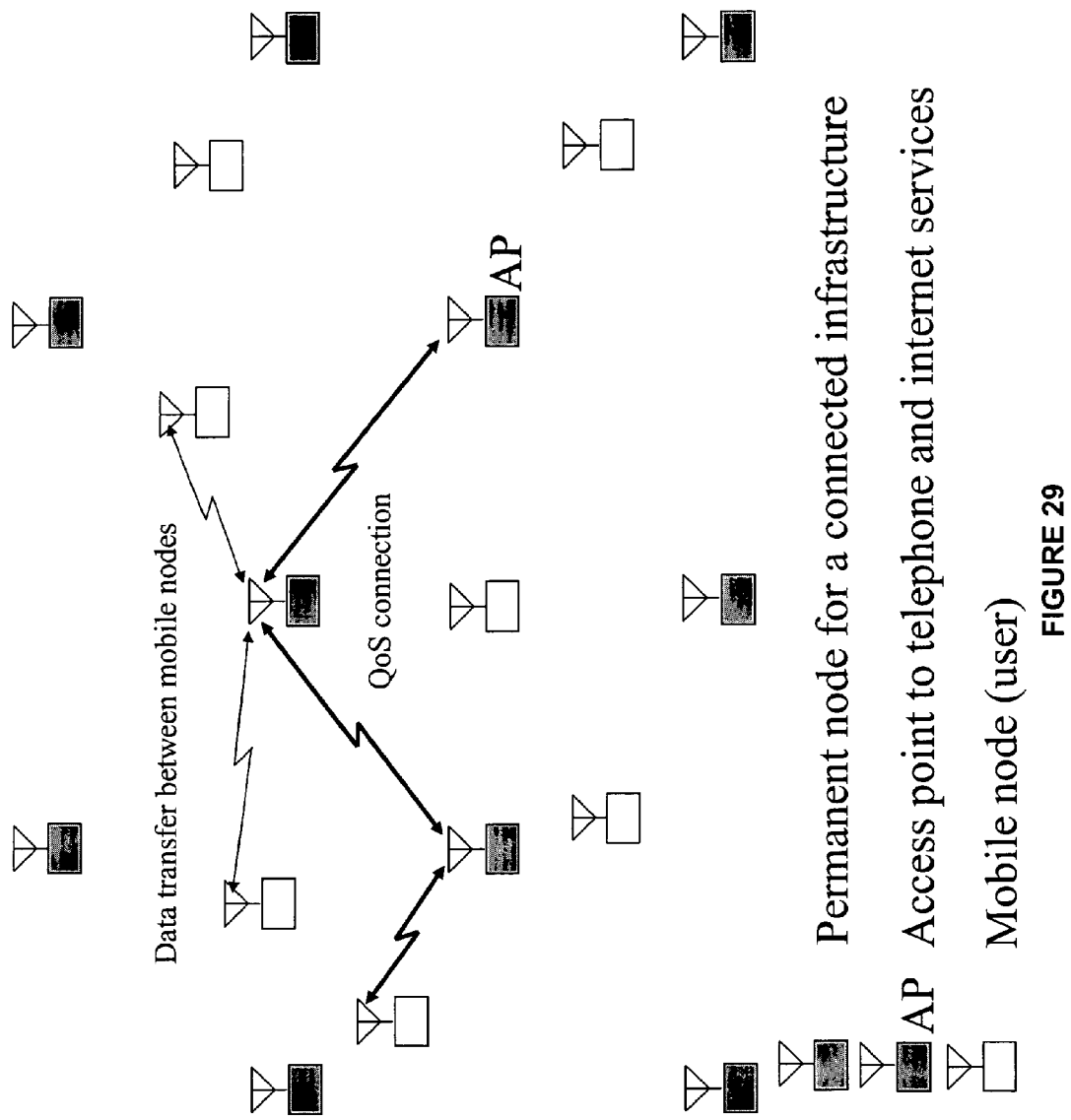
FIG. 29 illustrates an example ad hoc network of mobile nodes enhanced with an infrastructure of fixed nodes and access points according to an embodiment of the present invention.

FIGS. 27, 28, and 29 illustrate the most general of networking approaches where this invention could be used. FIG. 27 illustrates a purely mobile network according to an embodiment of the present invention where all nodes are equivalent. This type of ad hoc network could be created anywhere with any number of devices. FIG. 28 illustrates a network with an access point (AP) according to an embodiment of the present invention. The distinction between this network and that depicted in FIG. 27 is that in FIG. 28 most traffic would go between mobile nodes and the AP. The AP is likely to provide special services such as access to the Internet, cable video, or the telephone system. FIG. 29 illustrates a wide area networking environment according to an embodiment of the present invention that may be found on a campus or in a city. Such a network comprises of mobile nodes, access points, as well as an infrastructure of fixed nodes. The role of the fixed nodes is to support connectivity in the network. These fixed nodes may be the endpoints of wormholes.

These networks have military, civil, and commercial uses. The ability to create a network without any fixed infrastructure as illustrated in FIG. 27 makes the networks ideal for ad hoc creation of networks as would be required in military applications and civil emergency use. The fact that these purely ad hoc networks can be enhanced by the presence of infrastructure as illustrated in FIGS. 28 and 29 makes this network an all purpose solution for mobile communications. The loss of infrastructure does not preclude communications. Infrastructure, merely enhances it. In this way, the present invention becomes the basis of an all-purpose communications device.

FIG. 30 illustrates an embodiment of the present invention for use in a residence. In this embodiment, a transceiver using the SCR protocol is incorporated into any number of computers and computer peripherals permitting these devices to be connected are. This would allow direct communications between computers allowing computer-to-computer gaming, remote printing of documents, and access to Internet services provided from a central node in the home. The central node concept allows for the easy access to services that may be provided by a cable company. Television and telephones could be outfitted with this invention allowing them to communicate with an AP provided by a cable services provider. This device could support the networking of a completely automated home as devices can be put on anything for which there may be an advantage for remote control.

There are multiple commercial wide area networking applications. A computer or device outfitted for operation at home can also become part of a commercial infrastructure. A service provider would build the infrastructure of fixed nodes and access points. Through this infrastructure and the cooperation of other mobile nodes, users could have connectivity to any computer or computer subnetwork connected to the ad hoc network. Service providers can provide numerous services including, telephone access, limited video streaming, and location based warning and advice systems. The latter concept offers many interesting possibilities. The service provider may develop a system that keeps track of traffic patterns and then warns and advises motorists of traffic congestion and possibly recommends alternative routes based on the user's destination. It can provide location based advertising or tourism information so that users can be made aware of points of interest that are close to their location. Tags based on this device can be placed on people, animals, or things. Computers can be programmed to track specific tags. For example, tags could be placed on children in an amusement park and parents could then use such a device to find them when they become separated. Tags can be placed on automobiles, trucks, or emergency vehicles so that there location can be tracked within a city.

The present invention has been described in terms of a number of exemplary embodiments. It will be understood that various modifications may be made to the embodiments as described without departing from the scope of the invention.

An access protocol for wireless ad hoc networks using synchronous collision resolution has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, number of phases, slots per phase, or probabilities per slot does not create a new protocol that would depart from the scope of the present invention.

What is claimed is:

1. A method of medium access control among nodes in a wireless network, comprising:
  synchronizing nodes on a wireless channel of the wireless network to a common time;
  dividing a wireless channel into transmission slots;
  establishing a plurality of signaling phases on the wireless channel at the beginning of a transmission slot, wherein each of the plurality of signaling phases is associated with a signaling process selected from the group consisting of a first to assert signaling process and a last to assert signaling process, and wherein each of the plurality of signaling phases comprises one or more signaling slots;

synchronizing transmission of access signals of contending nodes relative to the signaling phases, wherein each of the contending nodes comprises a packet to send and wherein each of the contending nodes contends simultaneously for access to the wireless channel;

determining surviving nodes of a signaling phase among the contending nodes by applying the signaling process associated with the signaling phase to the access signals transmitted by the contending nodes;

determining ultimate surviving nodes of a channel access attempt among the surviving nodes by identifying the surviving nodes of each of the plurality of signaling phases among the contending nodes; and authorizing the ultimate surviving nodes to transmit packets.

2. The method of claim 1 further comprising:

synchronizing the transmission of request-to-send (RTS) messages from the ultimate surviving nodes;

synchronizing the transmission of clear-to-send (CTS) messages from the nodes that respond to an RTS message from an ultimate surviving node;

synchronizing the transmission of payload packets from the surviving nodes to destination nodes during the transmission slot; and synchronizing the transmission of acknowledgement (ACK) messages from the nodes that respond to receiving the transmitted packets.

3. The method of claim 2 further comprising:

determining a route for sending a payload packet from a contending node to a destination node using a routing table, wherein the route comprises a node adjacent to the ultimate surviving node (herein, the "next hop node");

sending a request to send (RTS) message from an ultimate surviving node for receipt by the next hop node;

sending a clear to send (CTS) message from the next hop node when the RTS message is received by the next hop node;

sending the payload packet from the ultimate surviving node to the next hop node if the CTS message is received by the ultimate surviving node; and sending an acknowledgement (ACK) message from the next hop node for receipt by the ultimate surviving node if the payload packet is received by the next hop node.

4. The method of claim 2 further comprising:

selecting a payload packet for broadcast by a contending node to a plurality of neighboring nodes;

determining that the contending node is the ultimate surviving node;

sending a request to send (RTS) message from the ultimate surviving node for receipt by a broadcast address;

silencing nodes that receive the RTS during a CTS message time frame;

sending the payload packet from the ultimate surviving node to the broadcast address; and silencing nodes that receive the payload packet during an ACK message time frame.

5. The method of claim 1, wherein the method further comprises:

synchronizing the transmission of payload packets from ultimate surviving nodes to nodes adjacent to the ultimate surviving node during a transmission slot.

6. The method of claim 1, wherein the method further comprises:

synchronizing the transmission of acknowledgement packets from nodes that receive the payload packets.

7. The method of claim 1, wherein establishing a plurality of signaling phases on the wireless channel at the beginning of a transmission slot comprises at least:

assigning a service priority to a signaling slot within a signaling phase based on a packet differentiator;

permitting contending nodes having packets comprising the packet differentiator to transmit a contention signal in the priority signaling slot based on the packet differentiator of a payload packet;

applying a first-to-assert preemption rule to a priority phase; and determining at the contending nodes whether the contending node survived a priority phase contention.

8. The method of claim 7, wherein the packet differentiator is selected from the group consisting of a time to live, a network application, a content of a packet, a source of a packet, and a destination of a packet.

9. The method of claim 7 further comprising:

organizing the transmission slots into constant bit rate (CBR) frames; and repeating the CBR frames at a rate where one slot per frame supports a lowest CBR service.

10. The method of claim 9 further comprising reserving transmission slots on a use-or-lose basis comprising:

implementing a quality of service (QoS) priority for initial access to a transmission slot in a CBR frame;

implementing a CBR priority for subsequent access to the same transmission slot of a next CBR frame;

implementing a policy whereby contending nodes that have used at least one of a QoS signaling slot and a CBR signaling slot in a transmission slot of a previous CBR frame may use the CBR signaling slot in the same transmission slot of a current CBR frame;

implementing a policy whereby destination nodes that received a packet in a transmission slot that was contended for using at least one of the QoS signaling slot and the CBR signaling slot in the transmission slot of the previous CBR frame may cooperate in the contention signaling in the same transmission slot of the current CBR frame when the CBR signaling slot is used in the contention;

implementing a cooperative signaling slot in a first position of a subsequent first to assert signaling phase that is used in tandem with the use of the CBR signaling slot; and implementing a policy whereby a contending node that contends using the CBR signaling slot and the destination node of a packet received in the same transmission slot of the previous CBR frame may also signal using the cooperative signaling slot.

11. The method of claim 10 further comprising:

forming multiple queues, wherein the multiple queues are each associated with a different priority of service and wherein the multiple queues comprise constant bit rate (CBR) stream queues and variable bit rate (VBR) stream queues;

providing a queue for each new CBR and VBR stream;

implementing a policy to send packets from highest priority queues first; and implementing a policy to associate CBR and VBR queues to specific reserved transmission slots in each CBR frame and wherein the contending nodes contend to send packets from the queues using the CBR priority.

12. The method of claim 10, wherein the packet differentiator is selected from the group consisting of a time to live, a network application, a content of a packet, a source of a packet, and a destination of a packet.

13. The method of claim 1 further comprising supporting the selection of a unique channel for the exchange of peer-to-peer traffic between contending nodes and nodes adjacent to a contending node (herein, the "next hop nodes") using signaling slots comprising:
providing a receiver directed channel for each node;
providing a broadcast channel to be shared by each node;
providing a broadcast priority group comprising a subset of priority signaling slots;
implementing a policy whereby non-contending nodes listen for packets on their receiver directed channel whenever any priority signaling slot other than a signaling slot from the broadcast priority group is used; and
implementing a policy whereby non-contending nodes listen for packets in the broadcast channel whenever the broadcast priority group was used to gain access.

14. The method of claim 13 further comprising the ultimate surviving nodes transmitting multiple different packets of data to different next hop nodes simultaneously, wherein the ultimate surviving nodes each comprise a number of transceivers at least equal to the number of different next hop nodes and wherein each transceiver transmits on a different channel.

15. The method of claim 13 further comprising the contending nodes transmitting different packets of data to different next hop nodes simultaneously using a single transceiver adapted to code-multiplex a signal from the single transceiver.

16. The method of claim 3 further comprising:
identifying an attribute of a received RTS packet at the next hop node;
sending the attribute to the ultimate surviving node in the CTS packet.

17. The method of claim 16, wherein the attribute is a measure of the signal power of the received RTS packet and wherein the method further comprises using the attribute at the ultimate surviving node to adjust the transmission power of a payload packet.

18. The method of claim 1, wherein each of the ultimate surviving nodes comprises a directional antenna and the method further comprises:
determining at the ultimate surviving node the direction of a node adjacent to the surviving node (herein, the "next hop node"); and
pointing a directional antenna of the ultimate surviving node in the direction of the next hop node during packet transmissions and receptions over the transmission channel.

19. The method of claim 1, wherein a node adjacent to an ultimate surviving node (herein, the "next hop node") comprises a directional antenna and wherein the method further comprises:
determining at the next hop node the direction of the ultimate surviving node; and
pointing the directional antenna of the next hop node in the direction of the ultimate surviving node during packet receptions and transmissions over the transmission channel.

20. The method of claim 1 further comprising transmitting signals from a non-contending node to assist contention by the contending nodes.

21. The method of claim 20 further comprising providing a a slot designated for cooperative signaling in a signaling phase and wherein the method further comprises:

determining at a node adjacent to a surviving node (herein, the "next hop node") that it is a recipient of a CBR transmission from the surviving node; and
sending an assertion signal during the cooperative signaling slot of the signaling phase.

22. The method of claim 21 further comprising:
at a receiving node, detecting the simultaneous arrival of a plurality of signals for the receiving node, wherein the plurality of signals interfere with reception at the receiving node; and
echoing a signal to suppress interfering contending nodes.

23. The method of claim 1 further comprising:
allowing a node to enter a low energy state;
implementing a slot-based policy whereby the node can enter the low energy state for the remainder of a transmission if the node has no pending traffic for that slot;
implementing a channel-based policy whereby the node can enter a low energy state for a predefined period if the channel is not in use; and
implementing a coordination policy whereby the node coordinates with other nodes to define a period for entering and remaining in a low energy state.

24. The method of claim 23, wherein further comprising:
determining whether a node is a participant in a packet exchange;
if the node is not a participant, scheduling a wakeup interval for the node; and
placing the node in a dozing state.

25. The method of claim 24, wherein the wakeup interval comprises a number of transmission slots.

26. The method of claim 25, wherein determining whether a node is a participant in a packet exchange comprises listening for signaling from a contending node.

27. The method of claim 24, wherein placing the node in a dozing state comprises:
coordinating with a neighboring node for the receipt of packets directed to the node entering the dozing state;
broadcasting from the node entering the dozing state a wakeup interval and the address of the neighboring node to receive packets for the node entering the dozing state; and
wherein the method further comprises:
while the node is in the dozing state, receiving at the neighboring node the packets for the node; and
upon leaving the dozing state, receiving at the node the packets received by the neighboring node.

28. The method of claim 27 wherein the method further comprises:
after leaving the dozing state, listening for a priority signal;
if no priority signal is heard, broadcasting from the node entering the dozing state a wakeup interval and the address of the neighboring node to receive packets for the node entering the dozing state; and
reentering the dozing state.

29. The method of claim 1 further comprising:
associating signal tones with a specified node behavior, wherein the signal tones elicit the specified behavior when received by a node; and
sending a collision resolution signal from the contending node, wherein the collision resolution signal comprises the signal tones.

30. The method of claim 1, wherein an access signal only occupies one signaling slot.

31. The method of claim 1, wherein an access signal occupies one or more contiguous signaling slots.

* * * * *